(12) United States Patent
Kitano et al.

(10) Patent No.: US 8,898,727 B2
(45) Date of Patent: Nov. 25, 2014

(54) TRANSMISSION DEVICE AND RECEPTION DEVICE

(75) Inventors: Masaki Kitano, Tokyo (JP); Kazumoto Kondo, Tokyo (JP); Toshihide Hayashi, Kanagawa (JP); Gen Ichimura, Tokyo (JP)

(73) Assignee: Sony Corporation (JP)

( * ) Notice: Subject to any disclaimer, the term of this patent is extended or adjusted under 35 U.S.C. 154(b) by 171 days.

(21) Appl. No.: 12/451,269

(22) PCT Filed: Mar. 5, 2009

(86) PCT No.: PCT/JP2009/054193
§ 371 (c)(1),
(2), (4) Date: Jan. 14, 2010

(87) PCT Pub. No.: WO2009/110561
PCT Pub. Date: Sep. 11, 2009

(65) Prior Publication Data
US 2010/0132001 A1  May 27, 2010

(30) Foreign Application Priority Data

Mar. 5, 2008  (JP) ............................... P2008-055576
May 23, 2008  (JP) ............................... P2008-136063
Aug. 13, 2008  (JP) ............................... P2008-208302

(51) Int. Cl.
*H04N 7/16*  (2011.01)
*H04N 21/442*  (2011.01)
(Continued)

(52) U.S. Cl.
CPC ..... *H04N 21/4147* (2013.01); *H04N 21/44227* (2013.01); *H04N 21/4122* (2013.01); *H04N*
(Continued)

(58) Field of Classification Search
USPC ..................... 348/500, 725; 725/80, 118, 148
See application file for complete search history.

(56) References Cited

U.S. PATENT DOCUMENTS 7,394,499 B2  7/2008 Okamoto et al.
7,487,273 B2  2/2009 Kobayashi
(Continued)

FOREIGN PATENT DOCUMENTS

EP  1890291 A2  2/2008
EP  2091253 A1  8/2009
(Continued)

OTHER PUBLICATIONS

High-Definition Multimedia Interface, specification version 1.1 (May 20, 2004).*
(Continued)

*Primary Examiner* — Jun Fei Zhong
(74) *Attorney, Agent, or Firm* — Lerner, David, Littenberg, Krumholz & Mentlik, LLP

(57) ABSTRACT

[Object] To enable an external device to recognize, in the case of including a communication unit configured to execute communication via a communication path made up of a pair of differential transmission paths included in a transmission path, information relating to the communication unit thereof. [Solving means] A disk recorder 210 transmits function information indicating that a communication unit (high-speed data line I/F 213) configured to execute communication with an external device via a communication path made up of a reserve line and an HPD line of an HDMI cable 350 to a television receiver 250 via a CEC line that is a control data line of the HDMI cable 350. The television receiver 250 receives function information, whereby whether or not the disk recorder 210 is an eHDMI-compatible device can be determined, and in the case of an eHDMI-compatible device, a compatible transmission format (application) can be recognized. It can also be conceived to transmit the function information from the television receiver 250 to the disk recorder 210 in the same way as described above.

7 Claims, 36 Drawing Sheets

(51) Int. Cl.
  *H04N 21/41* (2011.01)
  *H04N 5/775* (2006.01)
  *H04N 21/4147* (2011.01)
  *H04N 5/781* (2006.01)
  *H04N 5/85* (2006.01)
  *H04N 9/804* (2006.01)
  *H04N 5/765* (2006.01)

(52) U.S. Cl.
  CPC .... *5/781* (2013.01); *G09G 2370/04* (2013.01); *H04N 5/85* (2013.01); *H04N 9/8042* (2013.01); *H04N 5/775* (2013.01); *G09G 2370/12* (2013.01); *H04N 5/765* (2013.01); *G09G 2370/06* (2013.01)
  USPC ............. 725/153; 725/133; 725/141; 725/80; 725/118; 348/552; 348/725

(56) References Cited

U.S. PATENT DOCUMENTS

| | | |
|---|---|---|
| 7,499,462 B2 | 3/2009 | MacMullan et al. |
| 2006/0209880 A1* | 9/2006 | Chang et al. .................. 370/464 |
| 2008/0046950 A1* | 2/2008 | Nakajima .................... 725/118 |
| 2009/0237561 A1* | 9/2009 | Kobayashi .................... 348/554 |
| 2010/0128176 A1* | 5/2010 | Nakajima et al. ............. 348/512 |
| 2010/0269137 A1* | 10/2010 | Nakajima et al. ............... 725/39 |

FOREIGN PATENT DOCUMENTS

| | | |
|---|---|---|
| JP | 2005-173553 A | 6/2005 |
| JP | 2007329633 A | 12/2007 |
| JP | 2008-048136 A | 2/2008 |
| WO | WO-02-078336 A1 | 10/2002 |
| WO | WO-2006-101801 A2 | 9/2006 |
| WO | WO-2007-049556 A1 | 5/2007 |
| WO | 2008/056708 | 5/2008 |

OTHER PUBLICATIONS

Nakajima, WIPO, WO 2008/056708, publication date May 15, 2008.*
Office Action from Japanese Application No. 2008-208302, dated Apr. 23, 2013.
Supplementary European Search Report EP 09717655, dated Oct. 29. 9012.
Office Action from Japanese Application No. 2008-208302, dated Feb. 4, 2014.
Office Action from Korean Application No. 10-2009-7023054, dated Jan. 14, 2014.

* cited by examiner

FIG. 7

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Reserved (N.C. on device) |
| 15 | SCL | 16 | SDA |
| 17 | DDC/CEC Ground | 18 | +5V Power |
| 19 | Hot Plug Detect | | |

FIG. 10

| | | | | | | | | |
|---|---|---|---|---|---|---|---|---|
| InfoFrame Type Code | | | InfoFrame Type = 02₁₆ | | | | | |
| InfoFrame Version Number | | | Version = 02₁₆ | | | | | |
| Length of AVI InfoFrame | | | Length of AVI InfoFrame (13) | | | | | |
| Data Byte 1 | E1 | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | Rsvd (0) | VIC6 | VIC5 | VIC4 | VIC3 | VIC2 | VIC1 | VIC0 |
| Data Byte 5 | CT1 | CT0 | E2 | E3 | PR3 | PR2 | PR1 | PR0 |
| Data Byte 6, 7 | Line Number of End of Top Bar | | | | | | | |
| Data Byte 8, 9 | Line Number of Start of Bottom Bar | | | | | | | |
| Data Byte 10, 11 | Pixel Number of End of Left Bar | | | | | | | |
| Data Byte 12, 13 | Pixel Number of Start of Right Bar | | | | | | | |
| Data Byte 14 ... 27 | Reserved (0) | | | | | | | |

FIG. 11
FIG. 12
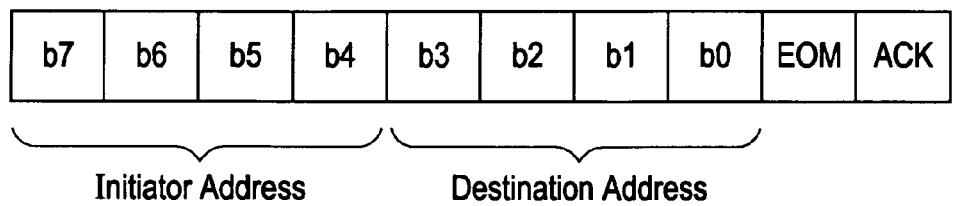
FIG. 13
| Address | Device |
|---|---|
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Free Use |
| 15 | Unregistered (as initiator address) Broadcast (as destination address) |

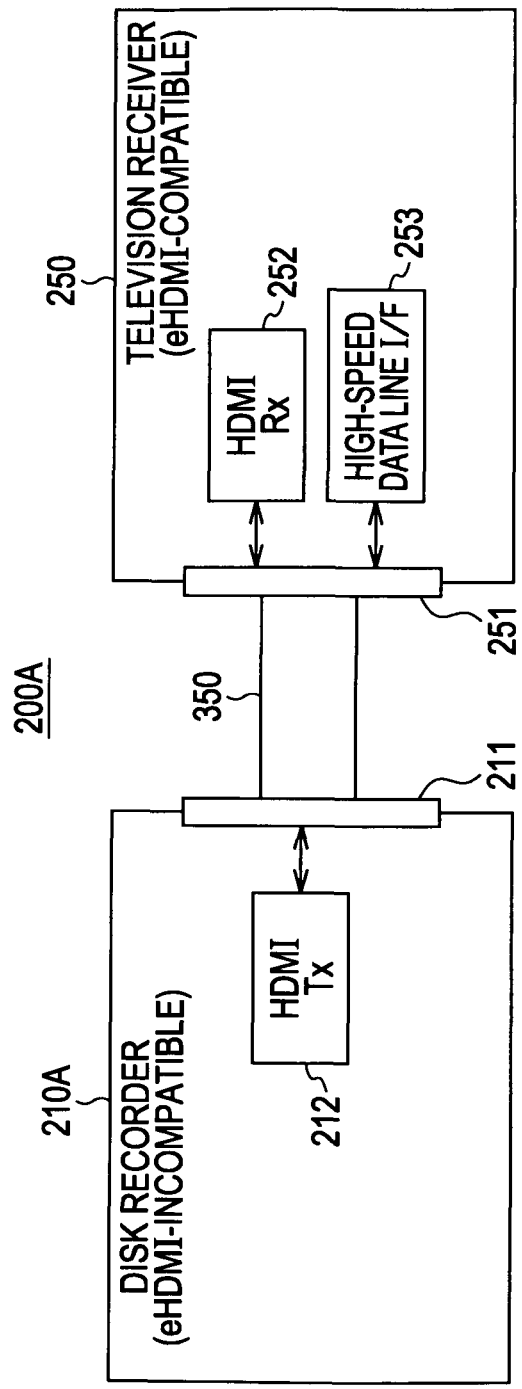

TRANSMISSION DEVICE AND RECEPTION DEVICE

CROSS-REFERENCES TO RELATED APPLICATIONS

The present application is a national phase entry under 35 U.S.C. §371 of International Application No. PCT/JP2009/054193 filed Mar. 5, 2009, published on Sep. 11, 2009 as WO 2009/110561 A1, which claims priority from Japanese Patent Application No. JP 2008-055576 filed in the Japanese Patent Office on Mar. 5, 2008, Japanese Patent Application No. JP2008-136063 filed in the Japanese Patent Office on May 23, 2008 and Japanese Patent Application No. JP 2008-208302 filed in the Japanese Patent Office on Aug. 13, 2008.

TECHNICAL FIELD

The present invention relates to a transmission device and a reception device. Specifically, the present invention relates to, in the case of including a communication unit configured to execute communication via a communication path made up of a pair of differential transmission paths included in a transmission path, a transmission device or the like configured to enable an external device to transmit a signal suitably by allowing the external device to recognize information relating to the communication unit thereof.

BACKGROUND ART

In recent years, for example, HDMI (High Definition Multimedia Interface) has come into widespread use as a communication interface for transmitting digital video signals, i.e., uncompressed (baseband) video signals (hereafter, referred to as "image data" as appropriate) and digital audio signals (hereafter, referred to as "audio data" as appropriate) along with the video signal thereof from a DVD (Digital Versatile Disc) recorder, a set top box, or another AV source (Audio Visual source) to a television receiver, a projector, or another display, at high speed. For example, description has been made in Patent Document 1 regarding the details of the HDMI standard.
Patent Document 1: WO 2002/078336

DISCLOSURE OF INVENTION

Technical Problem

With the current HDMI standard, a transmission device (source device) can determine whether or not a reception device (sink device) is an eHDMI-compatible device, according to the voltage state of the reserve line of the HDMI cable. Here, the transmission device or reception device is compatible with eHDMI means that this transmission device or reception device includes a communication unit configured to execute communication using a communication path made up of predetermined lines of the HDMI cable (e.g., a reserve line and an HPD line).

However, the reception device has difficulty in recognizing whether or not the transmission device is an eHDMI-compatible device. In the case that the transmission device is in a busy state, the reception device has difficulty in recognizing this busy state. Therefore, reception devices have sometimes transmitted an unnecessary signal to a transmission device incompatible with eHDMI, or a transmission device compatible with eHDMI in a busy state.

An object of the present invention is to allow a reception device to transmit a signal to a transmission device suitably.

Technical Solution

One concept of the present invention is a transmission device comprising:
a video signal transmission unit configured to transmit video signals to an external device via a transmission path with a plurality of channels using a differential signal;
a communication unit configured to communicate with the external device via a communication path made up of a pair of differential transmission paths included in the transmission path;
a function information transmission unit configured to transmit first function information indicating that the transmission device includes the communication unit to the external device via a control data line making up the transmission path; and
a function information reception unit configured to receive second function information indicating that the external device includes a communication unit configured to execute communication via the communication path, which is transmitted from the external device.

Also, another concept of the present invention is a reception device comprising:
a video signal reception unit configured to receive video signals from an external device via a transmission path with a plurality of channels using a differential signal;
a communication unit configured to communicate with the external device via a communication path made up of a pair of differential transmission paths included in the transmission path;
a function information transmission unit configured to transmit first function information indicating that the reception device includes the communication unit to the external device via a control data line making up the transmission path; and
a function information reception unit configured to receive second function information indicating that the external device includes a communication unit configured to execute communication via the communication path, which is transmitted from the external device.

With the present invention, the transmission device includes a video signal transmission unit configured to transmit video signals to an external device (reception device) via a transmission path with a plurality of channels using a differential signal, and is, for example, an HDMI source device. The transmission device is provided with a communication unit configured to communicate with the external device via a communication path made up of a pair of differential transmission paths included in the transmission path. For example, at least one of the pair of differential transmission paths of the communication path includes a function for notifying the connection state of the external device using a DC bias potential. For example, the pair of differential transmission paths included in the transmission path is a reserve line and an HPD line making up an HDMI cable.

The function information indicating that the transmission device includes the communication unit is transmitted to the external device via the control data line. For example, the control data line is the CEC line of the HDMI cable, and the function information is transmitted to the external device as a CEC signal. This function information may include information of a transmission format (application) that it (transmission device) can support itself.

The reception device includes a video signal reception unit configured to receive video signals from an external device (transmission device) via a transmission path with a plurality of channels using a differential signal, and is, for example, an HDMI sink device. The reception device is provided with a communication unit configured to communicate with the external device via a communication path made up of a pair of differential transmission paths included in the transmission path. For example, at least one of the pair of differential transmission paths of the communication path includes a function for notifying the connection state of the external device using a DC bias potential. For example, the pair of differential transmission paths included in the transmission path is a reserve line and an HPD line making up an HDMI cable.

With the reception device, the function information transmitted from the external device is received via the control data line. For example, the control data line is the CEC line of the HDMI cable, and the function information is received from the external device as a CEC signal.

The function information indicating that the reception device includes the communication unit is transmitted to the external device via the control data line. This function information may include the information of a transmission format (application) that it (reception device) can support itself. With the transmission device, the function information transmitted from the external device is received via the control data line.

Thus, in the case that the transmission device includes the communication unit, the function information indicating that the transmission device includes the communication unit is transmitted to the reception device from the transmission device, and this function information is received at the reception device. Therefore, the reception device can recognize whether or not the external device (transmission device) includes the communication unit, and accordingly, transmitting an unnecessary signal to the external device having no communication unit via the communication path can be avoided. Also, in the case that the function information includes transmission format information that the external device can support, the reception device can readily know the transmission format that the external device can support from the information thereof.

Also, in the case that the reception device includes the communication unit, the function information indicating that the reception device includes the communication unit is transmitted to the transmission device from the reception device, and this function information is received at the transmission device. Therefore, the transmission device can recognize whether or not the external device (reception device) includes the communication unit, and accordingly, transmit an unnecessary signal to the external device having no communication unit via the communication path can be avoided. Also, in the case that the function information includes transmission format information that the external device can support, the transmission device can readily know the transmission format that the external device can support from the information thereof.

With the present invention, for example, an arrangement may be made wherein the reception device includes a transmission request transmission unit configured to transmit a transmission request for the function information to the external device (transmission device), the transmission device includes a transmission request reception unit configured to receive a transmission request for the function information transmitted from the external device (reception device), and the function information transmission unit of the transmission device transmits the function information to the external device (reception device) when the transmission request reception unit receives the transmission request. In this case, the reception device can confirm whether or not the external device includes the communication unit, at arbitrary timing (e.g., at the time of power-on, at the time of input change, or the like) by transmitting a transmission request for the function information to the external device.

Advantageous Effects

The present invention allows, in the case of including a communication unit configured to execute communication via a communication path made up of a pair of differential transmission paths included in a transmission path, the external device to recognize information relating to the communication unit thereof, and the external device can transmit a signal suitably, such as avoiding transmission of unnecessary packets, or the like.

BRIEF DESCRIPTION OF THE DRAWINGS

FIG. 7 is a diagram illustrating the pin array (type A) of an HDMI terminal.

FIG. 10 is a diagram illustrating the data structure of AVI InfoFrame.

FIG. 11 is a diagram illustrating the structure of CEC data to be transmitted with a CEC line.

FIG. 12 is a diagram illustrating a structure example of a header block.

FIG. 13 is a diagram illustrating logical addresses to be set according to the type of each device with HDMI.

FIG. 39 is a block diagram illustrating another configuration example of the AV system.

EXPLANATION OF REFERENCE NUMERALS

10 AV system, 11, 12 CDC device, 13 Non-CDC device, 11a, 11b, 12a, 13a HDMI terminal, 14, 15 HDMI cable, 200 AV system, 210 disk recorder, 211 HDMI terminal, 212 HDMI transmission unit, 213 high-speed data line interface, 250 television receiver, 251 HDMI terminal, 252 HDMI reception unit, 253 high-speed data line interface, 350 HDMI cable, 417 SPDIF reception circuit, 449 SPDIF transmission circuit

BEST MODE FOR CARRYING OUT THE INVENTION

Figure 1:
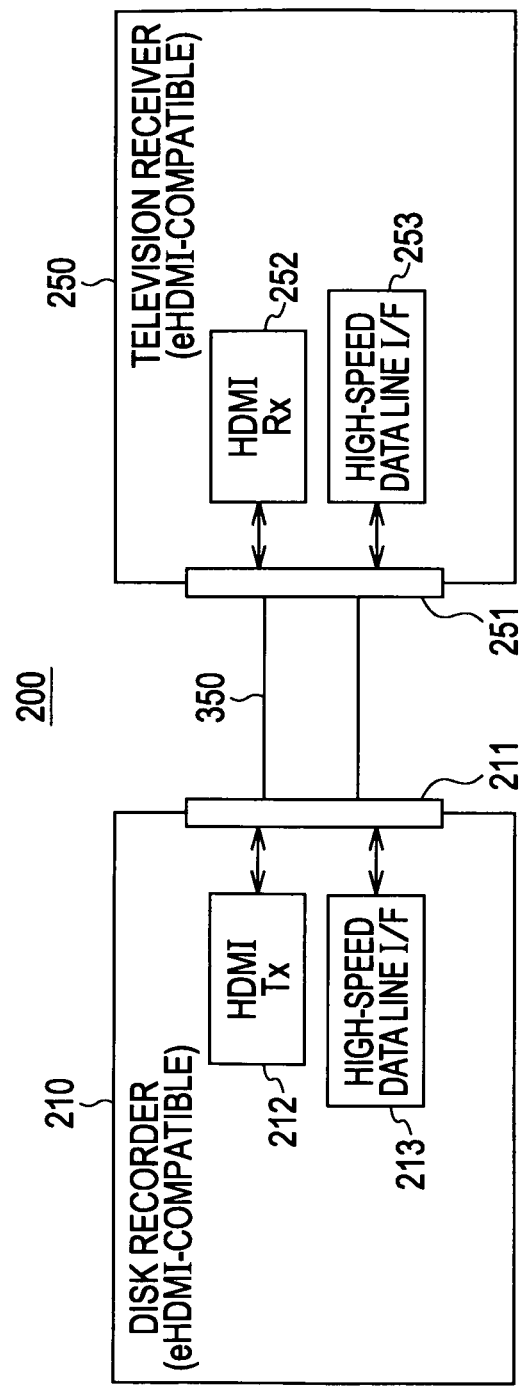
FIG. 1 is a block diagram illustrating a configuration example of an AV system serving as an embodiment of the present invention.

Hereinafter, an embodiment of the present invention will be described with reference to the drawings. FIG. 1 illustrates a configuration example of an AV (Audio Visual) system 200 serving an embodiment. This AV system 200 includes a disk recorder 210 serving as a source device, and a television receiver 250 serving as a sink device. With this AV system 200, the disk recorder 210 and the television receiver 250 are eHDMI-compatible devices. Here, to be an eHDMI-compatible device means to include a communication unit configured to execute communication using a communication path with a reserve line and an HPD line making up an HDMI cable.

The disk recorder 210 and the television receiver 250 are connected via an HDMI cable 350. The disk recorder 210 is provided with an HDMI terminal 211 to which an HDMI transmission unit (HDMITX) 212 and a high-speed data line interface (I/F) 213 are connected. The television receiver 250 is provided with an HDMI terminal 251 to which an HDMI reception unit (HDMIRX) 252 and a high-speed data line interface (I/F) 253 are connected. One end of the HDMI cable 350 is connected to the HDMI terminal 211 of the disk recorder 210, and the other end of this HDMI cable 350 is connected to the HDMI terminal 251 of the television receiver 250.

With the AV system 200 shown in FIG. 1, the video signals played at the disk recorder 210 are supplied to the television receiver 250 via the HDMI cable 350, and an image is displayed at this television receiver 250. Also, the audio signal played at the disk recorder 210 is supplied to the television receiver 250 via the HDMI cable 350, and audio is output from a speaker of this television receiver 250.

Figure 2:
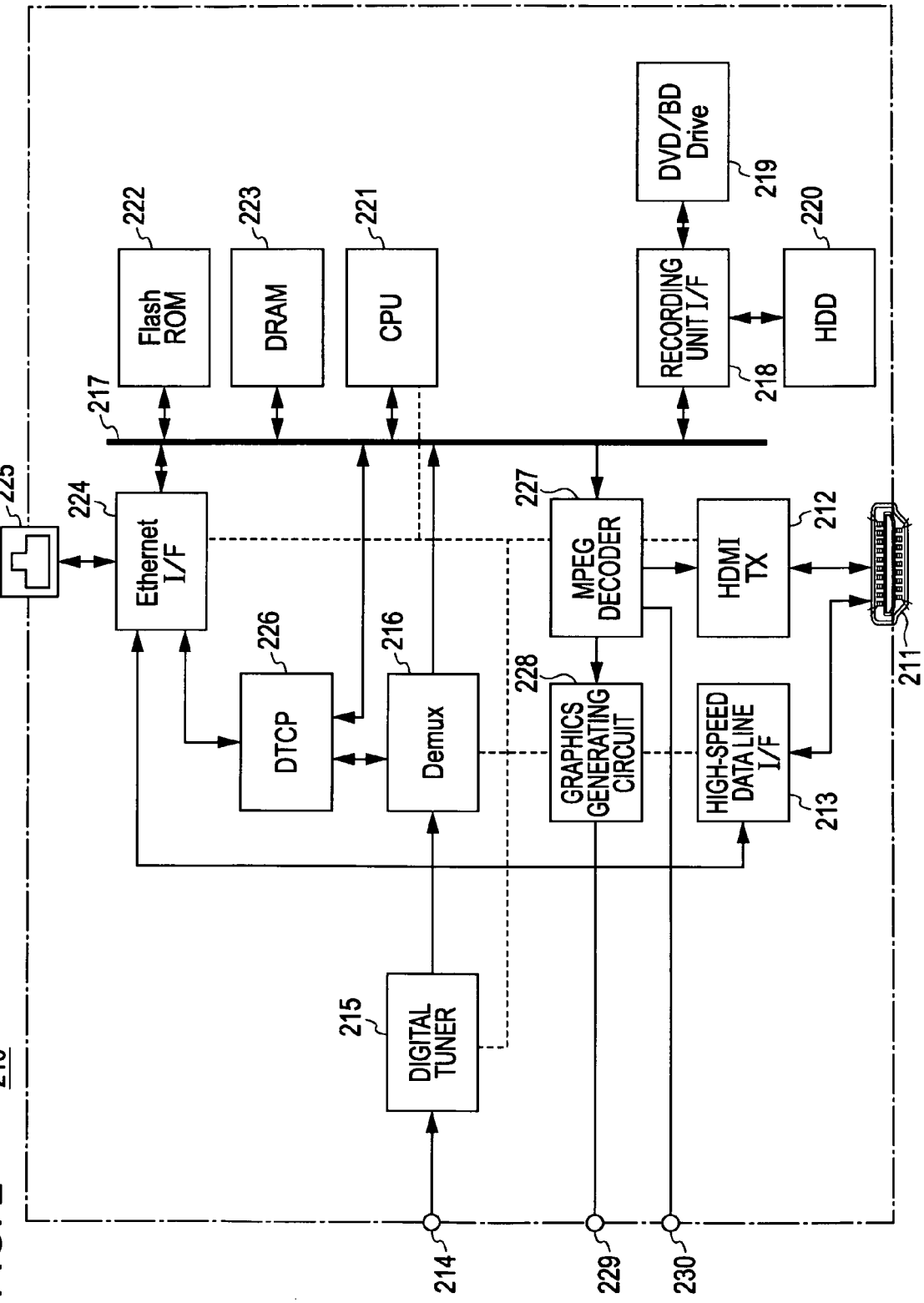
FIG. 2 is a block diagram illustrating a configuration example of a disk recorder (source device) making up the AV system.

FIG. 2 illustrates a configuration example of the disk recorder 210. This disk recorder 210 includes an HDMI terminal 211, an HDMI transmission unit 212, a high-speed data line interface 213, an antenna terminal 214, a digital tuner 215, a demultiplexer 216, an internal bus 217, a recording unit interface 218, a DVD/BD drive 219, an HDD (Hard Disk Drive) 220, a CPU (Central Processing Unit) 221, flash ROM (Read Only Memory) 222, DRAM (Dynamic Random Access Memory) 223, an Ethernet interface (Ethernet I/F) 224, a network terminal 225, a DTCP (Digital Transmission Content Protection) circuit 226, an MPEG decoder 227, a graphics generating circuit 228, a video output terminal 229, and an audio output terminal 230. Note that "Ethernet" is a registered trademark.

The HDMI transmission unit (HDMI source) 212 transmits baseband video (image) and audio data from the HDMI terminal 211 by communication conforming to HDMI. The details of this HDMI transmission unit 212 will be described later. The high-speed data line interface 213 is a bidirectional communication interface using predetermined lines making up an HDMI cable (a reserve line and an HPD line in the present embodiment). The details of this high-speed data line interface 213 will be described later.

The antenna terminal 214 is a terminal which inputs a television broadcast signal received at a reception antenna (not shown). The digital tuner 215 processes the television broadcast signal to be input to the antenna terminal 214 to output a predetermined transport stream. The demultiplexer 216 extracts a partial TS (Transport Stream) (TS packet of video data, TS packet of audio data) corresponding to a predetermined selected channel from the transport stream obtained at the digital tuner 215.

Also, the demultiplexer 216 extracts PSI/SI (Program Specific Information/Service Information) from the transport stream obtained at the digital tuner 215, and outputs this to the CPU 221. With the transport stream obtained at the digital tuner 215, multiple channels are multiplexed. Processing for extracting the partial TS of an arbitrary channel from this transport stream can be executed by obtaining the information of the packet ID (PID) of this arbitrary channel from, the PSI/SI (PAT/PMT).

The CPU 221, flash ROM 222, DRAM 223, demultiplexer 216, Ethernet interface 224, and recording unit interface 218 are connected to the internal bus 217. The DVD/BD drive 219 and HDD 220 are connected to the internal bus 217 via the recording unit interface 218. The DVD/BD drive 219 and HDD 220 record the partial TS extracted at the demultiplexer 216. Also, each of the DVD/BD drive 219 and HDD 220 plays the partial TS recorded in a recording medium.

The MPEG decoder 227 obtains video data by subjecting a video PES packet making up the partial TS extracted at the demultiplexer 216, or played at the DVD/BD drive 219 or HDD 220 to decode processing. Also, the MPEG decoder 227 obtains audio data by subjecting an audio PES packet making up this partial TS to decode processing.

The graphics generating circuit 228 subjects the video data obtained at the MPEG decoder 227 to graphics data convolution processing or the like as appropriate. The video output terminal 229 outputs the video data output from the graphics generating circuit 228. The audio output terminal 230 outputs the audio data obtained at the MPEG decoder 227.

The DTCP circuit 226 encrypts the partial TS extracted at the demultiplexer 216, or the partial TS played at the DVD/BD drive 219 or HDD 220 as appropriate. Also, the DTCP circuit 226 decrypts the encrypted data supplied from the network terminal 225 or high-speed data line interface 213 to the Ethernet interface 224.

The CPU 221 controls the operation of each unit of the disk recorder 210. The flash ROM 222 executes storing of control software, and storing of data. The DRAM 223 makes up a work area of the CPU 221. The CPU 221 renders the software and data read out from the flash ROM 222 onto the DRAM 223, activates the software to control each unit of the disk recorder 210.

The operation of the disk recorder 210 shown in FIG. 2 will be described briefly.

The television broadcast signal input to the antenna terminal 214 is supplied to the digital tuner 215. With this digital tuner 215, the television broadcast signal is subjected to processing to extract a predetermined transport stream, and this predetermined transport stream is supplied to the demultiplexer 216. With the demultiplexer 216, the partial TS (TS packet of video data, TS packet of audio data) corresponding to a predetermined channel is extracted from the transport stream. This partial TS is supplied to the DVD/BD drive 219 or HDD 220 via the recording unit interface 218, and is recorded therein based on a recording instruction from the CPU 221.

Also, as described above, the partial TS extracted at the demultiplexer 216, or the partial TS played at the DVD/BD drive 219 or HDD 220 is supplied to the MPEG decoder 227. With this MPEG decoder 227, the video PES packet made up of a TS packet of video data is subjected to decode processing, and video data is obtained. This video data is subjected to graphics data convolution processing or the like at the graphics generating circuit 228, and is then output to the video output terminal 229. Also, with the MPEG decoder 227, the audio PES packet made up of a TS packet of audio data is subjected to decode processing, and audio data is obtained. This audio data is output to the audio output terminal 230.

The video (image) data and audio data obtained at the MPEG decoder 227 corresponding to the partial TS played at the DVD/BD drive 219 or HDD 220 is supplied to the HDMI transmission unit 212, and is transmitted to an HDMI cable connected to the HDMI terminal 211.

With the high-speed data line interface 213, an IP packet including a remote control code transmitted via the predetermined lines of the HDMI cable connected to the HDMI terminal 211 is received. This IP packet is supplied to the CPU 221 via the Ethernet interface 224. In the case that the remote control code included in this IP packet relates to the control of the disk recorder 210, the CPU 221 controls each unit of the disk recorder 210 based on this remote control code.

Also, in the event that the partial TS extracted at the demultiplexer 216, or the partial TS played at the DVD/BD drive 219 or HDD 220 is transmitted to a network, this partial TS is encrypted at the DTCP circuit 226, and is then output to the network terminal 225 via the Ethernet interface 224.

Figure 3:
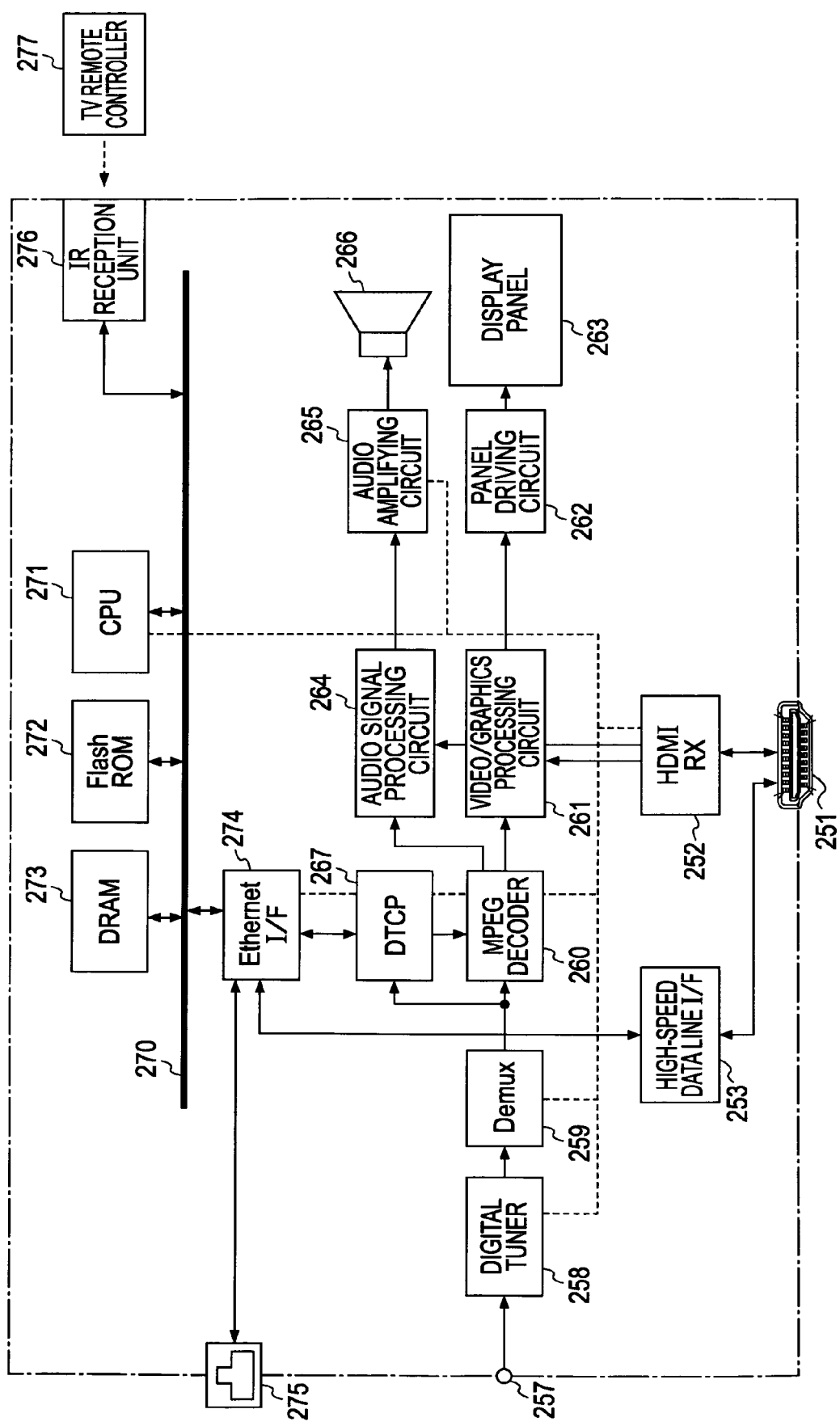
FIG. 3 is a block diagram illustrating a configuration example of a television receiver (sink device) making up the AV system.

FIG. 3 illustrates a configuration example of the television receiver 250. This television receiver 250 includes an HDMI terminal 251, an HDMI reception unit 252, a high-speed data line interface 253, an antenna terminal 257, a digital tuner 258, a demultiplexer 259, an MPEG (Moving Picture Expert Group) decoder 260, a video/graphics processing unit 261, a panel driving circuit 262, a display panel 263, an audio signal processing circuit 264, an audio amplifying circuit 265, a speaker 266, a DTCP circuit 267, an internal bus 270, a CPU 271, flash ROM 272, DRAM 273, an Ethernet interface (Ethernet I/F) 274, a network terminal 275, a remote control reception unit 276, and a remote control transceiver 277.

The antenna terminal 257 is a terminal for inputting the television signal received at a reception antenna (not shown). The digital tuner 258 subjects the television broadcast signal input to the antenna terminal 257 to processing, and outputs the predetermined transport stream corresponding to the channel selected by the user. The demultiplexer 259 extracts the partial TS (Transport Stream) (TS Packet of Video Data, TS Packet of Audio Data) corresponding to the channel selected by the user from the transport stream obtained at the digital tuner 258.

Also, the demultiplexer 259 extracts PSI/SI (Program Specific Information/Service Information) from the transport stream obtained at the digital tuner 258, and outputs this to the CPU 271. With the transport stream obtained at the digital tuner 258, multiple channels are multiplexed. The processing for extracting the partial TS of an arbitrary channel from this transport stream at the demultiplexer 259 can be executed by obtaining the information of the packet ID (PID) of this arbitrary channel from the PSI/SI (PAT/PMT).

The MPEG decoder 260 subjects the video PES (Packetized Elementary Stream) packet made up of the TS packets of the video data obtained at the demultiplexer 259 to decode processing, thereby obtaining video data. Also, the MPEG decoder 260 subjects the audio PES packet made up of the TS packets of the audio data obtained at the demultiplexer 259, thereby obtaining audio data. Note that this MPEG decoder 260 subjects the video and audio PES packets obtained by being decrypted at the DTCP circuit 267 to decode processing as appropriate, thereby obtaining video data and audio data.

The video/graphics processing circuit 261 subjects the video data obtained at the MPEG decoder 260 to multi screen processing, graphics data convolution processing, or the like as appropriate. The panel driving circuit 262 drives the display panel 263 based on the video data output from the video/graphics processing circuit 261. The display panel 263 is configured of, for example, an LCD (Liquid Crystal Display), PDP (Plasma Display Panel), or the like. The audio signal processing circuit 264 subjects the audio data obtained at the MPEG decoder 260 to necessary processing such as D/A conversion or the like. The audio amplifying circuit 265 amplifies the audio signal output from the audio signal processing circuit 264, and supplies this to the speaker 266.

The DTCP circuit 267 encrypts the partial TS extracted at the demultiplexer 259 as appropriate. Also, the DTCP circuit 267 decrypts the encrypted data supplied from the network terminal 275 or high-speed data line interface 253 and 256 to the Ethernet interface 274.

The CPU 271 controls the operation of each unit of the television receiver 250. The flash ROM 272 executes storing of control software, and storing of data. The DRAM 273 makes up a work area of the CPU 271. The CPU 271 renders the software and data read out from the flash ROM 272 onto the DRAM 273, activates the software to control each unit of the television receiver 250. The remote control reception unit 276 receives the remote control signal (remote control code) transmitted from the remote control transceiver 277, and supplies this to the CPU 271. The CPU 271, flash ROM 272, DRAM 273, and Ethernet interface 274 are connected to the internal bus 270.

The HDMI reception unit (HDMI sink) 252 receives baseband video (image) and audio data supplied to the HDMI terminal 251 by communication conforming to HDMI. The details of this HDMI reception unit 252 will be described later. The high-speed data line interface 253 is a bidirectional communication interface using predetermined lines making up an HDMI cable (a reserve line and an HPD line in the present embodiment). The details of this high-speed data line interface 253 will be described later.

The operation of the television receiver 250 shown in FIG. 3 will be described briefly.

The television broadcast signal input to the antenna terminal 157 is supplied to the digital tuner 258. With this digital tuner 258, the television broadcast signal is subjected to processing, the predetermined transport stream corresponding to the channel selected by the user is output, and this predetermined transport stream is supplied to the demultiplexer 259. With this demultiplexer 259, the partial TS (TS packet of video data, TS packet of audio data) corresponding to the channel selected by the user is extracted from the transport stream, and this partial TS is supplied to the MPEG decoder 260.

With the MPEG decoder 260, the video PES packet made up of a TS packet of video data is subjected to decode processing, thereby obtaining video data. This video data is subjected to multi screen processing, graphics data convolution processing, or the like at the video/graphics processing circuit 261 as appropriate, and is then supplied to the panel driving circuit 262. Therefore, the image corresponding to the channel selected by the user is displayed on the display panel 263.

Also, with the MPEG decoder 260, the audio PES packet made up of a TS packet of audio data is subjected to decode processing, thereby obtaining audio data. This audio data is subjected to necessary processing such as D/A conversion or the like at the audio signal processing circuit 264, and further, is amplified at the audio amplifying circuit 265, and is then supplied to the speaker 266. Therefore, the audio corresponding to the channel selected by the user is output from the speaker 266.

In the event that the partial TS extracted at the demultiplexer 259 is transmitted to a network at the time of receiving the above television broadcast signal, this partial TS is encrypted at the DTCP circuit 267, and is then output to the network terminal 275 via the Ethernet interface 274.

With the remote control reception unit 276, the remote control code (remote control signal) transmitted from the remote control transceiver 277 is received, and this remote control code is supplied to the CPU 271. In the case that the remote control code relates to the control of the television receiver 250, the CPU 271 controls each unit of the television receiver 250 based on this remote control code.

Also, with the CPU 271, an IP packet including the remote control code supplied from the remote control reception unit 276 is generated. This IP packet is output to the HDMI terminal 251 via the Ethernet interface 274 and high-speed line interface 253.

Also, this IP packet is transmitted to the network as appropriate. In this case, this IP packet is output to the network terminal 275 via the Ethernet interface 274. Also, this IP packet is output to the HDMI terminal 251 via the Ethernet interface 274 and high-speed data line interface 253.

Note that the encrypted partial TS supplied from the network terminal 275 to the Ethernet interface 274, or supplied from the HDMI terminal 251 to the Ethernet interface 274 via the high-speed data line interface 253, is decrypted at the DTCP circuit 267, and is then supplied to the MPEG decoder 260. Hereafter, the operation of the television receiver 250 is the same operation as at the time of receiving the above television broadcast signal, where an image is displayed on the display panel 263, and audio is output from the speaker 266.

Also, with the HDMI reception unit 252, the video (image) data and audio data input to the HDMI terminal 251 via the HDMI cable is obtained. This video data and audio data is each supplied to the video/graphics processing circuit 261 and the audio signal processing circuit 264. Hereafter, the operation of the television receiver 250 is the same operation as at the time of receiving the above television broadcast signal, where an image is displayed on the display panel 263, and audio is output from the speaker 266.

Figure 4:
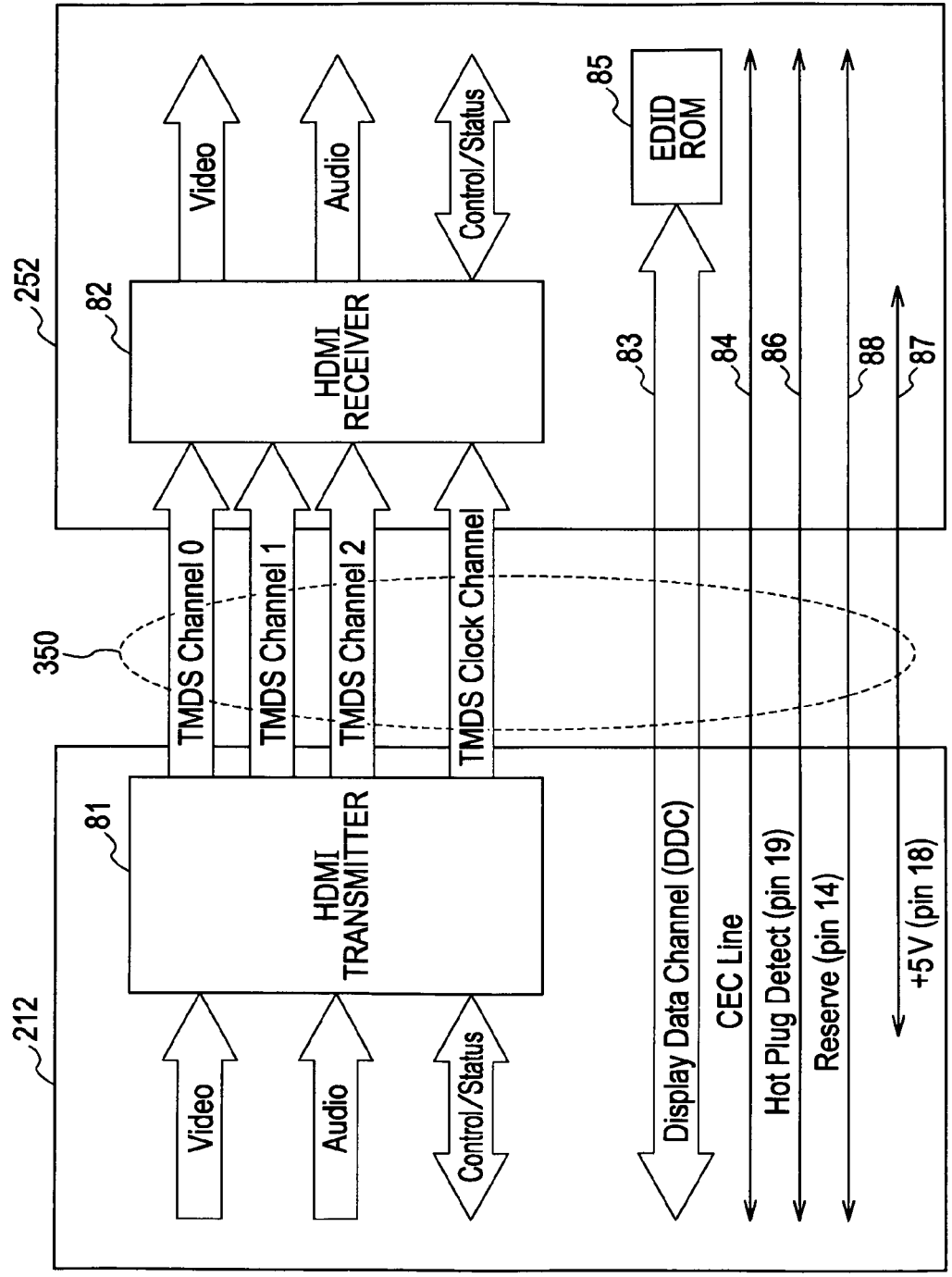
FIG. 4 is a block diagram illustrating a configuration example of an HDMI transmission unit (HDMI source) and an HDMI reception unit (HDMI sink).

FIG. 4 illustrates a configuration example of the HDMI transmission unit (HDMI source) 212 of the disk recorder 210, and the HDMI reception unit (HDMI sink) 252 of the television receiver 250 with the AV system 200 in FIG. 1.

The HDMI source 212 transmits the differential signals corresponding to the pixel data of uncompressed one screen worth of image to the HDMI sink 252 in one direction using multiple channels during a valid image section wherein a horizontal retrace line section and a vertical retrace line section are removed from a section from a vertical synchronizing signal to the next vertical synchronizing signal (hereafter, also referred to as "active video section" as appropriate), and also transmits the differential signals corresponding to at least audio data along with the image, control data, other auxiliary data, and the like along with the image to the HDMI sink 252 in one direction using multiple channels during a horizontal retrace line section and a vertical retrace line section.

That is to say, the HDMI source 212 includes a transmitter 81. The transmitter 81 converts, for example, the pixel data of an uncompressed image to the corresponding differential signals, and serially transmits these to the HDMI sink 252 connected thereto via the HDMI cable 350 in one direction using three TMDS channels #0, #1, and #2, which are multiple channels.

Also, the transmitter 81 converts audio data along with an uncompressed image, and further, necessary control data, other auxiliary data, and the like into the corresponding differential signals, and serially transmits these to the HDMI sink 252 connected thereto via the HDMI cable 350 in one direction using the three TMDS channels #0, #1, and #2.

Further, the transmitter 81 transmits the pixel clock synchronized with the pixel data to be transmitted using the three TMDS channels #0, #1, and #2 to the HDMI sink 252 connected thereto via the HDMI cable 350 using a TMDS clock channel. Here, with one of the TMDS channel #i (i=0, 1, 2), the pixel data of 10 bits is transmitted during one clock of the pixel clock.

The HDMI sink 252 receives the differential signals corresponding to pixel data, transmitted from the HDMI source 212 in one direction using multiple channels during an active video section, and also receives the differential signals corresponding to audio data and control data, transmitted from the HDMI source 212 in one direction during a horizontal retrace line section and a vertical retrace line section.

That is to say, the HDMI sink 252 includes a receiver 82. The receiver 82 receives the differential signals corresponding to pixel data, transmitted in one direction from the HDMI source 212 connected thereto via the HDMI cable 350 using the TMDS channels #0, #1, and #2, in sync with the pixel clock transmitted similarly from the HDM source 212 using the TMDS clock channel.

The transmission channels of the HDMI system made up of the HDMI source 212 and the HDMI sink 252 include, in addition to the three TMDS channels #0 through #2 serving as transmission channels for serially transmitting pixel data and audio data in one direction in sync with the pixel clock, and the TMDS clock channel serving as a transmission channel for transmitting the pixel clock, transmission channels referred to as a DDC (Display Data Channel) 83 and a CEC line 84.

The DDC 83 is made up of two unshown signal lines included in the HDMI cable 350, and is used for the HDMI source 212 reading out E-EDID (Enhanced Extended Display Identification Data) from the HDMI sink 252 connected thereto via the HDMI cable 350.

That is to say, the HDMI sink 252 includes, in addition to the HDMI receiver 81, EDID ROM (Read Only Memory) 85 which stores E-EDID that is performance information relating to the performance (configuration/capability) of itself. The HDMI source 212 reads out the E-EDID of this HDMI sink 252 from the HDMI sink 252 connected thereto via the HDMI cable 350, via the DDC 83, and recognizes the settings of the performance of the HDMI sink 252, i.e., for example, the format (profile) of the image corresponding to the electronic equipment including the HDMI sink 252, for example, RGB, YCbCr4:4:4, YCbCr4:2:2, or the like.

The CEC line 84 is made up of a single signal line not shown included in the HDMI cable 350, and is used for executing the bidirectional communication of data for control between the HDMI source 212 and the HDMI sink 252.

Also, the HDMI cable 350 includes a line (HPD line) 86 connected to a pin called HPD (Hot Plug Detect). A source device uses this line 86, whereby connection of a sink device can be detected. Also, the HDMI cable 350 includes a line 87 used for supplying power from a source device to a sink device. Further, the HDMI cable 351 includes a reserve line 88.

Figure 5:
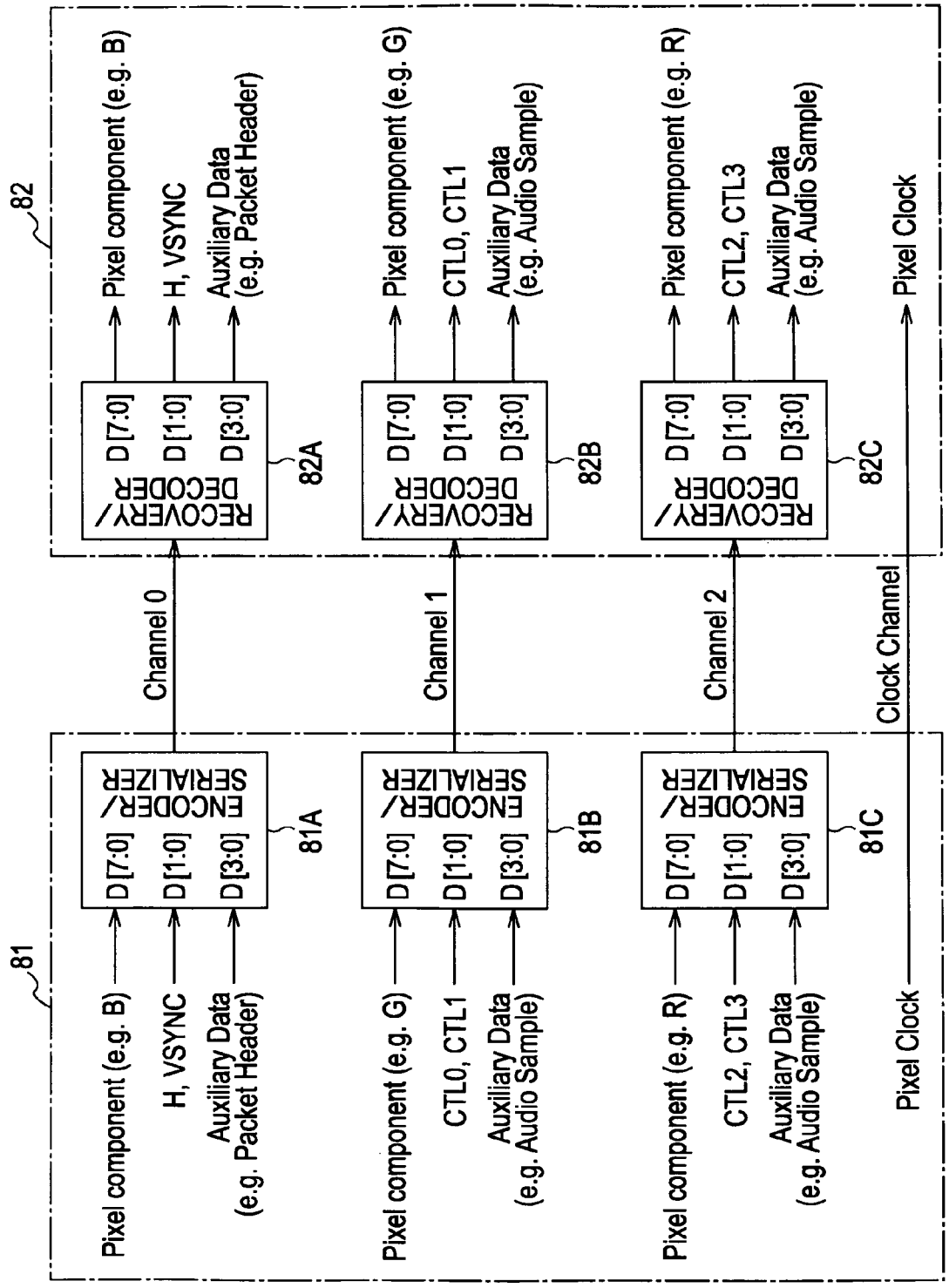
FIG. 5 is a block diagram illustrating a configuration example of an HDMI transmitter and an HDMI receiver.

FIG. 5 illustrates a configuration example of the HDMI transmitter 81 and the HDMI receiver 82 in FIG. 4.

The transmitter 81 includes three encoders/serializers 81A, 81B, and 81C corresponding to the three TMDS channels #0, #1, and #2, respectively. Each of the encoders/serializers 81A, 81B, and 81C encodes image data, auxiliary data, and control data supplied thereto, converts this from parallel data to serial data, and transmits this using a differential signal. Here, in the case that the image data includes, for example, three components of R (Red), G (Green), and B (Blue), the B component is supplied to the encoder/serializer 81A, the G component is supplied to the encoder/serializer 81B, and R component is supplied to the encoder/serializer 81C.

Also, examples of the auxiliary data include audio data and control packet, the control packet is supplied to, for example, the encoder/serializer 81A, and the audio data is supplied to the encoders/serializers 81B and 81C.

Further, examples of the control data include a 1-bit vertical synchronizing signal (VSYNC), a 1-bit horizontal synchronizing signal (HSYNC), and 1-bit control bits CTL0, CTL1, CTL2, and CTL3. The vertical synchronizing signal and the horizontal synchronizing signal are supplied to the encoder/serializer 81A. The control bits CTL0 and CTL 1 are supplied to the encoder/serializer 81B, and the control bits CTL2 and CTL 3 are supplied to the encoder/serializer 81C.

The encoder/serializer 81A transmits the B component of image data, vertical synchronizing signal and horizontal synchronizing signal, and auxiliary data supplied thereto, in a time-sharing manner. That is to say, the encoder/serializer 81A takes the B component of image data supplied thereto as parallel data in increments of 8 bits that are the number of fixed bits. Further, the encoder/serializer 81A encodes the parallel data thereof to convert this into serial data, and transmits this using the TMDS channel #0.

Also, the encoder/serializer 81A encodes the 2-bit parallel data of a vertical synchronizing signal and a horizontal signal supplied thereto to convert this into serial data, and transmits this using the TMDS channel #0. Further, the encoder/serializer 81A takes the auxiliary data supplied thereto as parallel data in increments of 4 bits. Further, the encoder/serializer 81A encodes the parallel data thereof to convert this into serial data, and transmits this using the TMDS channel #0.

The encoder/serializer 81B transmits the G component of image data supplied thereto, control bits CTL0 and CTL1, and auxiliary data supplied thereto in a time-sharing manner. That is to say, the encoder/serializer 81B takes the G component of image data supplied thereto as parallel data in increments of 8 bits, this being the number of fixed bits. Further, the encoder/serializer 81B encodes the parallel data thereof to convert this into serial data, and transmits this using the TMDS channel #1.

Also, the encoder/serializer 81B encodes the 2-bit parallel data of the control bits CTL0 and CTL1 supplied thereto to convert this into serial data, and transmits this using the TMDS channel #1. Further, the encoder/serializer 81B takes the auxiliary data supplied thereto as parallel data in increments of 4 bits. The encoder/serializer 81B encodes the parallel data thereof to convert this into serial data, and transmits this using the TMDS channel #1.

The encoder/serializer 81C transmits the R component of image data, control bits CTL2 and CTL3, and auxiliary data supplied thereto in a time-sharing manner. That is to say, the encoder/serializer 81C takes the R component of image data supplied thereto as parallel data in increments of 8 bits, this being the number of fixed bits. Further, the encoder/serializer 81C encodes the parallel data thereof to convert this into serial data, and transmits this using the TMDS channel #2.

Also, the encoder/serializer 81C encodes the 2-bit parallel data of the control bits CTL2 and CTL3 supplied thereto to convert this into serial data, and transmits this using the TMDS channel #2. Further, the encoder/serializer 81C takes the auxiliary data supplied thereto as parallel data in increments of 4 bits. The encoder/serializer 81C encodes the parallel data thereof to convert this into serial data, and transmits this using the TMDS channel #2.

The receiver 82 includes three recoveries/decoders 82A, 82B, and 82C corresponding to the three TMDS channels #0, #1, and #2, respectively. Each of the recoveries/decoders 82A, 82B, and 82C receive image data, auxiliary data, and control data transmitted using differential signals with the TMDS channels #0, #1, and #2. Further, each of the recoveries/decoders 82A, 82B, and 82C converts the image data, auxiliary data, and control data from serial data to parallel data, further decodes this, and outputs this.

That is to say, the recovery/decoder 82A receives the B component of image data, vertical synchronizing signal and horizontal synchronizing signal, and auxiliary data transmitted using differential signals with the TMDS channel #0. Subsequently, the recovery/decoder 82A converts the B component of the image data, vertical signal and horizontal signal, and auxiliary data from serial data to parallel data, decodes this, and outputs this.

The recovery/decoder 82B receives the G component of image data, control bits CTL0 and CTL1, and auxiliary data transmitted using differential signals with the TMDS channel #1. Subsequently, the recovery/decoder 82B converts the G component of the image data, control bits CTL0 and CTL1, and auxiliary data thereof from serial data to parallel data, decodes this, and outputs this.

The recovery/decoder 82C receives the R component of image data, control bits CTL2 and CTL3, and auxiliary data transmitted using differential signals with the TMDS channel #2. Subsequently, the recovery/decoder 82C converts the R component of the image data, control bits CTL2 and CTL3, and auxiliary data thereof from serial data to parallel data, decodes this, and outputs this.

Figure 6:
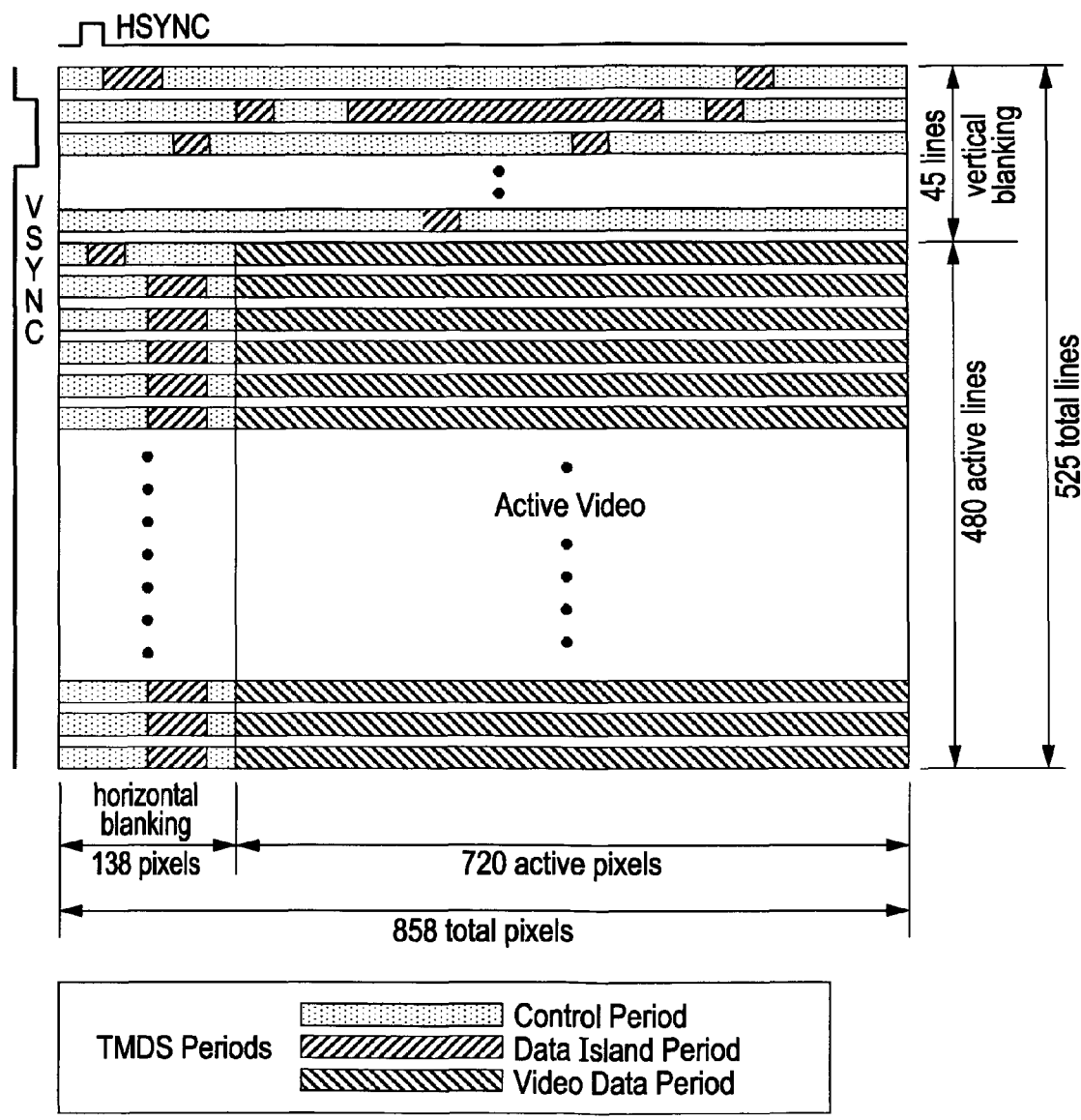
FIG. 6 is a diagram illustrating the structure of TMDS transmission data.

FIG. 6 illustrates an example of a transmission section (period) wherein various types of transmission data are transmitted using the three TMDS channels #0, #1, and #2 of HDMI. Note that FIG. 6 illustrates the sections of various types of transmission data in the case that a progressive image of which the vertical×width is 720×480 pixels is transmitted with the TMDS channels #0, #1, and #2.

With a video field where transmission data is transmitted with the three TMDS channels #0, #1, and #2 of HDMI, there are three types of sections according to the type of transmission data; video data section (Video Data period), data island section (Data Island period), and control section (Control period).

Here, the video field section is a section from the leading edge (active edge) of a certain vertical synchronizing signal to the leading edge of the next vertical synchronizing signal, and is divided into a horizontal blanking period (horizontal blanking), a vertical blanking period (vertical blanking), and an active video section (Active Video) which is the video field section from which the horizontal blanking period and the vertical blanking period are removed.

The video data section is assigned to the active video section. During this video data section, the data of 720 pixels× 480 lines worth of valid pixels (Active pixel) making up one screen worth of uncompressed image data is transmitted.

The data island section and the control section are assigned to the horizontal blanking period and the vertical blanking period. During this data island section and the control section, auxiliary data (Auxiliary data) is transmitted.

That is to say, the data island section is assigned to a portion of the horizontal blanking period and the vertical blanking period. During this data island section, of the auxiliary data, data not relating to control, e.g., a packet of audio data or the like is transmitted.

The control section is assigned to another portion of the horizontal blanking period and the vertical blanking period. During this control section, of the auxiliary data, data relating to control, e.g., the vertical synchronizing signal and horizontal synchronizing signal, control packet, or the like is transmitted.

Here, with the current HDMI, the frequency of the pixel clock transmitted with the TMDS clock channel is, for example, 165 MHz, and in this case, the transmission rate of the data island section is approximately 500 Mbps.

FIG. 7 illustrates the pin arrays of the HDMI terminals 211 and 251. These pin arrays are called type A (type-A).

Two lines which are differential lines where TMDS Data #i+ and TMDS Data #i− serving as the differential signals of the TMDS channel #i are connected to pins to which the TMDS Data #i+ is assigned (pins of which the pin numbers are 1, 4, and 7), and pins to which the TMDS Data #i− is assigned (pins of which the pin numbers are 3, 6, and 9).

Also, the CEC line 84, where the CEC signal which is data for control is transmitted, is connected to a pin of which the pin number is 13, and a pin of which the pin number is 14 is an empty (reserved) pin. Also, a line where an SDA (Serial Data) signal such as an E-EDID signal or the like is transmitted is connected to a pin of which the pin number is 16, and a line where an SCL (Serial Clock) signal that is a clock signal used for synchronization at the time of transmission/reception of the SDA signal is transmitted is connected to a pin of which the pin number is 15. The above DDC 83 is made up of a line where the SDA signal is transmitted, and a line where the SCL signal is transmitted.

Also, an HPD line 86 used for a source device detecting connection of a sink device as described above is connected to a pin of which the pin number is 19. Also, a line 87 used for supplying power as described above is connected to a pin of which the pin number is 18.

Figure 8:
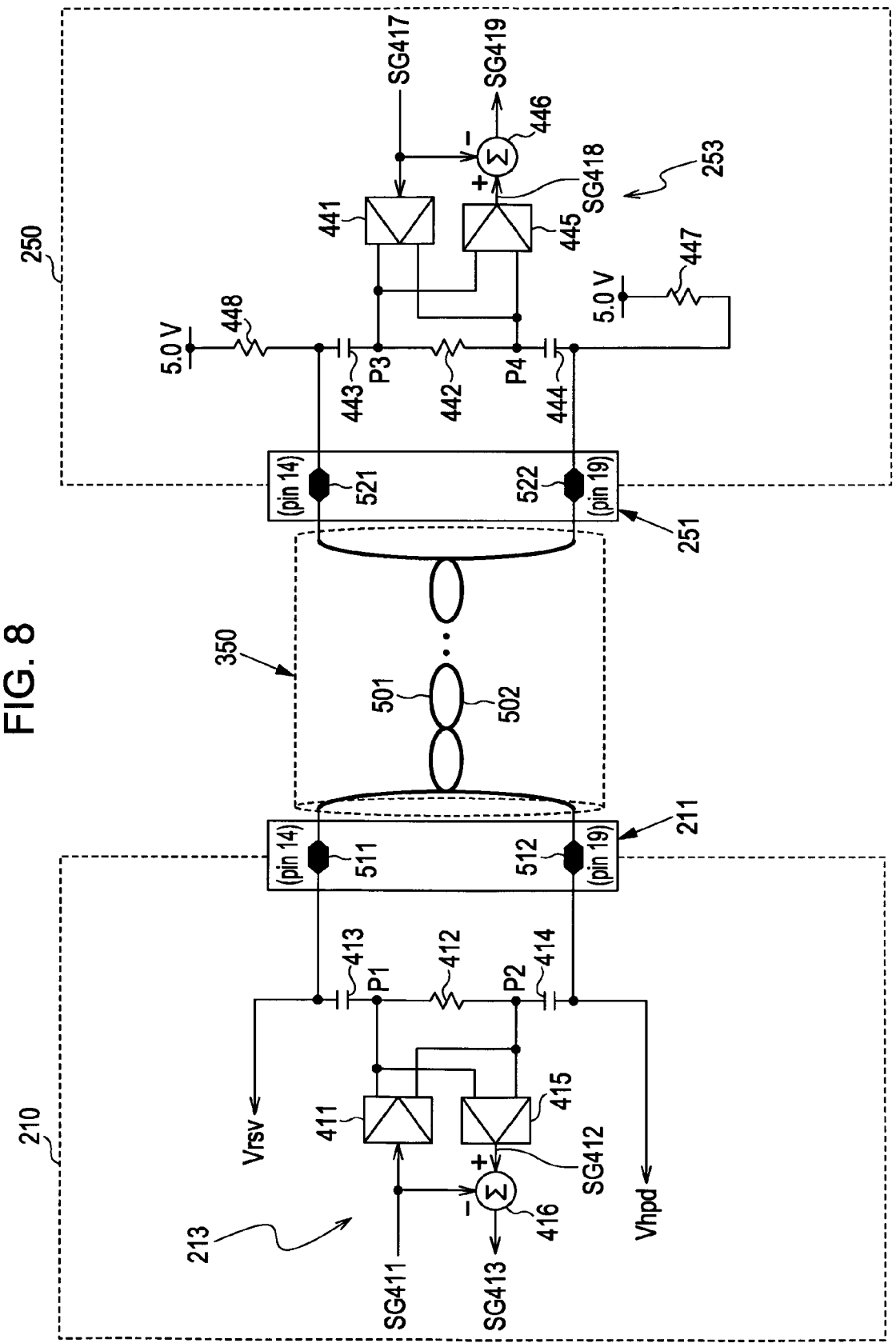
FIG. 8 is a connection diagram illustrating a configuration example of a high-speed data line interface of the disk recorder and the television receiver.

FIG. 8 illustrates a configuration example of the high-speed data line interface 213 of the disk recorder 210, and the high-speed data line interface 253 of the television receiver 250. These interface 213 and 253 make up a communication unit configured to execute LAN (Local Area Network) communication. This communication unit executes bidirectional communication using, of the multiple lines making up the HDMI cable 350, a pair of differential lines, and with the present embodiment, a reserve line (Ether− line) corresponding to an empty (reserve) pin (pin 14), and an HPD line (Ether+ line) corresponding to the HPD pin (pin 19).

The disk recorder 210 includes a LAN signal transmission circuit 411, a terminating resistor 412, an AC coupling capacitances 413 and 414, a LAN signal reception circuit 415, and a subtraction circuit 416, which make up the high-speed data line interface 213.

A series circuit of the AC coupling capacitance 413, terminating resistor 412, and AC coupling capacitance 414 is connected between the pin 14 and pin 19 of the HDMI terminal 211. A mutual connection point P1 of the AC coupling capacitance 413 and the terminating resistor 412 is connected to the positive output side of the LAN signal transmission circuit 411, and is also connected to the positive input side of the LAN signal reception circuit 415. Also, a mutual connection point P2 of the AC coupling capacitance 414 and the terminating resistor 412 is connected to the negative output side of the LAN signal transmission circuit 411, and is also connected to the negative input side of the LAN signal reception circuit 415. The input side of the LAN signal transmission circuit 411 is supplied with a transmission signal (transmission data) SG411.

Also, the positive side terminal of the subtraction circuit 416 is supplied with the output signal SG412 of the LAN signal reception circuit 415, and the negative side terminal of this subtraction circuit 416 is supplied with a transmission signal (transmission data) SG411. With this subtraction circuit 416, the transmission signal SG411 is subtracted from the output signal SG412 of the LAN signal reception circuit 415, and a reception signal (reception data) SG413 is obtained.

The television receiver 250 includes a LAN signal transmission circuit 441, a terminating resistor 442, an AC coupling capacitances 443 and 444, a LAN signal reception circuit 445, and a subtraction circuit 446, which make up the high-speed data line interface 253. Also, the television receiver 250 includes pull-up resistors 447 and 448.

A series circuit of the AC coupling capacitance 443, terminating resistor 442, and AC coupling capacitance 444 is connected between the pin 14 and pin 19 of the HDMI terminal 251. A mutual connection point P3 of the AC coupling capacitance 443 and the terminating resistor 442 is connected to the positive output side of the LAN signal transmission circuit 441, and is also connected to the positive input side of the LAN signal reception circuit 445. Also, a mutual connection point P4 of the AC coupling capacitance 444 and the terminating resistor 442 is connected to the negative output side of the LAN signal transmission circuit 441, and is also connected to the negative input side of the LAN signal reception circuit 445. The input side of the LAN signal transmission circuit 441 is supplied with a transmission signal (transmission data) SG417.

Also, the positive side terminal of the subtraction circuit 446 is supplied with the output signal SG418 of the LAN signal reception circuit 445, and the negative side terminal of this subtraction circuit 446 is supplied with a transmission signal (transmission data) SG417. With this subtraction circuit 446, the transmission signal SG417 is subtracted from the output signal SG418 of the LAN signal reception circuit 445, and a reception signal (reception data) SG419 is obtained.

The pin 19 of the HDMI terminal 251 is connected to a power supply line (+5.0V) via a pull-up resistor 447. Also, this television receiver 250 is an eHDMI-compatible device, and accordingly, the pin 14 of the HDMI terminal 251 is connected to the power supply line (+5.0V) via the pull-up resistor 448.

A reserve line 501 and an HPD line 502 included in the HDMI cable 350 make up a differential twist pair. The source side edge 511 of the reserve line 501 is connected to the 14 pin of the HDMI terminal 211, and the sink side edge 521 of this reserve line 501 is connected to the 14 pin of the HDMI terminal 251. Also, the source side edge 512 of the HPD line 502 is connected to the 19 pin of the HDMI terminal 211, and the sink side edge 522 of this HPD line 502 is connected to the 19 pin of the HDMI terminal 251.

Next, the operation of LAN communication with the high-speed data line interfaces 213 and 253 configured as described above will be described.

With the disk recorder 210, the transmission signal (transmission data) SG411 is supplied to the input side of the LAN signal transmission circuit 411, and the differential signals corresponding to the transmission signal SG411 (positive output signal, negative output signal) are output from this LAN signal transmission circuit 411. Subsequently, the differential signals output from the LAN signal transmission circuit 411 are supplied to the connection points P1 and P2, and are transmitted to the television receiver 250 via the pair line of the HDMI cable 350 (reserve line 501, HPD line 502).

Also, with the television receiver 250, the transmission signal (transmission data) SG417 is supplied to the input side of the LAN signal transmission circuit 441, and the differential signals corresponding to the transmission signal SG417 (positive output signal, negative output signal) are output from this LAN signal transmission circuit 441. Subsequently, the differential signals output from the LAN signal transmission circuit 441 are supplied to the connection points P3 and P4, and are transmitted to the disk recorder 210 via the pair line of the HDMI cable 350 (reserve line 501, HPD line 502).

Also, with the disk recorder 210, the input side of the LAN signal reception circuit 415 is connected to the connection points P1 and P2, and accordingly, an addition signal is obtained from the transmission signal corresponding to the differential signal (current signal) output from the LAN signal transmission circuit 411, and the reception signal corresponding to the differential signal to be transmitted from the television receiver 250 as described above, as the output signal SG412 of this LAN signal reception circuit 415. With the subtraction circuit 416, the transmission signal SG411 is subtracted from the output signal SG412 of the LAN signal reception circuit 415. Therefore, the output signal SG413 of this subtraction circuit 416 corresponds to the transmission signal (transmission data) SG417 of the television receiver 250.

Also, with the television receiver 250, the input side of the LAN signal reception circuit 445 is connected to the connection points P3 and P4, and accordingly, an addition signal is obtained from the transmission signal corresponding to the differential signal (current signal) output from the LAN signal transmission circuit 441, and the reception signal corresponding to the differential signal to be transmitted from the disk recorder 210 as described above, as the output signal SG418 of this LAN signal reception circuit 445. With the subtraction circuit 446, the transmission signal SG417 is subtracted from the output signal SG418 of the LAN signal reception circuit 445. Therefore, the output signal SG419 of this subtraction circuit 446 corresponds to the transmission signal (transmission data) SG411 of the disk recorder 210.

Thus, bidirectional LAN communication can be executed between the high-speed data line interface 213 of the disk recorder 210, and the high-speed data line interface 253 of the television receiver 250.

Note that, with the television receiver 250, the pin 19 of the HDMI terminal 251 is connected to the power supply line (+5.0V). Therefore, when the television receiver 250 is connected to the disk recorder 210 via the HDMI cable 350, the voltage Vhpd at the pin 19 of the HDMI terminal 211 increases. Accordingly, with the disk recorder 210, whether or not the television receiver 250 has been connected to the disk recorder 210 via the HDMI cable 350 can be detected by monitoring the voltage Vrsv at the pin 19 of the HDMI terminal 211.

Also, with the television receiver 250, the pin 14 of the HDMI terminal 251 is connected to the power supply line (+5.0V). Therefore, when the television receiver 250 is connected to the disk recorder 210 via the HDMI cable 350, the voltage Vhpd at the pin 14 of the HDMI terminal 211 increases. Accordingly, with the disk recorder 210, whether or not the television receiver 250 is an eHDMI-compatible device can be recognized by monitoring the voltage Vhpd at the pin 14 of the HDMI terminal 211.

With the present embodiment, the television receiver 250 can recognize that the disk recorder 210 is an eHDMI-compatible device. The technique thereof will be described below.

For example, when the television receiver 250 is connected to the disk recorder 210 via the HDMI cable 350, the disk recorder 210 transmits function information indicating that it itself is an eHDMI-compatible device, i.e., includes a communication unit (high-speed data line interface 213 or the like) using a communication path made up of the reserve line and the HPD line of the HDMI cable 350, to the television receiver 250. Also, the disk recorder 210 includes transmission format (application) information that the disk recorder 210 can support in this function information.

Here, the transmission format information is information regarding whether supporting only the SPDIF (Sony Philips Digital InterFace) signal, or supporting only the Ethernet signal, or supporting both of the SPDIF signal and the Ethernet signal.

Now, the SPDIF signal will be described briefly. This SPDIF signal is a signal to be transmitted with the SPDIF standard. The SPDIF standard is an interface standard used for transmitting digital audio signals in real time. The SPDIF signal is subjected to biphase mark modulation, and accordingly, includes a clock component within the signal thereof.

Figure 9:
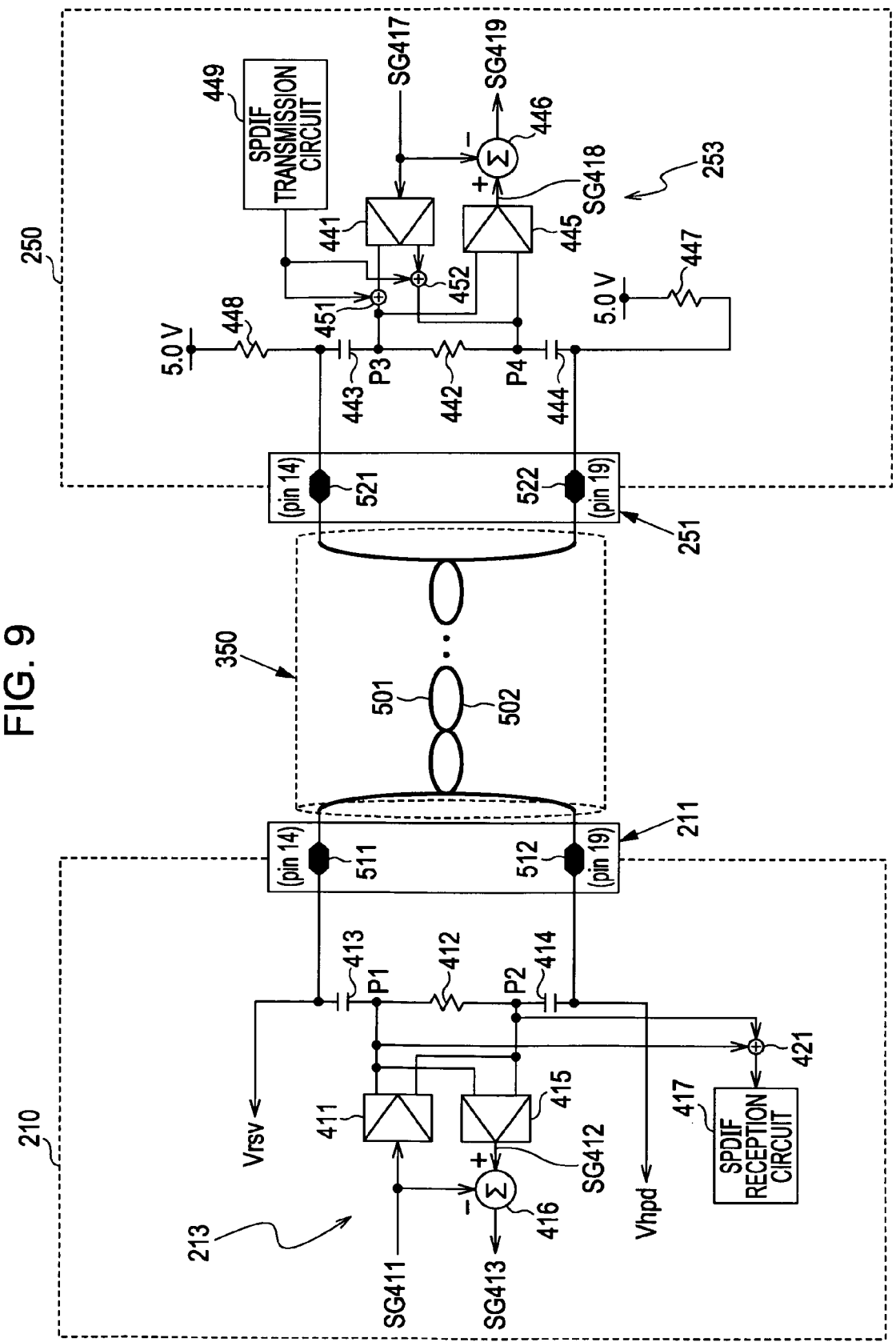
FIG. 9 is a connection diagram illustrating a configuration example of the high-speed data line interface and the like of the disk recorder and the television receiver.

Note that the configuration example of the above FIG. 8 illustrates the case where only the Ethernet signal is supported. In the case of also supporting the SPDIF signal, the configuration example thereof is such as shown in FIG. 9. The television receiver 250 includes a SPDIF transmission circuit 449. The SPDIF signal output from this SPDIF transmission circuit 449 is transmitted to the disk recorder 210 side with the same phase by adders 451 and 452 using the reserve line and the HPD line making up the HDMI cable 350. Here, the SPDIF transmission circuit 449 makes up, in the same way as with the high-speed data line interface 253, a communication unit configured to execute communication using a communication path made up of the reserve line and the HPD line.

Also, the disk recorder 210 includes a SPDIF reception circuit 417. The SPDIF signal transmitted with the same phase from the television receiver 250 side with the reserve line and the HPD line making up the HDMI cable 350 is added at the adder 421, and is supplied to the SPDIF reception circuit 417. Here, the SPDIF reception circuit 417 makes up, in the same way as with the high-speed data line interface 213, a communication unit configured to execute communication using a communication path made up of the reserve line and the HPD line.

Note that, in the case of supporting only the SPDIF signal, with the configuration example shown in FIG. 9, the configuration is changed by removing the high-speed data interfaces 213 and 253 therefrom.

For example, the disk recorder 210 inserts the above function information during the blanking period of the video signal to be transmitted to the television receiver 250 with the above TMDS channel, thereby transmitting this function information to the television receiver 250. Here, the disk recorder 210 uses, for example, the AVI (Auxiliary Video Information) InfoFrame packet of the HDMI to insert the above function information during the blanking period of the video signal.

This AVI InfoFrame packet is disposed during the above data island section. FIG. 10 illustrates the data structure of the AVI InfoFrame packet. With HDMI, according to this AVI InfoFrame packet, auxiliary information relating to an image can be transmitted from a source device to a sink device.

With the present embodiment, the function information is disposed, such as shown in the data structure of the AVI InfoFrame in FIG. 10, in one bit of E1 at the fourth byte (Data Byte 1), and two bits of E2 and E3 at the eighth byte (Data Byte 5) in a hierarchical manner.

E1 that is 1-bit data is data for identifying whether or not an eHDMI-compatible device including a communication unit (high-speed data line interface 213, SPDIF reception circuit 417) configured to execute communication via a communication path made up of the reserve line and the HPD line of the HDMI cable 350. Here, when E1=0, this indicates not being eHDMI-compatible, and when E1=1, this indicates being eHDMI-compatible.

Also, E2 and E3 that are 2-bit data are bit data for identifying whether supporting only the SPDIF signal, supporting only the Ethernet signal, or supporting both the SPDIF signal and the Ethernet signal. For example, when E2=1, and E3=0, this indicates supporting only the SPDIF signal, and when E2=0, and E3=1, this indicates supporting only the Ethernet signal, and when E2=1, and E3=1, this indicates supporting both of the SPDIF signal and the Ethernet signal.

In the case that the disk recorder 210 inserts the function information during the blanking period of the video signal to be transmitted to the television receiver 250 with the TMDS channel as described above, thereby transmitting this function information to the television receiver 250, the television receiver 250 receives this function information by extracting the above function information from the blanking period of the video signal received from the disk recorder 210 with the TMDS channel.

Note that the above description has shown the case where the function information is inserted during the blanking period of a video signal using the AV InfoFrame packet. Though detailed description will be omitted, the function information may be inserted during the blanking period of a video signal even using other packets such as a GCP packet or the like.

Also, for example, the disk recorder 210 transmits the above function information to the television receiver 250 via the CEC line 84 which is the control data line of the HDMI cable 350. In this case, the television receiver 250 receives the function information from the disk recorder 210 via the CEC line 84.

The television receiver 250 receives the function information as described above, whereby whether or not the disk recorder 210 is an eHDMI-compatible device can be recognized, and in the case of an eHDMI-compatible device, the transmission format (application) that the disk recorder 210 can support can be recognized. Note that, as described above, in the case that the function information is transmitted from the disk recorder 210 to the television receiver 250, the HDMI transmission unit 212 of the disk recorder 210 makes up a function information transmission unit, and the HDMI reception unit 252 of the television receiver 250 makes up a function information reception unit.

Note that the above description has shown the case where the television receiver 250 is connected to the disk recorder 210 via the HDMI cable 350, the disk recorder 210 automatically transmits the function information to the television receiver 250. However, an arrangement may be made wherein a transmission request for this function information is transmitted from the television receiver 250 side to the disk recorder 210, and when receiving this transmission request, the disk recorder 210 transmits the function information to the television receiver 250.

For example, when the television receiver 250 executes switching of HDMI input at the time of power-on, or the like, the television receiver 250 transmits this transmission request to the disk recorder 210 via the CEC line 84. In this case, the HDMI reception unit 253 of the television receiver 250 makes up a function information requesting unit, and the HDMI transmission unit 213 of the disk recorder 210 makes up a transmission request reception unit.

Thus, in the case that the television receiver 250 transmits a transmission request to the disk recorder 210, the television receiver 250 can confirm at arbitrary timing (e.g., at the time of power-on, at the time of input switching, or the like) whether or not the disk recorder 210 is an eHDMI-compatible device, and further the transmission format (application) that the disk recorder 210 can support can be confirmed.

The above description has shown an example wherein the function information is transmitted from the disk recorder 210 to the television receiver 250. Conversely, it can be conceived that the function information is transmitted from the television receiver 250 to the disk recorder 210, in the same way as described above. In this case, the function information cannot be transmitted by inserting this during the blanking period of a video signal, but the function information can transmit via the CEC line 84 which is the control data line. In this case, the HDMI transmission unit 212 of the disc recorder 210 makes up a function information reception unit, and the HDMI reception unit 252 of the television receiver 250 makes up a function information transmission unit.

Now, transmission/reception of the function information using the CEC line (CEC channel) will be described. With this CEC line, transmission of control data can be executed bidirectionally between a source device and a sink device. With the present invention, the above function information is transmitted from a source device to a sink device, or from a sink device to a source device as the CEC (Consumer Electronics Control) data or CDC (Capability Discovery Channel) data.

FIG. 11 illustrates the structure of CEC data to be transmitted with the CEC line. With the CEC line, one block made up of 10-bit data is transmitted for 4.5 milliseconds. A start bit is disposed at the head, subsequently thereto, a header block is disposed, and thereafter, an arbitrary number (n) of data blocks including desired data to be transmitted are disposed. The function information is included in the data blocks.

FIG. 12 is a diagram illustrating a structure block of the header block. With the header block, the logical address (Logical Address) of a source (Initiator), and the logical address (Logical Address) of a destination (Destination) are disposed. Each logical address is set according to the type of each device.

FIG. 13 illustrates logical addresses to be set according to the type of each device. As shown in FIG. 13, 16 types of address values from "0" to "15" are set for each type of device. With the logical address of a source (Initiator) and the logical address of a destination (Destination) making up the header block in FIG. 12, the corresponding address values are disposed with four bits.

Next, the CDC data will be described. The CDC is defined so as to have the same physical layer as the CEC, but so as to have a logical layer different from the CEC. The structure of the CDC data is not shown in the drawing, but is of the same data structure as the data structure of the CEC shown in FIG. 11, wherein a start bit is disposed at the head, subsequently thereto, a header block is disposed, and thereafter, an arbitrary number (n) of data blocks including desired data to be transmitted are disposed.

Also, the structure of the header block of the CDC data is not shown in the drawing, but is the same as the header block of the CEC data shown in FIG. 12 structurally. However, "15" is constantly used as the logical address of a source (Initiator), and the logical address of a destination (Destination) making up the header block, regardless of the type of device. That is to say, with regard to a source (Initiator), unknown (Unregistered) is used, and with regard to a destination (Destination), broadcast (Broadcast) is used.

Thus, with the transmission of the CDC data, "15" is used as the logical addresses (Logical Address) of an initiator and a destination to be disposed in the head block, and accordingly, the logical address of each device does not have to be obtained. The message according to the CDC data (CDC message) is a broadcast message of which the initiator is unknown for the CEC, and accordingly, from which device to which device this message is addressed is not known.

Therefore, with the CDC message, in order to identify a physical connection path, the physical addresses (Physical Address) of a source (Initiator) and a destination (Target) are included without fail in a message to be disposed in the data block. That is to say, at the time of transmission of the CDC message, logical addresses are not used, and physical addresses are used.

With the CEC, a message to the effect that <Feature Abort> "it is incompatible" cannot be returned regarding broadcast messages. Therefore, this situation is taken into consideration, and accordingly, let us say that a message is returned without fail as the CDC.

[CDC Message]

Here, as command messages to be disposed in the data block of the CDC data, an <Exchange Supported Channels Info> message, and an <Activate Supported Channels> message are defined. The <Exchange Supported Channels Info> message is a message used at the time of exchanging the function information between two devices. Also, the <Activate Supported Channels> message is a message used at the time of confirming a channel (transmission format) to be activated actually between two devices, and starting communication. Each message has a data structure such as the following.

TABLE 1

| <Exchange Supported Channels Info> | | |
|---|---|---|
| [Physical Address] | 2 bytes | : PA of Initiator |
| [Physical Address] | 2 bytes | : PA of Target |
| [Supported Channels] | 1 byte | |
| [Audio Return Channel] | 1 bit | : if initiator supports this channel, set this "1", else "0". |
| [Ethernet Channel] | 1 bit | : if initiator supports this channel, set this "1", else "0". |
| [reserved] | 6 bits (=000000) | |

TABLE 1-continued

<Activate Supported Channels>

| [Physical Address] | 2 bytes | : PA of Initiator |
| --- | --- | --- |
| [Physical Address] | 2 bytes | : PA of Target |
| [Supported Channels] | 1 byte | |
| [Audio Return Channel] | 1 bit | : if initiator wants to activate this channel, set this "1". |
| | | : if initiator wants to de-activate this channel, set this "0". |
| [Ethernet Channel] | 1 bit | : if initiator wants to activate this channel, set this "1". |
| | | : if initiator wants to de-activate this channel, set this "0". |
| [reserved] | 6 bits (=000000) | |

The <Exchange Supported Channels Info> message will be described. This <Exchange Supported Channels Info> message has data of five bytes of a first byte through a fifth byte. The physical address (Physical Address) of a source (Initiator) is disposed in the first and second byte, and the physical address (Physical Address) of a destination (Target) is disposed in the third and fourth bytes.

Also, the function information of the source (Initiator) is disposed in the fifth byte. This function information is information indicating that it itself is an eHDMI-compatible device, and includes a channel that it itself can support, i.e., the information of a transmission format (application) that the it can support itself.

One bit of the fifth byte, e.g., the seventh bit (most significant bit) indicates that it itself is an eHDMI-compatible device, and whether or not supporting the transmission format (application) of the above SPDIF signal, i.e., whether or not supporting the [Audio Return Channel]. One bit of the fifth byte is set to "1" when supporting this, and is set to "0" when not supporting this.

Also, another one bit of the fifth byte, e.g., the sixth bit indicates that it itself is an eHDMI-compatible device, and whether or not supporting the transmission format (application) of the Ethernet signal, i.e., whether or not supporting the [Ethernet Channel]. Another one bit of the fifth byte is set to "1" when supporting this, and is set to "0" when not supporting this.

Also, the remaining six bits of the fifth byte, e.g., the fifth bit through the zero'th bit are set to reserved bits, and are all set to "0".

Next, the <Activate Supported Channels> message will be described. This <Activate Supported Channels> message includes data of five bytes of the first byte through the fifth byte. The physical address (Physical Address) of a source (Initiator) is disposed in the first and second byte, and the physical address (Physical Address) of a destination (Target) is disposed in the third and fourth bytes.

Also, the information of a channel (transmission format) that the source (Initiator) asks for activation is disposed in the fifth byte. One bit of the fifth byte, e.g., the seventh bit indicates whether or not it itself asks for communication of the SPDIF signal, i.e., activation of the channel of the [Audio Return Channel]. One bit of this fifth byte is set to "1" when asking for activation, and is set to "0" when not asking for activation.

Also, another one bit of the fifth byte, e.g., the sixth bit indicates whether or not it itself asks for communication of the Ethernet signal, i.e., activation of the channel of the [Ethernet Channel]. Another one bit of the fifth byte is set to "1" when asking for activation, and is set to "0" when not asking for activation.

Also, the remaining six bits of the fifth byte, e.g., the fifth bit through the zero'th bit are set to reserved bits, and are all set to "0".

The rule of the above <Exchange Supported Channels Info> message and <Activate Supported Channels> message are defined such as the following. That is to say, when a certain CDC device broadcasts the <Exchange Supported Channels Info> message, the CDC device having the physical address of a destination included in the message thereof broadcasts the <Exchange Supported Channels Info> message including the information (parameters) of itself.

Also, when a certain CDC device broadcasts the <Activate Supported Channels> message, the CDC device having the physical address (Physical Address) of a destination included in the message thereof broadcasts the <Activate Supported Channels> message including the information (parameters) of itself. Further, with the function information exchanged with the <Exchange Supported Channels Info> message, of the channels of the [Audio Return Channel] and the [Ethernet Channel], when there is a channel (transmission format) supported by both, communication by the channel thereof can be executed between two devices.

Note that the CDC device means an eHDMI-compatible device that can support CDC data <Exchange Supported Channels Info> message, <Activate Supported Channels> message, and the like. On the other hand, the Non-CDC device means an eHDMI-compatible device that cannot support CDC data <Exchange Supported Channels Info> message, <Activate Supported Channels> message, and the like.

[Exchange Sequence]

Figure 14:
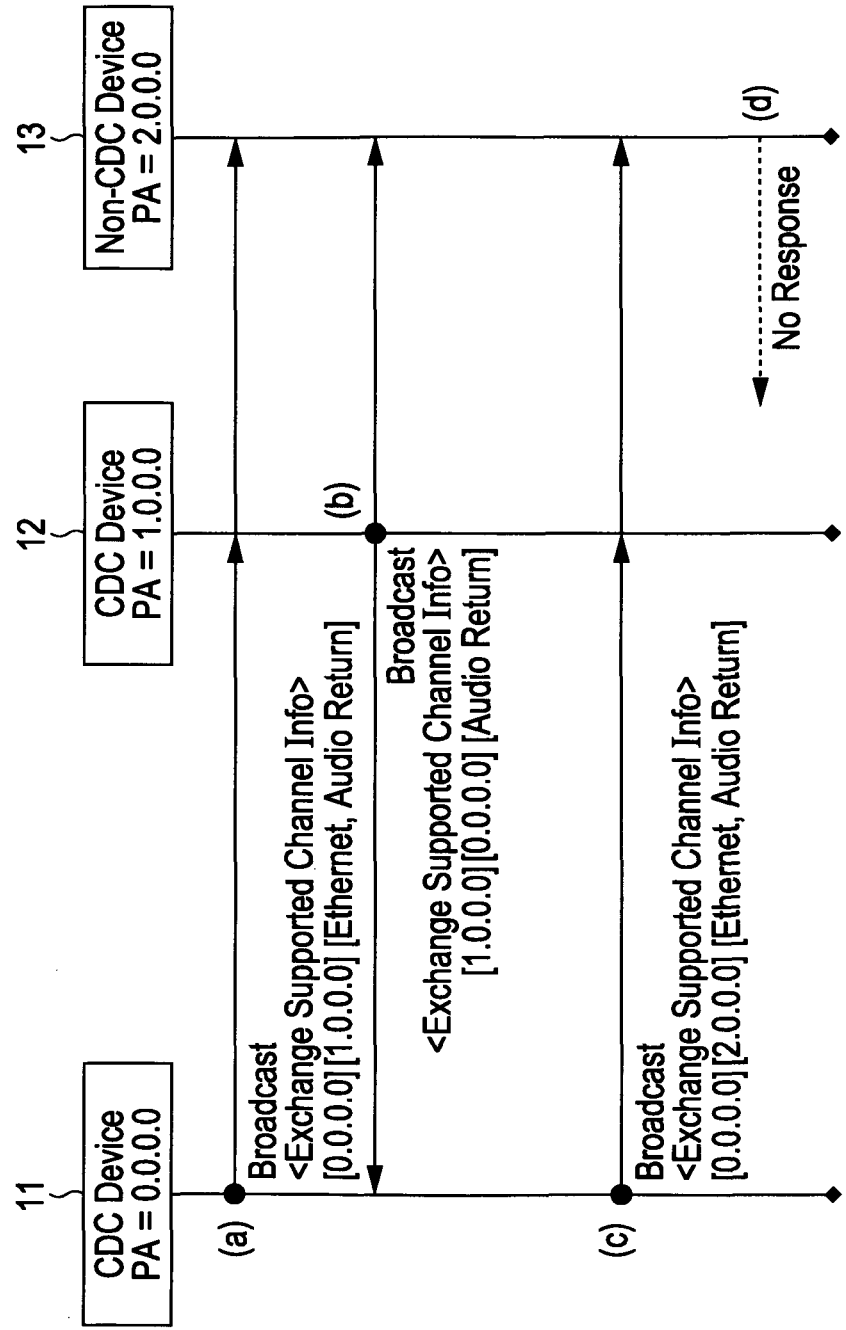
FIG. 14 is a sequence diagram for describing an example of use of an <Exchange Supported Channels Info> message.
Figure 15:
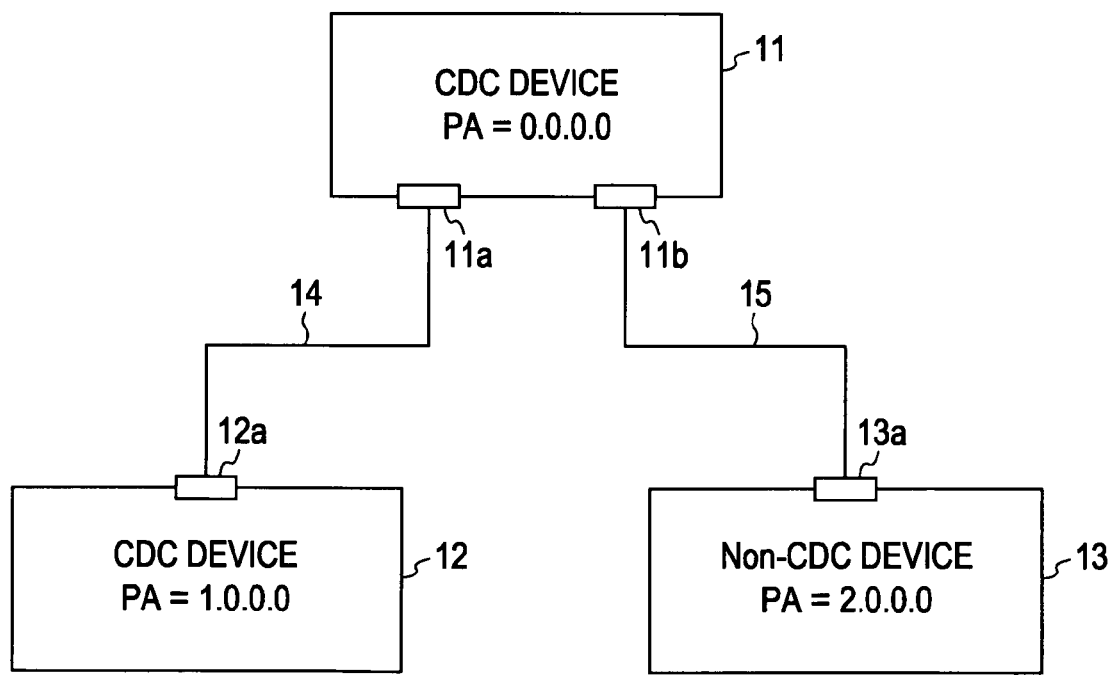
FIG. 15 is a diagram illustrating a device configuration example of the AV system.

Next, an example of use of the <Exchange Supported Channels Info> message will be described with reference to the sequence diagram in FIG. 14. Note that this case assumes an AV system 10 of the device configuration shown in FIG. 15. That is to say, the AV system 10 is configured of CDC devices 11 and 12, and a Non-CDC device 13. The HDMI terminal 11a of the CDC device 11, and the HDMI terminal 12a of the CDC device 12 are connected via an HDMI cable 14. Also, the HDMI terminal 11b of the CDC device 11, and the HDMI terminal 13a of the Non-CDC device 13 are connected via an HDMI cable 15. Also, the physical address (Physical Address) of the CDC device 11 is [0.0.0.0], the physical address (Physical Address) of the CDC device 12 is [1.0.0.0], and the physical address (Physical Address) of the Non-CDC device 13 is [2.0.0.0].

Returning to FIG. 14, (a) the CDC device 11 broadcasts the <Exchange Supported Channels Info> message to exchange the function information with the CDC device 12. The physical address of the source (Initiator) is set to [0.0.0.0], and the physical address of the destination (Target) is set to [1.0.0.0], which are included in the <Exchange Supported Channels Info> message. Also, the CDC device 11 includes the function information of itself in the <Exchange Supported Channels Info> message. For example, this <Exchange Supported Channels Info> message indicates that both channels of the [Audio Return Channel] and the [Ethernet Channel] are supported.

(b) The CDC device 12 broadcasts the <Exchange Supported Channels Info> message since the physical address of a destination included in the <Exchange Supported Channels Info> message broadcasted from the CDC device 11 is the physical address [1.0.0.0] of itself. The physical address of the source (Initiator) is set to [1.0.0.0], and the physical address of the destination (Target) is set to [0.0.0.0], which are included in the <Exchange Supported Channels Info> message. Also, the CDC device 12 includes the function information of itself in the <Exchange Supported Channels Info> message. For example, this <Exchange Supported Channels Info> message indicates that both channels of the [Audio Return Channel] and the [Ethernet Channel] are supported.

Thus, the <Exchange Supported Channels Info> message is transmitted/received between the CDC device 11 and the CDC device 12, whereby the mutual function information, i.e., information indicating whether or not an eHDMI-compatible device, and whether or not the [Audio Return Channel] or [Ethernet Channel] is supported, is exchanged.

(C) The CDC device 11 broadcasts the <Exchange Supported Channels Info> message to exchange the function information with the Non-CDC device 13. The physical address of the source (Initiator) is set to [0.0.0.0], and the physical address of the destination (Target) is set to [2.0.0.0], which are included in the <Exchange Supported Channels Info> message. Also, the CDC device 11 includes the function information of itself in the <Exchange Supported Channels Info> message. For example, this <Exchange Supported Channels Info> message indicates that both channels of the [Audio Return Channel] and the [Ethernet Channel] are supported.

(d) The Non-CDC device 13 does not react at all even if the physical address of a destination included in the <Exchange Supported Channels Info> message broadcasted from the CDC device 11 is the physical address [2.0.0.0] of itself. In this case, with a 2-second limiting rule, when there has been no reaction even if two seconds elapses, the CDC device 11 recognizes that the Non-CDC device 13 does not support both channels of the [Audio Return Channel] and the [Ethernet Channel].

[Active/Inactive Sequence]

Figure 16:
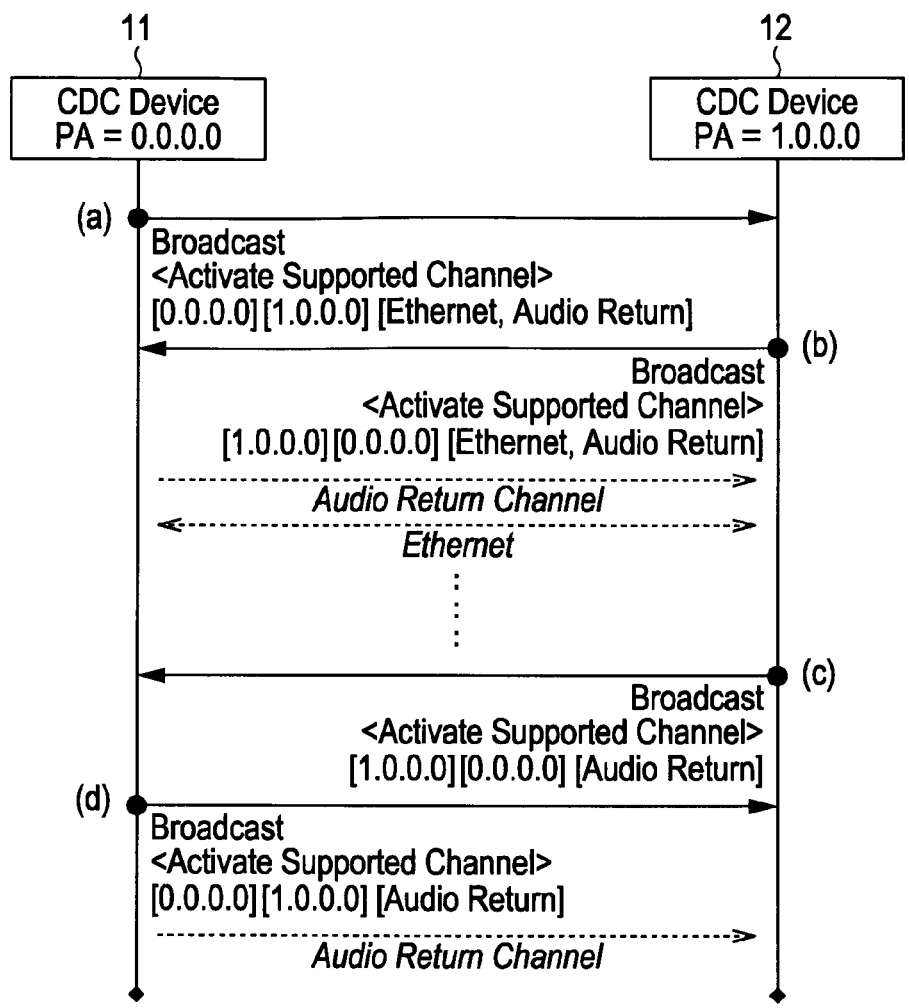
FIG. 16 is a sequence diagram for describing an example of use of an <Active Supported Channels> message.

Next, an example of use of the <Active Supported Channels> message will be described with reference to the sequence diagram in FIG. 16. Note that this case assumes a case where, with the AV system 10 having the device configuration shown in FIG. 15, as described above, communication is executed between the CDC device 11 and the CDC device 12 which have exchanged the function information using the <Exchange Supported Channels Info> message.

(a) The CDC device 11 broadcasts the <Active Supported Channels> message to confirm the channel (transmission format) to be asked for activation actually so as to start communication with the CDC device 12. The physical address of the source (Initiator) is set to [0.0.0.0], and the physical address of the destination (Target) is set to [1.0.0.0], which are included in this <Active Supported Channels> message. Also, the CDC device 11 disposes the information of the channel (transmission format) which it itself asks for activation, in this <Active Supported Channels> message. For example, this <Active Supported Channels> message indicates that activation for both channels of the [Audio Return Channel] and the [Ethernet Channel] is requested.

(b) The CDC device 12 broadcasts the <Active Supported Channels> message since the physical address of the destination included in the <Active Supported Channels> message broadcasted from the CDC device 11 is the physical address [1.0.0.0] of itself. The physical address of the source (Initiator) is set to [1.0.0.0], and the physical address of the destination (Target) is set to [0.0.0.0], which are included in this <Active Supported Channels> message. Also, the CDC device 12 disposes the information of the channel (transmission format) wherein it itself agrees with the request for activation, in this <Active Supported Channels> message. For example, this <Active Supported Channels> message indicates that the request for activation of both channels of the [Audio Return Channel] and the [Ethernet Channel] is approved.

Thus, the <Active Supported Channels> message is transmitted/received between the CDC device 11 and the CDC device 12, whereby both of the CDC device 11 and the CDC device 12 confirm the channel (transmission format) which can be shared and activated, and communication is started. With the example in FIG. 16, both of the CDC device 11 and the CDC device 12 can activate the [Audio Return Channel] and the [Ethernet Channel], and accordingly, both channels (transmission formats) are activated, and communication is started.

(c) Subsequently, for example, in the case of intending to stop the communication of the [Ethernet Channel] to execute Ethernet communication via a network terminal, the CDC device 12 broadcasts the <Active Supported Channels> message. The physical address of the source (Initiator) is set to [1.0.0.0], and the physical address of the destination (Target) is set to [0.0.0.0], which are included in this <Active Supported Channels> message. Also, this <Active Supported Channels> message indicates that the channel (transmission format) which the CDC device 12 itself asks for activation is the channel of the [Audio Return Channel], and the channel of the [Ethernet Channel] is removed.

(d) The CDC device 11 broadcasts the <Active Supported Channels> message since the physical address of the destination included in the <Active Supported Channels> message broadcasted from the CDC device 12 is the physical address [0.0.0.0] of itself. The physical address of the source (Initiator) is set to [0.0.0.0], and the physical address of the destination (Target) is set to [1.0.0.0], which are included in this <Active Supported Channels> message. Also, the CDC device 11 disposes the information of the channel (transmission format) wherein it itself agrees with the request for activation in this <Active Supported Channels> message. For example, this <Active Supported Channels> message indicates that the request for activation of the channel of the [Audio Return Channel] is approved.

Thus, the <Active Supported Channels> message is transmitted/received between the CDC device 11 and the CDC device 12, whereby both of the CDC device 11 and the CDC device 12 reconfirm the channel (transmission format) which can be shared and activated, communication with the channel of the [Ethernet Channel] is stopped, and only communication with the channel of the [Audio Return Channel] is continued.

Figure 17:
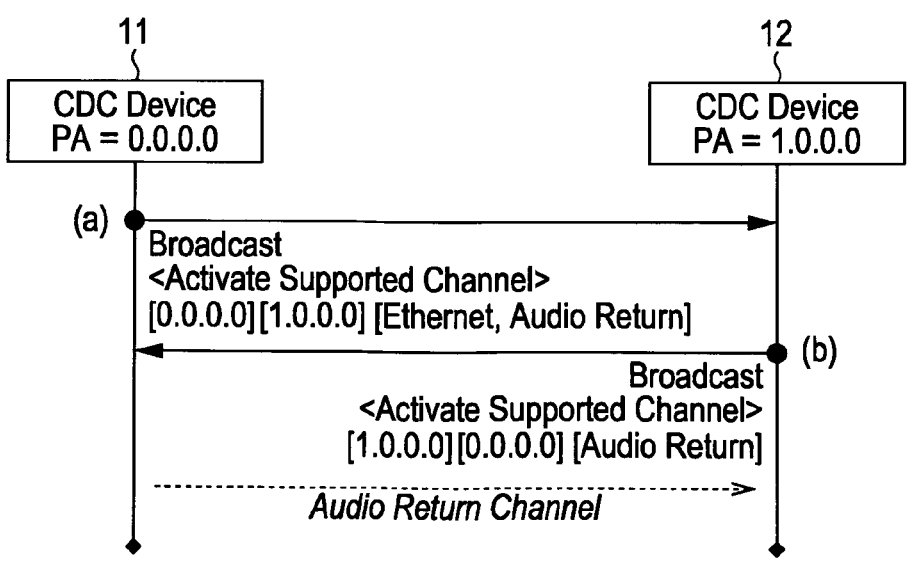
FIG. 17 is a sequence diagram for describing an example of use of an <Active Supported Channels> message.

Next, another example of use of the <Active Supported Channels> message will be described with reference to the sequence diagram in FIG. 17. Note that this case assumes a case where, with the AV system 10 having the device configuration shown in FIG. 15, as described above, communication is executed between the CDC device 11 and the CDC device 12 which have exchanged the function information using the <Exchange Supported Channels Info> message.

(a) The CDC device 11 broadcasts the <Active Supported Channels> message to confirm the channel (transmission format) to be asked for activation actually so as to start communication with the CDC device 12. The physical address of the source (Initiator) is set to [0.0.0.0], and the physical address of the destination (Target) is set to [1.0.0.0], which are included in this <Active Supported Channels> message. Also, the CDC device 11 disposes the information of the channel (transmission format) which it itself asks for activation, in this <Active Supported Channels> message. For example, this <Active Supported Channels> message indicates that activation for both channels of the [Audio Return Channel] and the [Ethernet Channel] is requested.

(b) The CDC device 12 broadcasts the <Active Supported Channels> message since the physical address of the destination included in the <Active Supported Channels> message broadcasted from the CDC device 11 is the physical address [1.0.0.0] of itself. The physical address of the source (Initiator) is set to [1.0.0.0], and the physical address of the destination (Target) is set to [0.0.0.0], which are included in this <Active Supported Channels> message. Also, the CDC device 12 disposes the information of the channel (transmission format) wherein it itself agrees with the request for activation, in this <Active Supported Channels> message. For example, this <Active Supported Channels> message indicates that the request for activation of the channel of the [Audio Return Channel] is approved.

Thus, the <Active Supported Channels> message is transmitted/received between the CDC device 11 and the CDC device 12, whereby both of the CDC device 11 and the CDC device 12 confirm the channel (transmission format) which can be shared and activated, and communication is started. With the example in FIG. 16, the CDC device 11 asks for activation of both channels of the [Audio Return Channel] and the [Ethernet Channel], but the CDC device 12 agrees with activation of only the channel of the [Audio Return Channel], and accordingly, only the channel of the [Audio Return Channel] is activated, and communication is started.

Note that transmission/reception of the above <Active Supported Channels> message is executed, for example, after exchange of the function information is executed using the <Exchange Supported Channels Info> message, and both of the functions are known each other. Thereafter, transmission/reception of the <Active Supported Channels> message is executed at arbitrary timing, such as at the time of change of the desired channel for communication, or the like.

[Improvement of Validity of CDC Message]

As described above, the physical addresses (Physical Address) of the source (Initiator) and the destination (Target) are arranged to be included in the CDC message without fail. For example, in the case that a sink device includes multiple HDMI terminals, with a source device connected to a predetermined port (HDMI terminal) where the HPD signal is "L", the physical address (Physical Address) thereof is unfixed. Thus, when the physical address is unfixed, the validity of the above CDC message decreases. Therefore, in such a case, an example wherein improvement of the validity of the CDC message is realized will be described below.

Example 1

With this example 1, a direct mode (Direct Mode) bit is provided to the <Active Supported Channels> message and the <Exchange Supported Channels Info> message, thereby realizing improvement of the validity of the CDC message. In this case, the <Exchange Supported Channels Info> message and the <Active Supported Channels> message have a data structure, for example, such as shown in the following.

TABLE 2

| <Exchange Supported Channels Info> | | |
|---|---|---|
| [Physical Address] | 2 bytes | : PA of Initiator |
| [Physical Address] | 2 bytes | : PA of Target |
| [Supported Capabilities] | 1 byte | |
| [Direct Mode] | 1 bit | : if initiator supports communication in HPD=L set this "1", else "0". |
| [Audio Return Channel] | 1 bit | : if initiator supports Audio Return Channel, set this "1", else "0". |
| [Ethernet Channel] | 1 bit | : if initiator supports Ethernet Communication, set this "1", else "0". |
| [reserved] | 5 bits (=00000) | |
| <Activate Supported Channels> | | |
| [Physical Address] | 2 bytes | : PA of Initiator |
| [Physical Address] | 2 bytes | : PA of Target |
| [Supported Capabilities] | 1 byte | |
| [Direct Mode] | 1 bit | : indicate Direct Mode (1) or not (0) |
| [Audio Return Channel] | 1 bit | : if initiator wants to activate Audio Return Channel, set this "1". |
| | | : if initiator wants to de-activate Audio Return Channel, set this "0". |
| [Ethernet Channel] | 1 bit | : if initiator wants to activate Ethernet Communication, set this "1". |
| | | : if initiator wants to de-activate Ethernet Communication set this "0". |
| [reserved] | 5 bits (=00000) | |

The <Exchange Supported Channels Info> message will be described. This <Exchange Supported Channels Info> message includes data of five bytes of the first byte through the fifth byte. The physical address (Physical Address) of a source (Initiator) is disposed in the first and second bytes, and the physical address (Physical Address) of a destination (Target) is disposed in the third and fourth bytes.

Also, the function information of the source (Initiator) is disposed in the fifth byte. This function information has information indicating that it itself supports the direct mode. Also, this function information has information indicating that it itself is an eHDMI-compatible device, and includes the information of the channel that it can support itself. That is to say, one bit of the fifth byte, for example, the seventh bit indicates whether or not supporting the direct mode. One bit of this fifth byte is set to "1" when supporting the direct mode, and is set to "0" when not supporting the direct mode.

Also, another one bit of the fifth byte, for example, the sixth bit indicates that it itself is an eHDMI-compatible device, and supports the above SPDIF signal, i.e., whether or not supporting the [Audio Return Channel]. Another bit of the fifth byte is set to "1" when supporting the [Audio Return Channel], and is set to "0" when not supporting the [Audio Return Channel].

Also, another one bit of the fifth byte, for example, the fifth bit indicates that it itself is an eHDMI-compatible device, and whether or not supporting the above Ethernet signal, i.e., whether or not supporting the [Ethernet Channel]. Another bit of the fifth byte is set to "1" when supporting the [Ethernet Channel], and is set to "0" when not supporting the [Ethernet Channel]. Also, the remaining five bits of the fifth byte, e.g., the fourth bit through the zero'th bit are set to reserved bits, and are all set to "0".

Next, the <Active Supported Channels> message will be described. This <Active Supported Channels> message includes data of five bytes of the first byte through the fifth byte. The physical address (Physical Address) of a source (Initiator) is disposed in the first and second bytes, and the physical address (Physical Address) of a destination (Target) is disposed in the third and fourth bytes. Also, information indicating whether or not this message is a message according to the direct mode, and the information of a channel (transmission format) which the source (Initiator) asks for activation, is disposed in the fifth byte.

That is to say, one bit of the fifth byte, e.g., the seventh bit indicates whether or not this message is a message according to the direct mode. This one bit of the fifth byte is set to "1" at the time of a message according to the direct mode, and is set to "0" at the time of not a message according to the direct mode but a common message. Another one bit of the fifth byte, e.g., the sixth bit indicates whether or not it itself asks for communication of the SPDIF signal, i.e., activation of the channel of the [Audio Return Channel]. This other one bit of the fifth byte is set to "1" when asking for activation, and is set to "0" when not asking for activation.

Also, another one bit of the fifth byte, e.g., the fifth bit indicates whether or not it itself asks for communication of the Ethernet signal, i.e., activation of the channel of the [Ethernet Channel]. This other one bit of the fifth byte is set to "1" when asking for activation, and is set to "0" when not asking for activation. Also, the remaining five bits of the fifth byte, e.g., the fourth bit through the zero'th bit are set to reserved bits, and are all set to "0".

As described above, in the case that a direct mode bit is provided to each message, for example, the following operation is executed. That is to say, at the time of exchange of the function information according to the <Active Supported Channels> message, confirmation is made whether or not supporting communication with the HPD signal as "L", i.e., the direct mode. Subsequently, in the case that support for the direct mode has been confirmed, transmission/reception of the <Exchange Supported Channels Info> message is executed in the direct mode.

The source (Initiator) is allowed to transmit the CDC message in the direct mode between two CDC devices which support the direct mode. The source (Initiator) does not transmit the same CDC message to other CDC devices, and also the destination (Target) does not transfer the received CDC message to other CDC devices.

Figure 18:
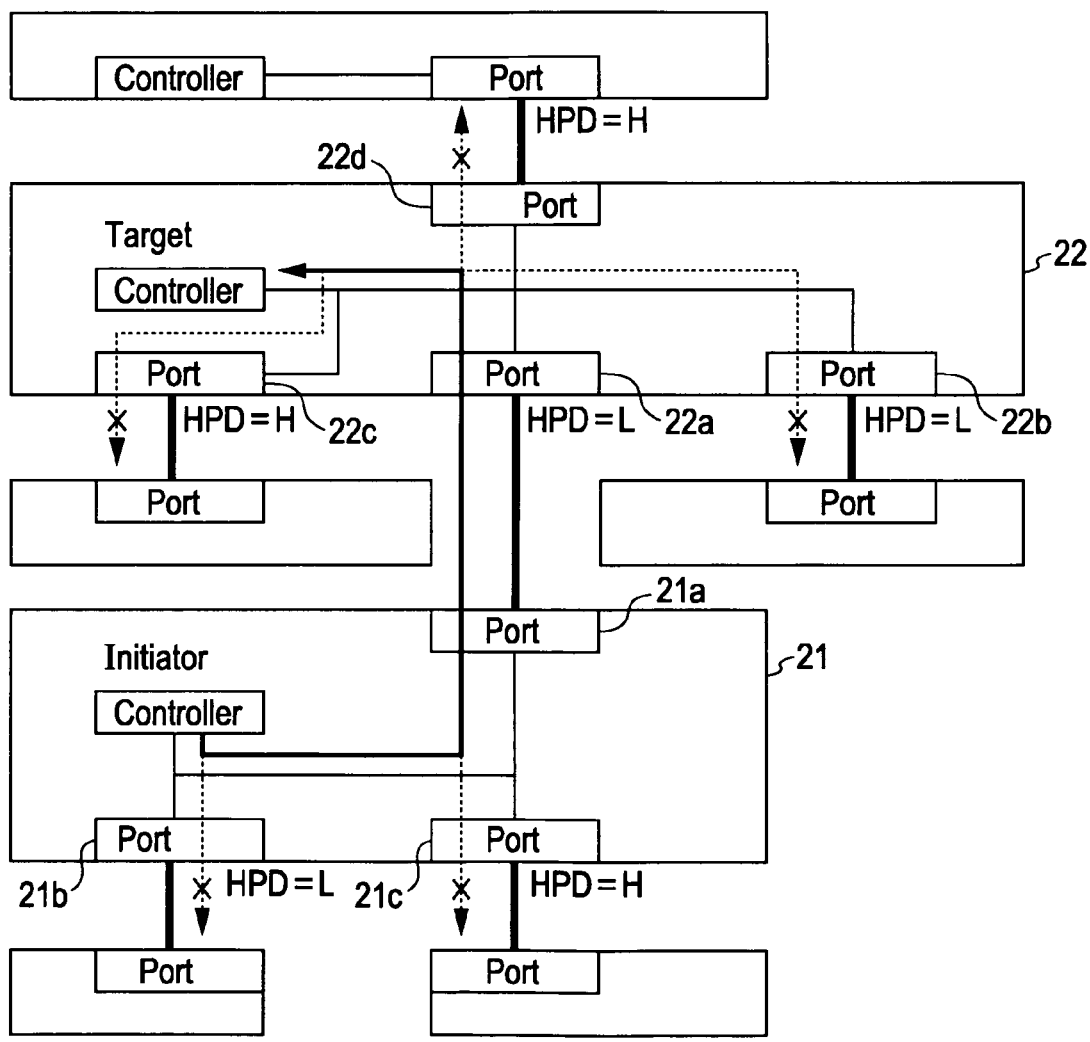
FIG. 18 is a block diagram illustrating a configuration example of the AV system.

For example, let us consider a configuration example of an AV system 20 such as shown in FIG. 18. A CDC device 21 which is a source (Initiator) includes three ports 21a through 21c. A CDC device 22 which is a destination (Target) includes four ports 22a through 22d. The port 21a of the CDC device 21, and the port 22a of the CDC device 22 which is the destination (Target) are connected.

In this case, in the event that the CDC device 21 which is the source (Initiator) transmits the CDC message to the CDC device 22 which is the destination (Target), this CDC device 22 outputs the CDC message to the port 21a, but does not output the same CDC message to the other ports 21b and 21c. Also, the CDC device 21 which is the source (Initiator) does not transfer the CDC message transmitted to the port 22a in the direct mode to the other ports 22b through 22d.

As described above, the CDC device which supports the direct mode has a function for subjecting the CDC message to filtering. However, the method of filtering is an issue of processing within a device, and accordingly, there is no need to be defined as a transmission standard.

As described above, the direction mode is provided, whereby transmission/reception of the CDC message can be executed between two CDC devices alone, and accordingly, even if the HPD signal is "L", and the physical address (Physical Address) of a source device side is unfixed, the validity of the CDC message is not deteriorated.

Example 2

With this Example 2, in addition to the <Active Supported Channels> message and the <Exchange Supported Channels Info> message, a <Request HPD=H> message for requesting that the HPD signal is set to "H" is added, a source device is allowed to read the physical address (Physical Address) of itself from a sink device, thereby realizing improvement of the validity of the CDC message. The <Request HPD=H> message has a data structure, for example, such as shown in the following.

TABLE 3

| <Request HPD=H> | : no operands |
| --- | --- |

A CDC device (source device) wherein the HPD signal is "L", and the physical address (Physical Address) of itself is unfixed, broadcasts the above <Request HPD=H> message. The CDC device which has received the <Request HPD=H> message sequentially sets the HPD signal at each port to "H" at least for a predetermined period of time, e.g., just for five minutes. The CDC device which has broadcasted the <Request HPD=H> message reads out the E-EDID to obtain the physical address of itself during a period while the HPD signal of the port of the CDC device (sink device) connected to itself is "H".

Thus, the CDC device (source device) wherein the HPD signal is "L", and the physical address of itself is unfixed uses the <Request HPD=H> message, whereby the physical address of itself can be obtained and determined, and accordingly, the validity of the CDC message can be improved.

Example 3

With this Example 3 as well, in addition to the <Active Supported Channels> message and the <Exchange Supported Channels Info> message, a <Request HPD=H> message for requesting that the HPD signal is set to "H" is added, a source device is allowed to read the physical address (Physical Address) of itself from a sink device, thereby realizing improvement of the validity of the CDC message.

In the case of the above Example 2, each CDC device which has received the <Request HPD=H> message sequentially sets the HPD signal at each port to "H". Therefore, the CDC device which has output the <Request HPD=H> message has to wait for the HPD signal of the port of the CDC device (sink device) connected to itself to become "H". In this case, if the hierarchy of the CDC device connected to itself is known, and only the CDC devices of this hierarchy set the HPD signal of each port to "H", obtaining of the physical address can be executed rapidly.

Therefore, data for specifying the hierarchy of the physical address to be asked for setting the HPD signal to "H" is added to the <Request HPD=H> message of this Example 3. Also, with this Example 3, a <Report HPD=H> message is added. This <Report HPD=H> message is a CDC message that the CDC device which has set the HPD signal to "H" broadcasts, and includes the physical address of this CDC device. The <Request HPD=H> message and the <Report HPD=H> message have a data structure, for example, such as the following.

TABLE 4

<Request HPD=H>

| [Requested Layer] | 4 bits | : This fields indicate PA layer of the CDC device. |
|---|---|---|
| [A of PA (A.B.C.D)] | 1 bit | : request to x.0.0.0 |
| [B of PA (A.B.C.D)] | 1 bit | : request to z.x.0.0 |
| [C of PA (A.B.C.D)] | 1 bit | : request to z.z.x.0 |
| [D of PA (A.B.C.D)] | 1 bit | : request to z.z.z.x |

<Report HPD=H>

| [Physical Address] | 2 bytes | : PA of HPD=H |
|---|---|---|

The <Request HPD=H> message will be described. This <Request HPD=H> message includes data of four bits of the third bit through the zero'th bit for specifying the hierarchy of the physical address. The third bit is set to "1", and the other bits are set to "0", thereby specifying the first hierarchy (most significant hierarchy) of the physical address. Also, the second bit is set to "1", and the other bits are set to "0", thereby specifying the second hierarchy, or the first and second hierarchies of the physical address. Also, the first bit is set to "1", and the other bits are set to "0", thereby specifying the third hierarchy, or the first through third hierarchies of the physical address. Also, the zero'th bit is set to "1", and the other bits are set to "0", thereby specifying the fourth hierarchy, or the first through fourth hierarchies of the physical address.

Also, the <Report HPD=H> message will be described. This <Report HPD=H> message includes data of two bytes. The physical address of the CDC device of which the HPD signal has been set to "H", i.e., the physical address (Physical Address) of the source (Initiator) is disposed in the two bytes thereof.

Example 4

This Example 4 is an example wherein instead of using the <Request HPD=H> message such as the above Example 2 and Example 3, the voltage of the power supply line is changed, thereby requesting for setting the HPD signal to "H". Specifically, the CDC device (source device) connected to a predetermined port of the CDC device (sink device) of which the HPD signal is "L" temporarily resets the voltage of the power supply line to ground voltage such as shown in FIG. 19(b), and then raises the power supply line to +5V.

Figure 19:
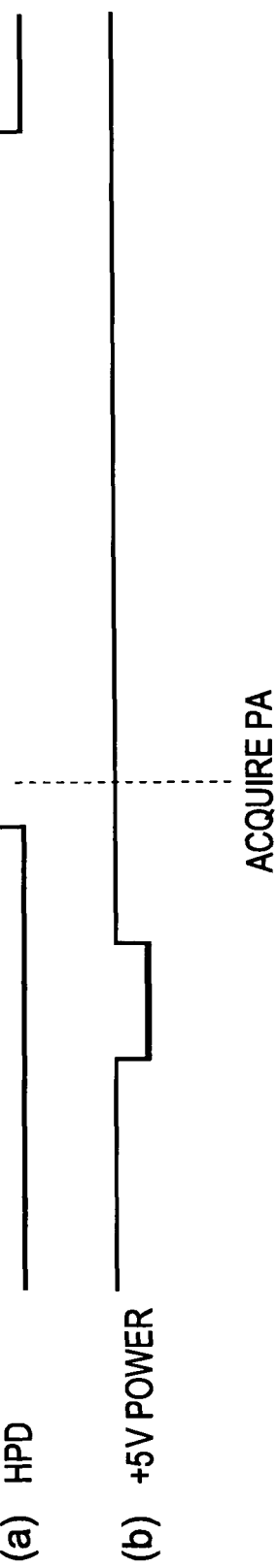
FIG. 19 is a diagram for describing an example wherein an HPD signal is set to "H" by changing the voltage of a power supply line without using a <Request HPD=H> message.

In response to voltage change in this power supply line, the CDC device (sink device) sets the HPD signal at the predetermined port to "H" at least for a predetermined period of time, e.g., just for five minutes, such as shown in FIG. 19(a). Thus, the CDC device (source device) reads out the E-EDID from the CDC device (sink device) while the predetermined port of the HPD signal is "H" to obtain the physical address of itself.

Thus, the CDC device (source device) wherein the HDP signal is "L", and the physical address of itself is unfixed changes the voltage of the power supply line, whereby the physical address of itself can be obtained from the CDC device (sink device) and determined, and accordingly, the validity of the CDC message can be improved.

Note that, with the above description, an arrangement has been made wherein, for example, from the disk recorder 210 to the television receiver 250, the function information is inserted and transmitted during the blanking period of a video signal, or the function information is transmitted via the CEC line 84 which is the control data line, whereby the television receiver 250 side can be allowed to recognize whether or not this disk recorder 210 is an eHDMI-compatible device.

However, an arrangement may be made wherein the voltage of the first line, e.g., the reserve line of the HDMI cable 350 is changed, whereby the function information, and further, compatible transmission format information can be transmitted.

First Example

The disk recorder 210 changes the voltage of the first line, e.g., the reserve line of the HDMI cable 350, thereby notifying the television receiver 250 that it itself is an eHDMI-compatible device.

The television receiver 250 detects the voltage change in the reserve line, thereby obtaining the function information indicating that the disk recorder 210 is an eHDMI-compatible device. In this case, the CPU 271 of the television receiver 250 makes up a function information obtaining unit.

Also, the disk recorder 210 may automatically change the voltage of the reserve line at the time of the television receiver 250 being connected thereto via the HDMI cable 350, or may change the voltage of the reserve line at timing requested from the television receiver 250 side. The disk recorder 210 determines whether or not there has been a request from the television receiver 250 side according to the voltage change of the second line, e.g., the HPD line of the HDMI cable 350. In this case, the CPU 271 of the television receiver 250 makes up a function information requesting unit, and the CPU 221 of the disk recorder 210 makes up a voltage change detecting unit.

Also, the disk recorder 210 can also notify the television receiver 250 of the information of the transmission format (application) that it supports itself by changing the voltage of the reserve line in a pulse shape in addition to that it itself is an eHDMI-compatible device. Here, the transmission format information is information indicating whether or not supporting only the SPDIF signal, whether or not supporting only the Ethernet signal, whether or not supporting both of the SPDIF signal and the Ethernet signal, or the like. In this case, the CPU 271 of the television receiver 250 makes up a format information obtaining unit.

For example, let us define that a pulse count 1 is compatible with only the SPDIF signal, a pulse count 2 is compatible with only the Ethernet signal, and a pulse count 3 is compatible with both of the SPDIF signal and the Ethernet signal.

Also, for example, let us define that the pulse count 1 is compatible with eHDMI (unknown transmission format), the pulse count 2 is compatible with only the SPDIF signal, the pulse count 3 is compatible with only the Ethernet signal, and the pulse count 4 is compatible with both of the SPDIF signal and the Ethernet signal.

Also, for example, let us define that the pulse count 1 is compatible with eHDMI (unknown transmission format), the pulse count 2 is compatible with only the SPDIF signal, the pulse count 3 is compatible with only the Ethernet signal, the pulse count 4 is compatible with both of the SPDIF signal and the Ethernet signal, and the pulse count 5 is reserve.

Thus, in the case that, with the disk recorder 210 side, the voltage of the reserve line is changed in a pulse shape according to the compatible transmission format, the television receiver 250 side can obtain the information of the transmission format that the disk recorder 210 supports based on the pulse count. Note that it can be conceived that the compatible transmission format (application) is represented with the voltage level or pulse phase instead of the pulse count.

Figure 20:
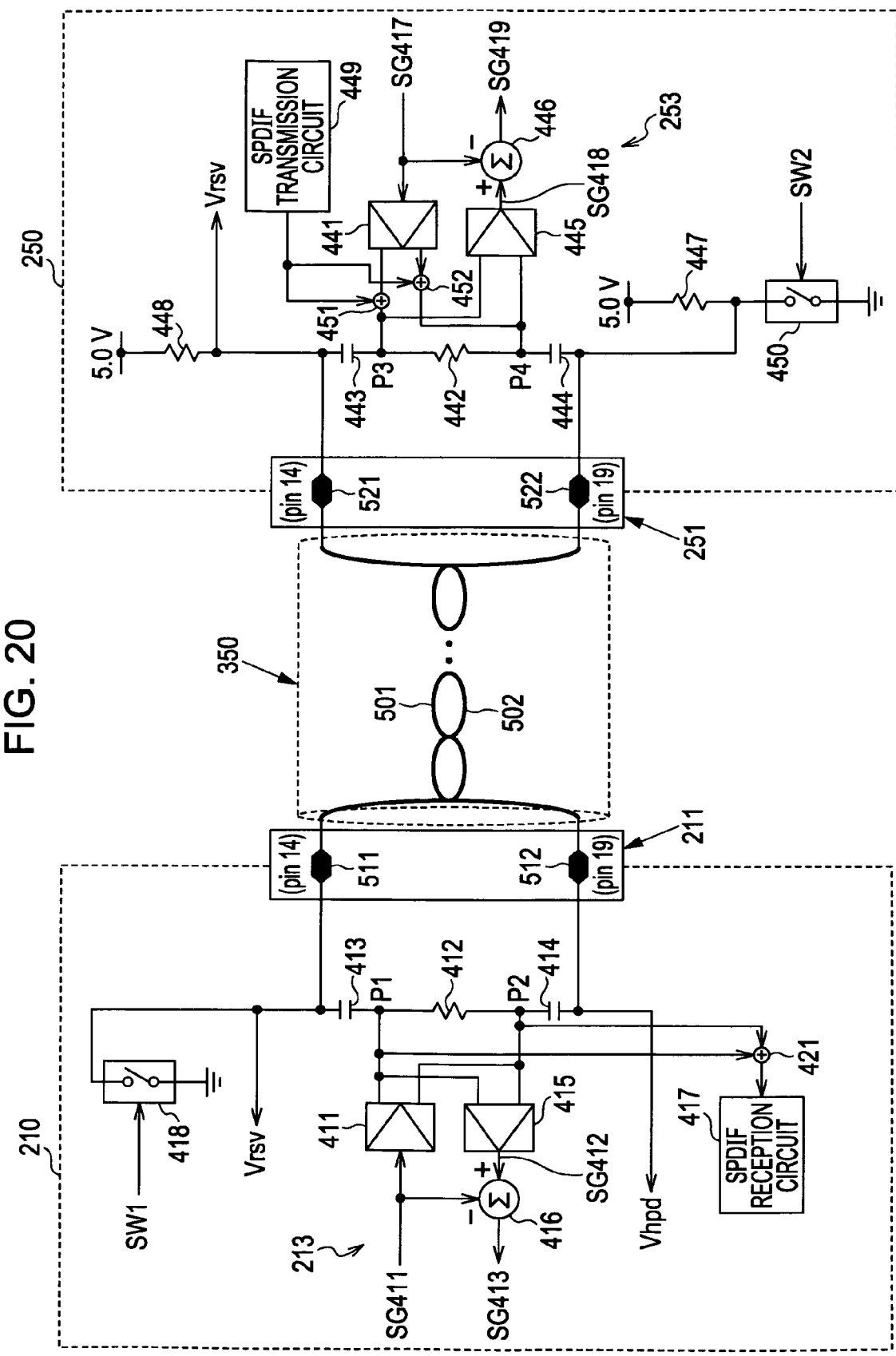
FIG. 20 is a connection diagram illustrating a configuration example of the high-speed data line interface and the like of the disk recorder and the television receiver.

FIG. 20 illustrates a configuration example of the disk recorder 210 and the television receiver 250 in the case of changing the voltages of the reserve line and the HPD line, as described above. In FIG. 20, the portions corresponding to those in FIG. 8 are denoted with the same reference numerals, and detailed description will be omitted.

With the disk recorder 210, the pin 14 of the HDMI terminal 211 is grounded via a connection switch 418 made up of a transistor and the like. On/off of this connection switch 418 is controlled with a control signal SW1 from the CPU 221 (see FIG. 2). Thus, the television receiver 250 can be notified that the disk recorder 210 is an eHDMI-compatible device by changing the voltage of the reserve line, and also the change thereof is represented with a pulse shape, whereby the television receiver 250 can also be notified of compatible transmission format (application) information. In this case, the connection switch 418 and the CPU 221 make up a function information transmission unit and a format information transmission unit.

Also, with the television receiver 250, the pin 19 of the HDMI terminal 251 is grounded via a connection switch 450 made up of a transistor and the like. On/off of this connection switch 450 is controlled with a control signal SW2 from the CPU 271 (see FIG. 3). Thus, the television receiver 250 can request the disk recorder 210 to notify information regarding whether or not this disk recorder 210 is an eHDMI-compatible device by changing the voltage of the HPD line. In this case, the connection switch 450 and the CPU 271 make up a function information requesting unit. With this television receiver 250, the function information indicating that the disk recorder 210 is an eHDMI-compatible device, and further, compatible transmission format information, can be obtained from the voltage Vrsv of the pin 14 of the HDMI terminal 251.

Figure 21:
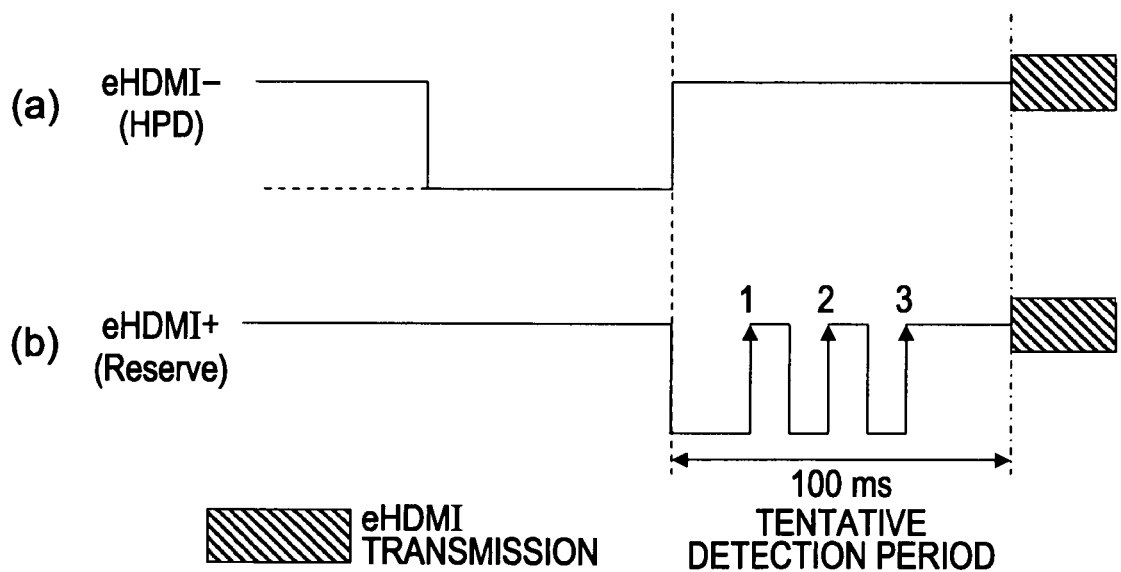
FIG. 21 is a diagram illustrating a voltage change example of the HPD line and a reserve line.

FIG. 21 illustrates a voltage control example of the HPD line on the television receiver (sink device) 250 side, and a voltage control example of the reserve line on the disk recorder (source device) 210 side corresponding thereto. In the case of this example, first, as shown in FIG. 21(a), the connection switch 450 of the television receiver 250 is set to an on state from an off state just for a predetermined period of time, and the voltage of the HPD (eHDMMI-) line is changed from low to high. Thus, a request is executed from the television receiver 250 to the disk recorder 210 so as to notify the function information and the like.

On the other hand, after the voltage of the HPD line is restored to a high state, the connection switch 418 of the disk recorder 210 is set from an off state to an on state, the voltage of the reserve line is changed from high to low as shown in FIG. 21(b), and the function information indicating that the disk recorder 210 is an eHDMI-compatible device is transmitted from the disk recorder 210 to the television receiver 250.

Thereafter, for example, during 100 msec., the connection switch 418 of the disk recorder 210 is subjected to switching control, and the voltage of the reserve line is changed from low to high repeatedly according to the transmission format that the disk recorder 210 can support. Thus, the transmission format information that the disk recorder 210 can support is transmitted from the disk recorder 210 to the television receiver 250. Finally, the connection switch 418 is returned to an off state.

As shown in FIG. 21(b), the voltage of the reserve line has been changed, and accordingly, with the television receiver 250, the voltage of the reserve line is detected, whereby function information can be obtained wherein, for example, the disk recorder 210 is an eHDMI-compatible device, and further, the pulse count is three, and accordingly, for example, the disk recorder 210 supports both of the SPDIF signal and the Ethernet signal.

As described above, after the function information indicating that the disk recorder 210 is an eHDMI-compatible device, the compatible transmission format information transmitted from the disk recorder 210 is confirmed at the television receiver 250, and eHDMI transmission is started between the television receiver 250 and disk recorder 210.

Second Example

With the above first example, the voltage of the first line, e.g., the reserve line of the HDMI cable 350 is changed, thereby transmitting function information indicating that the disk recorder 210 is an eHDMI-compatible device, and compatible transmission format information from the disk recorder 210 to the television receiver 250.

With this second example, the voltage of the reserve line of the HDMI cable 350 is further changed, the information of a transmission format that the television receiver 250 can support is transmitted from the television receiver 250 to the disk recorder 210. With this second example, detailed description regarding the portions corresponding to those in the first example will be omitted.

After obtaining function information indicating that the disk recorder 210 is an eHDMI-compatible device, and compatible transmission format information by detecting voltage change in the reserve line, the television receiver 250 changes the voltage of the reserve line in a pulse shape to notify the disk recorder 210 of the information of a transmission format that it itself supports. In this case, the CPU 271 of the television receiver 250 makes up a format information transmission unit. The disk recorder 210 detects voltage change in the reserve line, thereby obtaining the information of the transmission format that the television receiver 250 supports. In this case, the CPU 221 of the disk recorder 210 makes up a format information obtaining unit.

Figure 22:
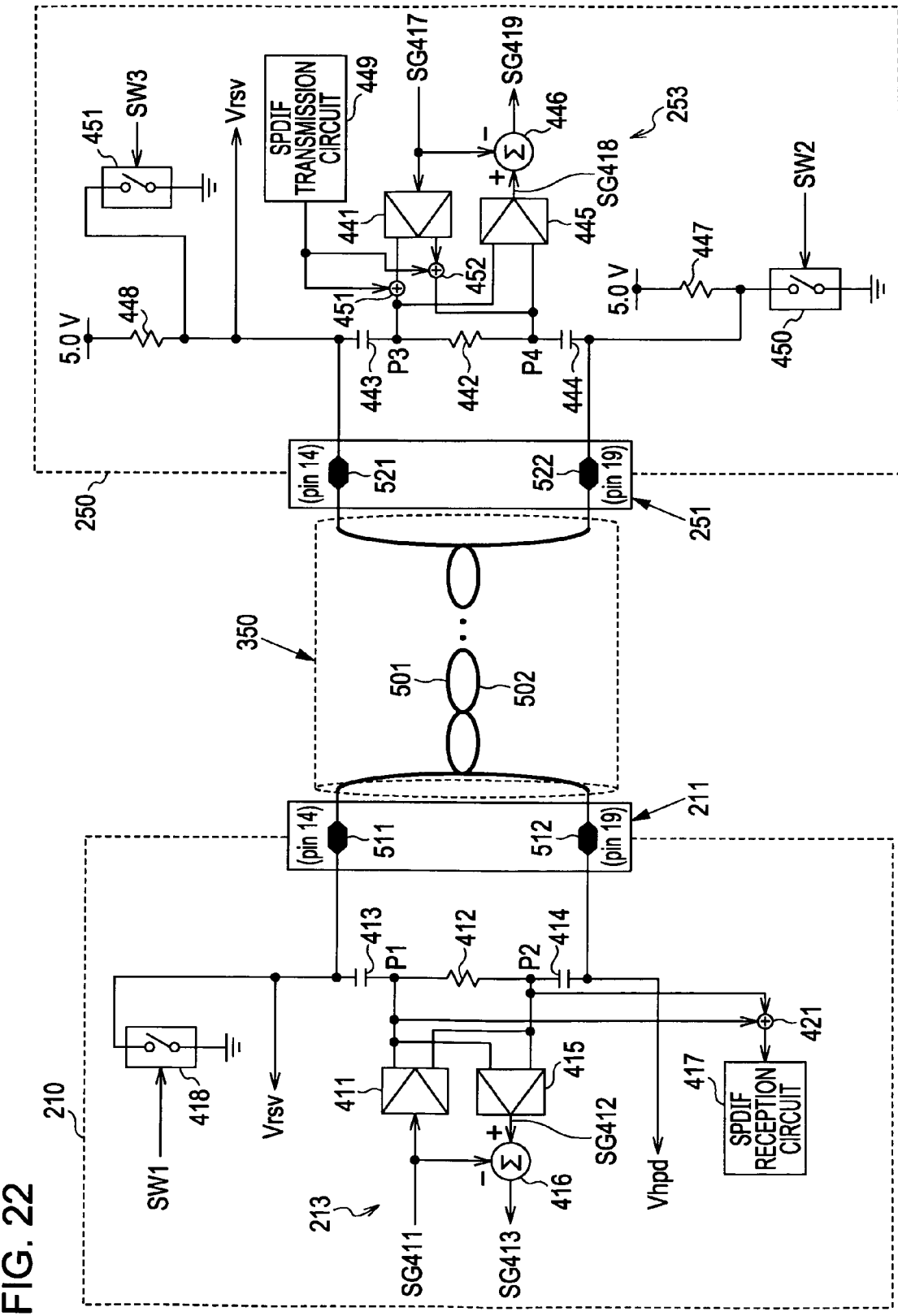
FIG. 22 is a block diagram illustrating a configuration example of the disk recorder and the television receiver, in the case that function information and compatible transmission format information is transmitted from the disk recorder to the television receiver, and also compatible transmission format information is transmitted from the television receiver to the disk recorder.

FIG. 22 illustrates a configuration example of the disk recorder 210 and the television receiver 250, as described above, in the case that the function information and the compatible transmission format information is transmitted from the disk recorder 210 to the television receiver 250, and also the compatible transmission format information is transmitted from the television receiver 250 to the disk recorder 210. In FIG. 22, the portions corresponding to those in FIG. 20 are denoted with the same reference numerals, and detailed description thereof will be omitted.

With the television receiver 250, the pin 14 of the HDMI terminal 251 is grounded via a connection switch 451 made up of a transistor and the like. On/off of this connection switch 451 is controlled with a control signal SW3 from the CPU 271. Thus, the television receiver 250 can notify the disk recorder 210 of the information of a transmission format that it itself supports by changing the voltage of the reserve line in a pulse shape. In this case, the connection switch 451 and the CPU 271 make up a format information transmission unit. The other configurations of the television receiver 250 in FIG. 22 are the same as those in the television receiver 250 in FIG. 20.

Note that the configuration of the disk recorder 210 in FIG. 22 is the same as the configuration of the disk recorder 210 in FIG. 20. With this disk recorder 210, the information of a transmission format that the television receiver 250 supports can be obtained from the voltage Vrsv of the pin 14 of the HDMI terminal 211, as described above. In this case, the CPU 221 of the disk recorder 210 makes up a format information obtaining unit.

Figure 23:
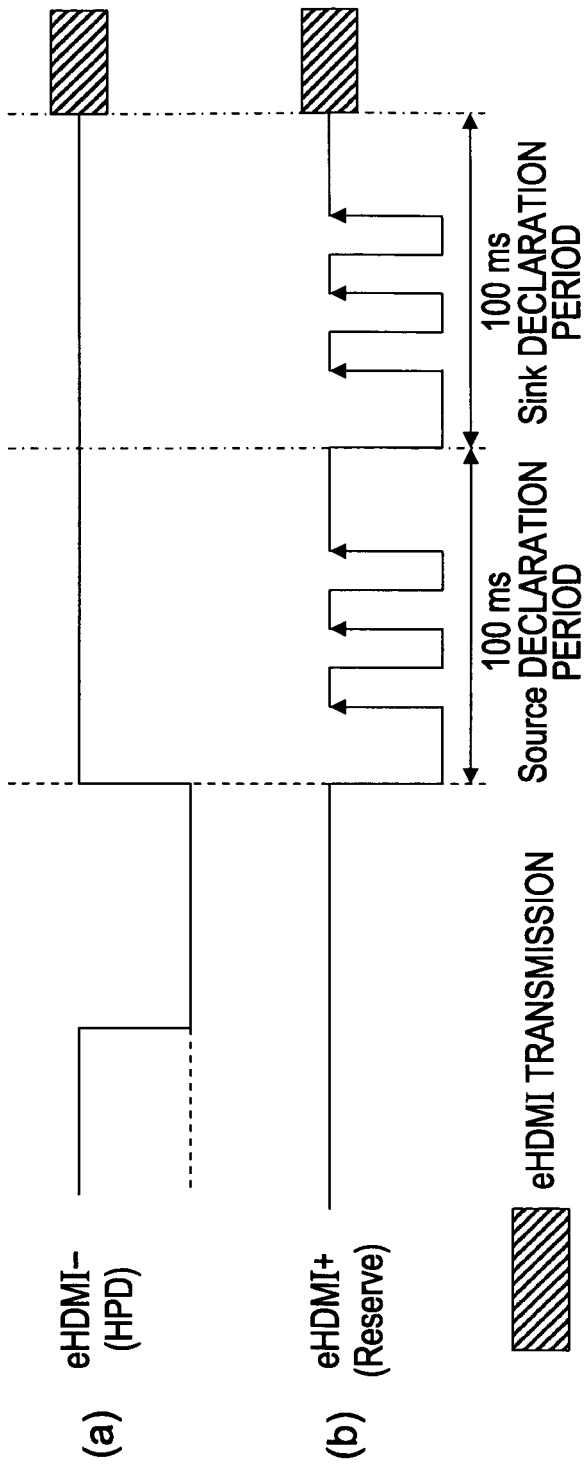
FIG. 23 is a diagram illustrating a voltage control example of the HPD line with the television receiver (sink device) side, and a voltage control example of the reserve line with the disk recorder (source device) side and the television receiver (sink device) side corresponding thereto.

FIG. 23 illustrates a voltage control example of the HPD line on the television receiver (sink device) 250 side, and a voltage control example of the reserve line on the disk recorder (source device) 210 side and the television receiver (sink device) 250 side corresponding thereto.

In the case of this example, first, as shown in FIG. 23(a), the connection switch 450 of the television receiver 250 is set to an on state from an off state just for a predetermined period of time, and the voltage of the HPD (eHDMMI−) line is changed from low to high. Thus, a request is executed from the television receiver 250 to the disk recorder 210 so as to notify the function information and the like.

On the other hand, after the voltage of the HPD line is restored to a high state, the connection switch 418 of the disk recorder 210 is set from an off state to an on state, the voltage of the reserve line is changed from high to low as shown in FIG. 23(b), and the function information indicating that the disk recorder 210 is an eHDMI-compatible device is transmitted from the disk recorder 210 to the television receiver 250.

Thereafter, for example, during 100 msec., the connection switch 418 of the disk recorder 210 is subjected to switching control, and the voltage of the reserve line is changed from low to high repeatedly according to the transmission format that the disk recorder 210 can support. Thus, the information of a transmission format that the disk recorder 210 can support is transmitted from the disk recorder 210 to the television receiver 250 (declaration of transmittable format for the source side). Finally, the connection switch 418 is returned to an off state.

Also, thereafter, during 100 msec. for example, the connection switch 451 of the television receiver 250 is subjected to switching control, and as shown in FIG. 23(b), the voltage of the reserve line is changed from low to high repeatedly according to the transmission format that the television receiver 250 can support. Thus, the information of a transmission format that the television receiver 250 can support is transmitted from the television receiver 250 to the disk recorder 210 (declaration of a transmittable format on the sink side). Finally, the connection switch 451 is returned to an off state.

As described above, with the television receiver 250, the function information indicating that the disk recorder 210 is an eHDMI-compatible device, and the compatible transmission format information transmitted from the disk recorder 210 is confirmed, and with the disk recorder 210, the compatible transmission format information transmitted from the television receiver 250 is confirmed, and then eHDMI transmission is started between the television receiver 250 and the disk recorder 210.

Figure 24:
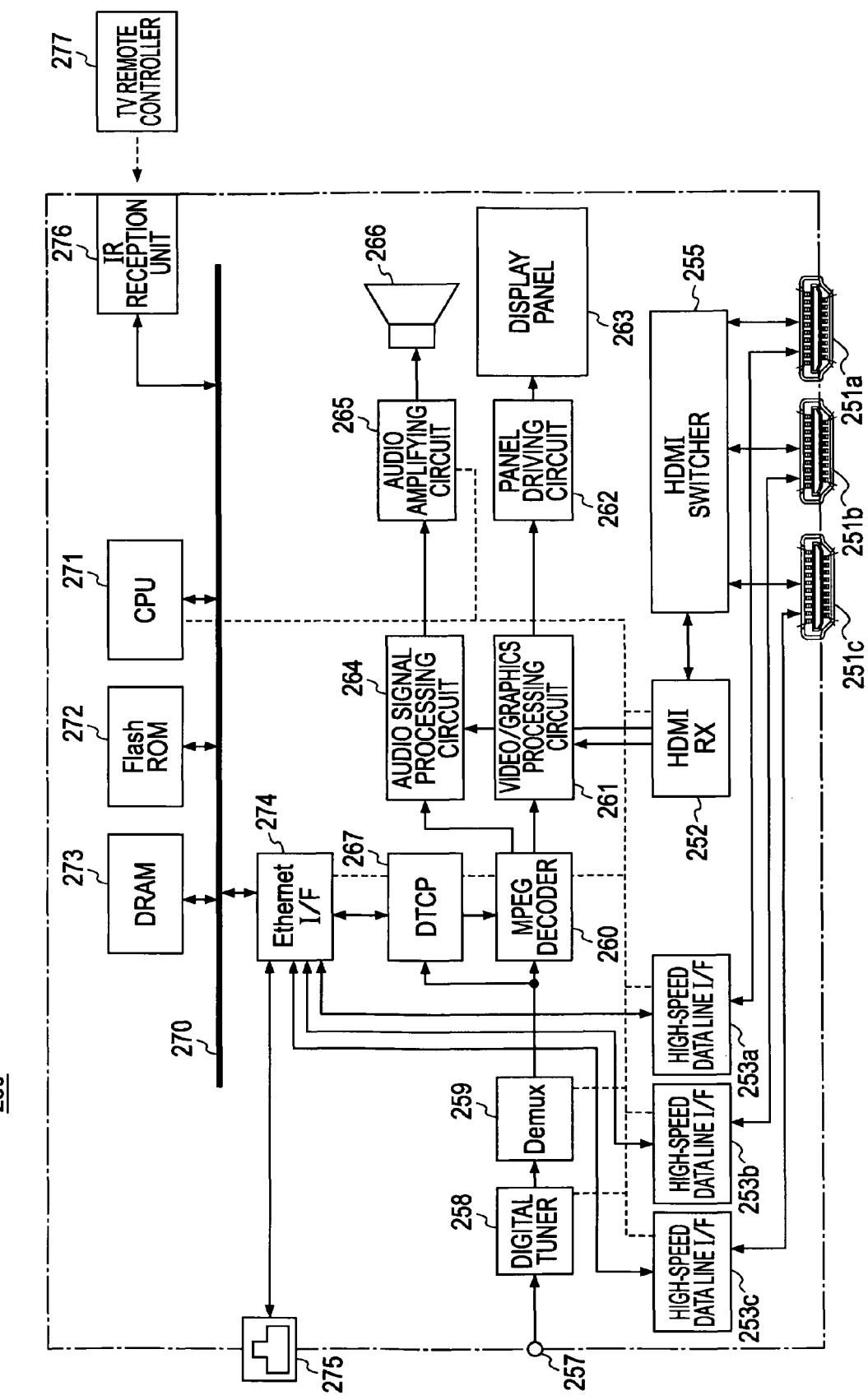
FIG. 24 is a block diagram illustrating a configuration example of a television receiver including multiple, e.g., three HDMI terminals.

Now, description will be made regarding a case where the television receiver 250 includes multiple HDMI terminals (HDMI ports). The television receiver 250 shown in the above FIG. 3 includes a single HDMI terminal. FIG. 24 illustrates the television receiver 250 including multiple, e.g., three HDMI terminals. In this FIG. 24, the portions corresponding to those in FIG. 3 are denoted with the same reference numerals, and detailed description thereof will be omitted.

This television receiver 250 includes HDMI terminals 251a through 251c, an HDMI switcher 255, and high-speed data line interfaces 253a through 253c. The HDMI switcher 255 selectively connects the HDMI terminals 251a through 251c to the HDMI reception unit 252. With the HDMI reception unit 252, the data of video (image) and audio to be input via the HDMI cable is obtained at the HDMI terminal connected thereto via the HDMI switcher 255, of the HDMI terminals 251a through 251c.

The high-speed data line interfaces 253a through 253c are bidirectional communication path interfaces made up of predetermined lines (the reserve line and HPD line) of the HDMI cable to be connected to the above HDMI terminals 251a through 251c. The high-speed data line interfaces 253a through 253c are inserted between the Ethernet interface 274 and the HDMI terminals 251a through 251c. The high-speed data line interfaces 253a through 253c are configured in the same way as the high-speed data line interface 253 in FIG. 3.

The other units of the television receiver 250 in FIG. 24 are configured in the same way as those of the television receiver 250 shown in FIG. 3, and execute the same operation.

As described above, the disk recorder 210 changes the voltage of the reserve line after receiving a transmission request (trigger) for the function information and the like from the television receiver 250 according to voltage change in the HPD line, and transmits the function information and the like to the television receiver 250.

Figure 25:
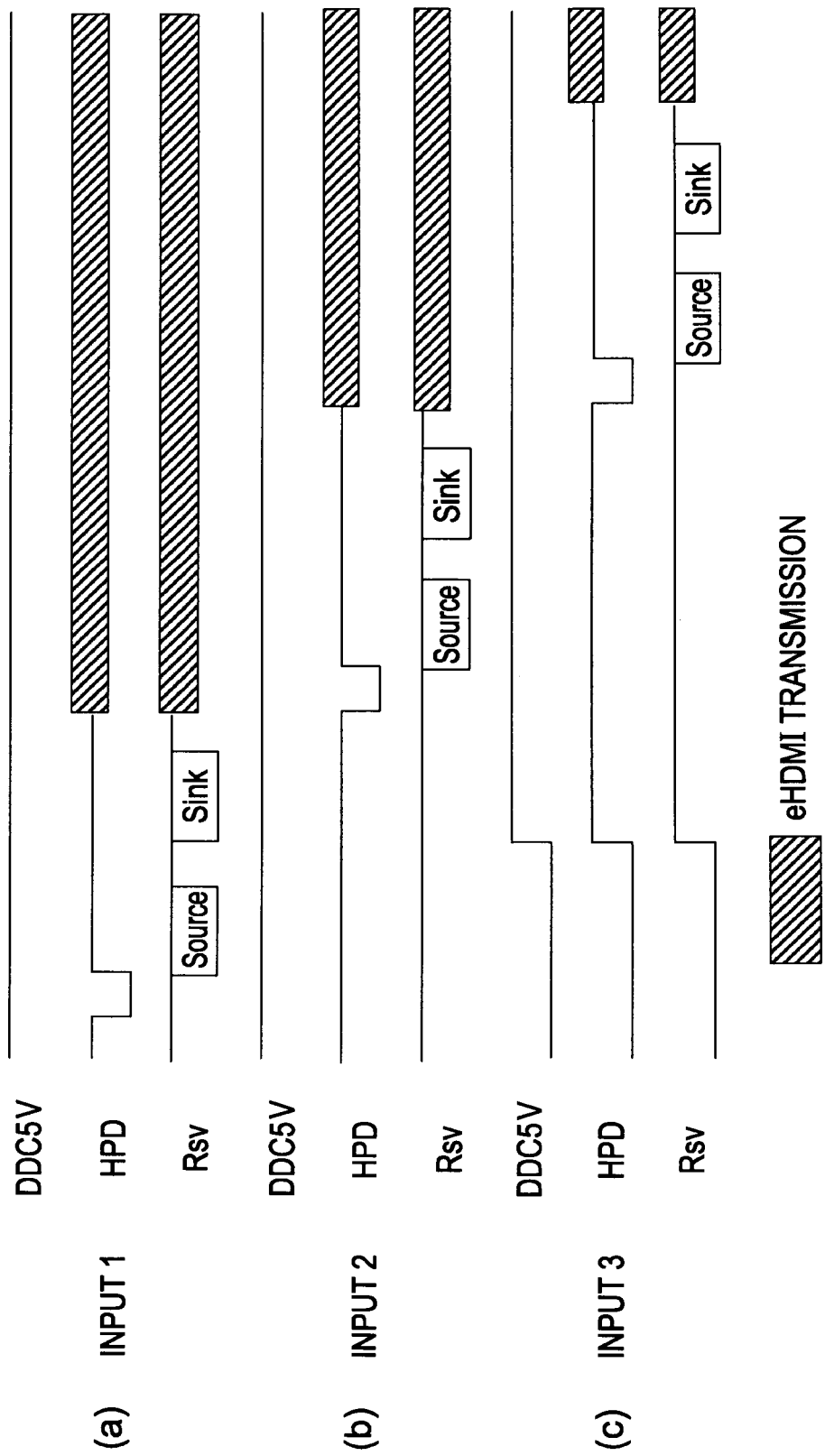
FIG. 25 is a diagram illustrating an operation example in the case that the sink device is multi-HDMI input.

Therefore, the television receiver 250 can execute a transmission request for the function information and the like in series as to a device such as the disk recorder 210 or the like connected to each of the HDMI terminals via the HDMI cable at arbitrary timing for each HDMI terminal such as shown in FIGS. 25(a) through (c). Thus, reduction in the number of pins of the microcomputer (CPU 271) is anticipated.

Note that, in FIGS. 25(a) through (c), "DDC5V" denotes the voltage of the power supply line, "HPD" denotes the voltage of the HPD line, and "Rsv" denotes the voltage of the reserve line. Input 3 in FIG. 25(c) illustrates that the power supply source of a device has been turned on, or connection has been performed, halfway.

Also, "Source" denotes the function information indicating being an eHDMI-compatible device, and the compatible transmission format information to be transmitted from a source device (e.g., disk recorder 210) to a sink device (e.g., television receiver 250). Also, "Sink" denotes the compatible transmission format information to be transmitted from a sink device (e.g., television receiver 250) to a source device (e.g., disk recorder 210).

Figure 26:
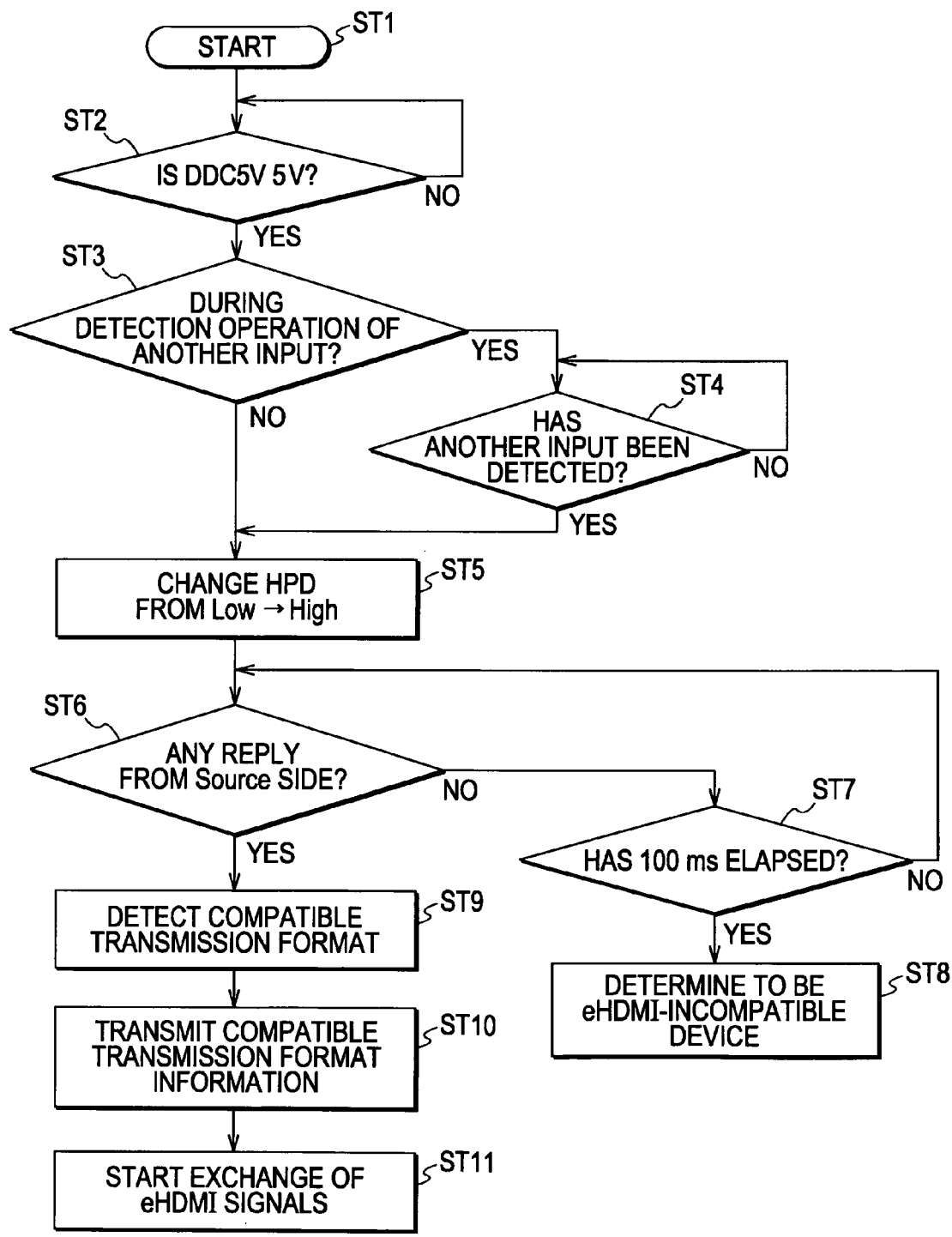
FIG. 26 is a flowchart illustrating an example of a processing procedure at the time of the CPU of the television receiver (sink device) executing a detection operation as to predetermined HDMI input.

The flowchart in FIG. 26 illustrates an example of a processing procedure at the time of the CPU 271 of the television receiver (sink device) 250 executing a detection operation as to predetermined HDMI input.

In step ST1, the CPU 271 starts the processing, and then proceeds to processing in step ST2. In this step ST2, the CPU 271 determines whether or not the voltage (DDC5V) of the power supply line is 5V.

When the voltage (DDC5V) of the power supply line is 5V, in step ST3 the CPU 271 determines whether or not another HDMI input is currently performing a detection operation of the function information, compatible transmission format information, and the like. At the time of currently performing a detection operation of another input, in step ST4 the CPU 271 determines whether or not detection of another input has ended.

At the time of detection of another input having ended, the CPU 271 proceeds to processing in step ST5. Note that when another input is not currently performing a detection operation, the CPU 271 immediately proceeds to the processing in step ST5. In this step ST5, the CPU 271 changes the voltage of the HPD line from low to high, and requests a source device on the partner side (disk recorder 210 or the like) of transmission of the function information and the like.

Next, in step ST6, the CPU 271 monitors the voltage of the reserve line to determine whether or not reply has been received from the source device, i.e., whether or not the function information and the like has been transmitted. When no reply has been received, in step ST7 the CPU 271 determines whether or not 100 milliseconds have elapsed since a transmission request was performed in step ST5. At the time of 100 milliseconds having not elapsed, the CPU 271 returns to the processing in step ST6. On the other hand, at the time of 100 milliseconds having elapsed, in step ST8 the CPU 271 determines that the source device on the partner side is an eHDMI-incompatible device.

Figure 27:
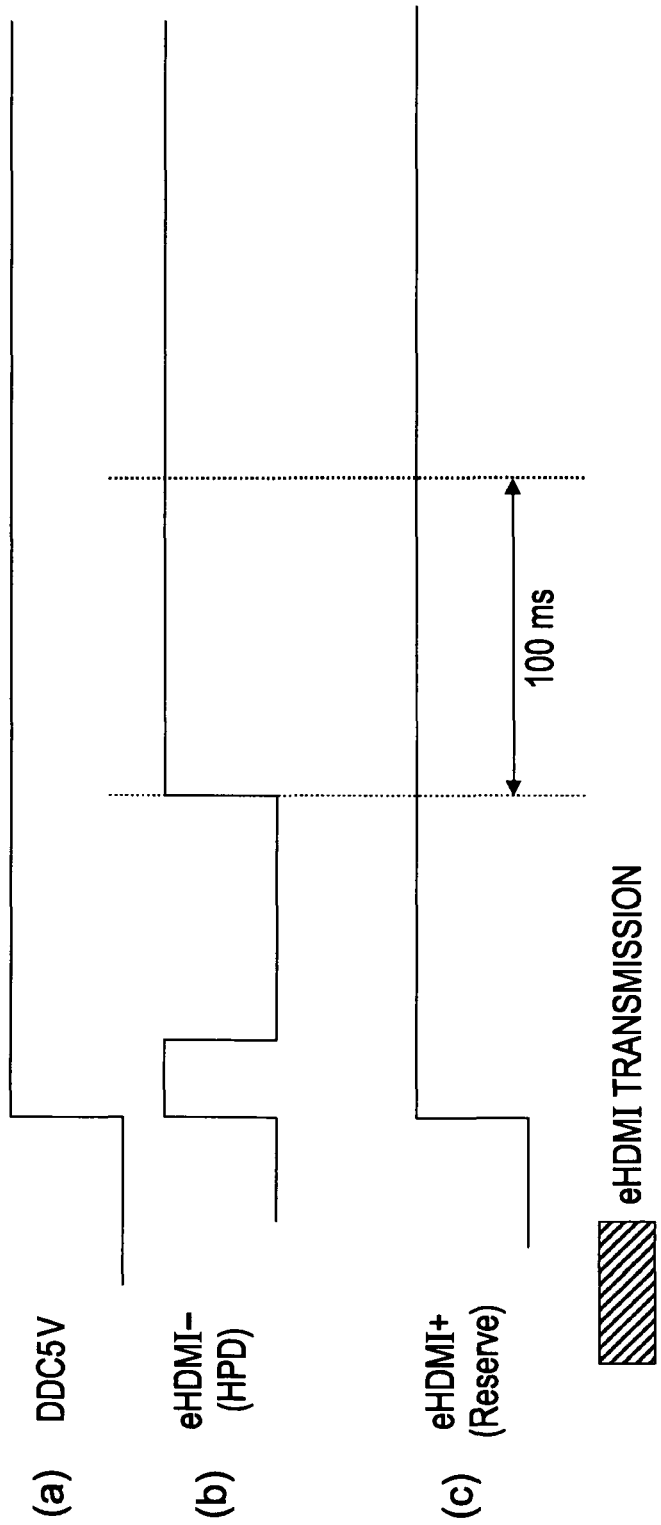
FIG. 27 is a diagram illustrating a voltage change example of the HPD line and the reserve line, in the case that the CPU device of the sink device determines that the source device on the partner side is an eHDMI-incompatible device.

FIG. 27 illustrates a voltage change example of the HPD line and the reserve line in the case of the CPU 271 determining that the source device on the partner side is an eHDMI-incompatible device. Note that FIG. 27(*a*) illustrates the voltage (DDC5V) of the power supply line, FIG. 27(*b*) illustrates the voltage of the HPD line, and FIG. 27(*c*) illustrates the voltage of the reserve line.

As shown in FIG. 27(*b*), with the television receiver 250, the voltage of the HPD line has been changed from low to high, and a transmission request for the function information and the like has been transmitted to the source device (disk recorder 210 or the like) on the partner side. However, as shown in FIG. 27(*c*), thereafter, even if 100 milliseconds have elapsed, the voltage of the reserve line is still high, and there have been no reply from the source device.

Returning to the flowchart in FIG. 26, at the time of reply having been received in step ST6, in step ST9 the CPU 271 recognizes that the source device on the partner side is an eHDMI-compatible device, and also detects the compatible transmission format of the source device on the partner side from voltage change in the reserve line.

Next, in step ST10, the CPU 271 changes the voltage of the reserve line in a pulse shape to transmit the information of a transmission format (application) that the television receiver 250 supports to the source device on the partner side. Subsequently, in step ST11, the CPU 271 starts transmission/reception of an eHDMI signal with the source device on the partner side.

Figure 28:
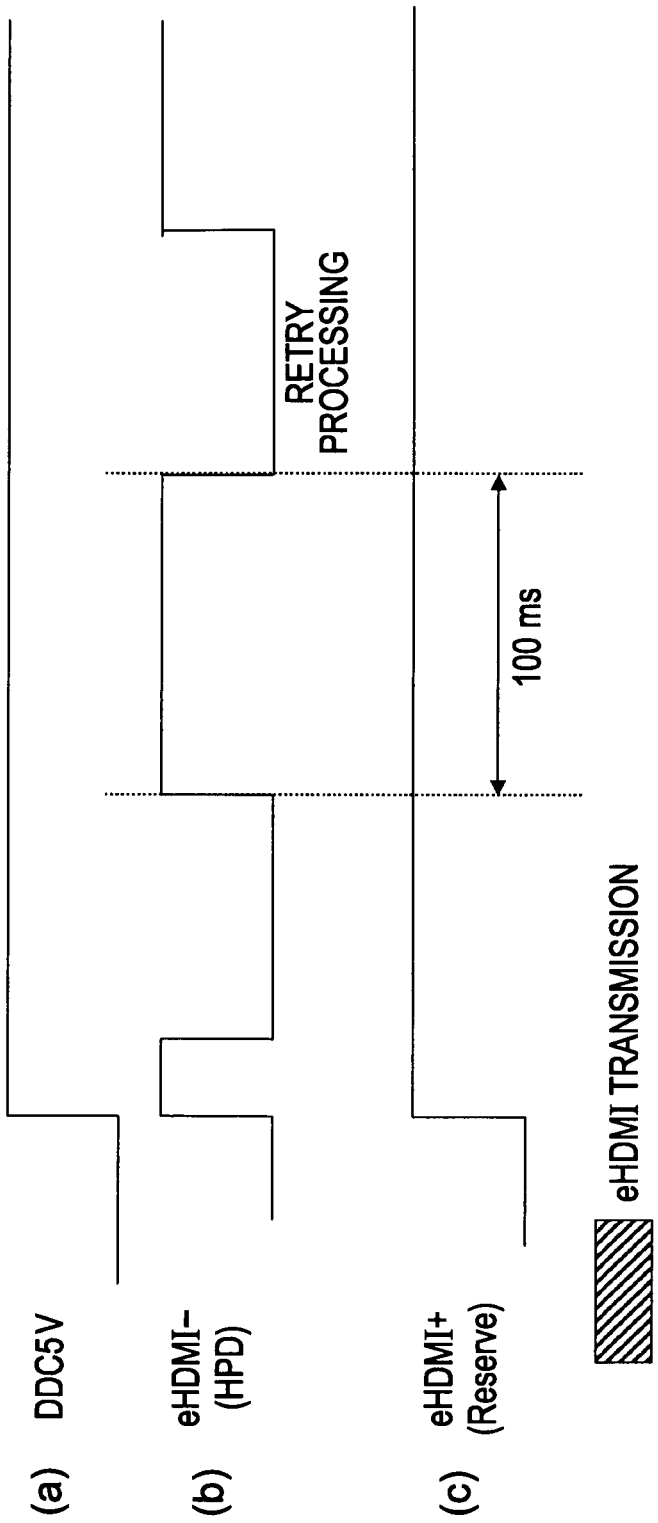
FIG. 28 is a diagram for describing retry processing wherein at the time of reply from the source device having not arrived even if 100 milliseconds elapse, transmission of the function information and the like is requested as to the source device on the partner side again.

With the processing of the flowchart in FIG. 26, at the time of reply from the source device having not been received even if 100 milliseconds have elapsed, the CPU 271 immediately determines that the source device is an eHDMI-incompatible device. However, as shown in FIG. 28(*b*), at the time of reply from the source device having not been received even if 100 milliseconds have elapsed, the CPU 271 may execute retry processing wherein the voltage of the HPD line is changed from low to high several times (only once is shown in FIG. 28(*b*)) to request transmission of the function information and the like, as to the partner source device (disk recorder 210 or the like). Thus, in the case that the source device has had difficulty in reply due to a busy state, a mistake of immediately determining that the source device is an eHDMI-incompatible device can be avoided.

Note that FIG. 28(*a*) illustrates the voltage (DDC5V) of the power supply line, FIG. 28(*b*) illustrates the voltage of the HPD line, and FIG. 28(*c*) illustrates the voltage of the reserve line. FIGS. 28(*a*) and (*c*) are the same as FIGS. 27(*a*) and (*c*).

Figure 29:
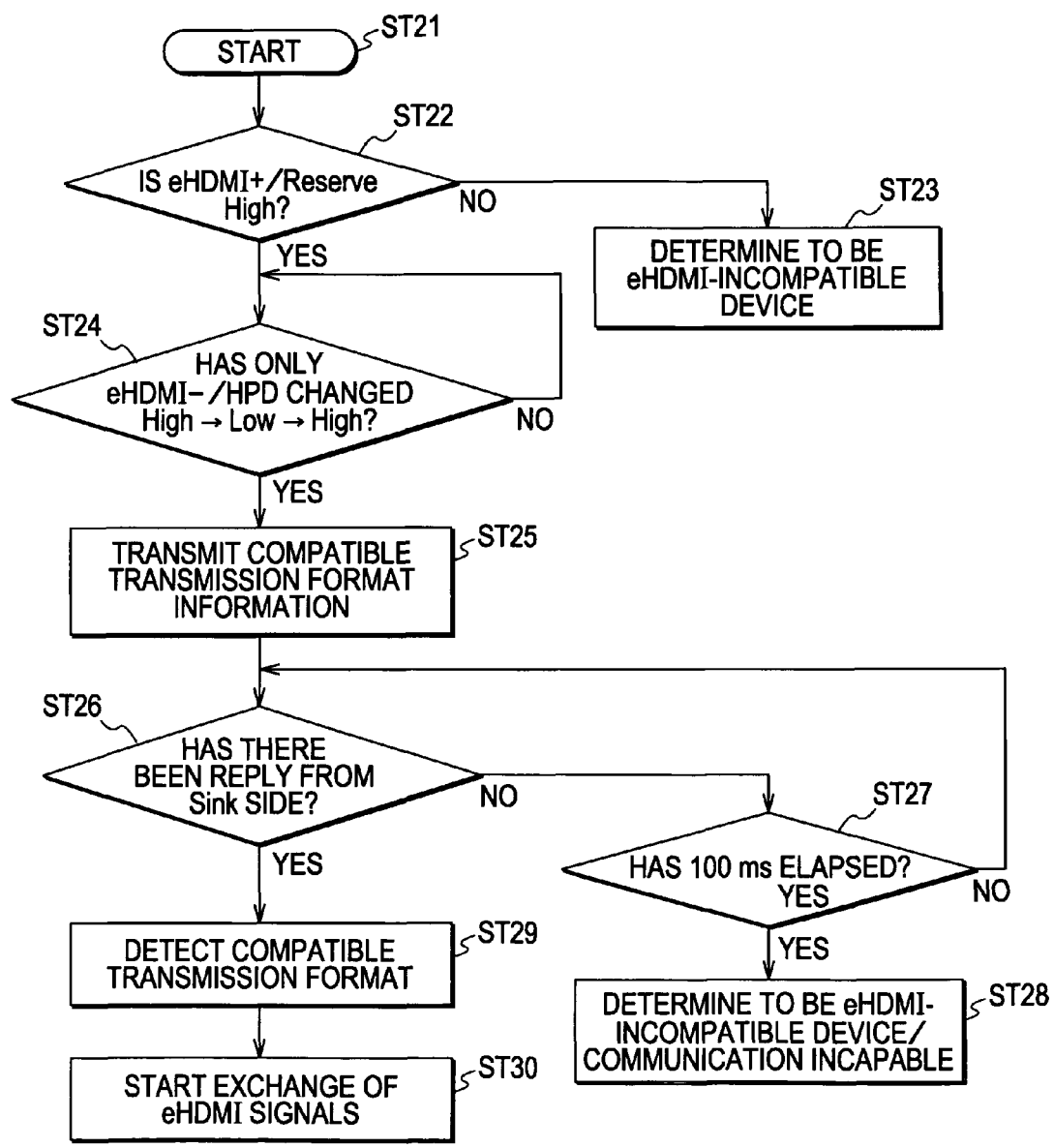
FIG. 29 is a flowchart illustrating an example of the processing procedure of the CPU of the disk recorder (source device).

The flowchart in FIG. 29 illustrates an example of the processing procedure of the CPU 221 of the disk recorder (source device) 210.

In step ST21, the CPU 221 starts the processing, and then proceeds to processing in step ST22. In this step ST22, the CPU 221 determines whether or not the voltage of the reserve line is in a high state. When the voltage of the reserve line is not high, in step ST23 the CPU 221 determines that the sink device on the partner side (television receiver 250 or the like) is an eHDMI-incompatible device.

When the voltage of the reserve line is high, the CPU 221 proceeds to processing in step ST24. In this step ST24, the CPU 221 determines whether or not the voltage of the HPD line has been changed from high, low, and high. At the time of such change, the CPU 221 determines that a transmission request for the function information and the like has been received from the sink device on the partner side. Subsequently, in step ST25, the CPU 221 changes the voltage of the reserve line to transmit the function information indicating that the source device is an eHDMI-compatible device, and the information of a compatible transmission format (application) to the sink device on the partner side.

Next, in step ST26, the CPU 221 monitors the voltage of the reserve line to determine whether or not there has been received reply from the sink device, i.e., whether or not the information of a transmission format that the sink device on the partner side can support has been transmitted. At the time of reply having not been received, in step ST27, the CPU 221 determines whether or not 100 milliseconds have elapsed since the function information of itself and the like was transmitted in step ST25. At the time of 100 milliseconds having not elapsed, the CPU 221 returns to the processing in step ST26. On the other hand, at the time of 100 milliseconds having elapsed, in step ST28 the CPU 221 determines that the sink device on the partner side is an eHDMI-incompatible device, or incapable of transmission in a busy state.

At the time of reply having been received from the sink side in step ST26, in step ST29 the CPU 221 detects the compatible transmission format of the sink device on the partner side from voltage change in the reserve line. Subsequently, in step ST30, the CPU 221 starts transmission/reception of an eHDMI signal with the sink device on the partner side.

Third Example

With the above first example and second example, the voltage of the second line, e.g., the HPD line of the HDMI cable 350 is changed, thereby transmitting a transmission request for the function information and the like from the television receiver (sink device) 250 to the disk recorder (source device) 210.

With this third example, this transmission request is performed by changing the voltage of the first line, e.g., the reserve line of the HDMI cable 350, in the same way as with the case of transmission of the function information, compatible transmission format information, and the like. Also, with this third example, a transmission request for the function information and the like can be output from both of the television receiver 250 and the disk recorder 210. With this third example, detailed description will be omitted regarding the portions corresponding to those in the first example or second example.

The request side (sink device or source device) requests the reply side (source device or sink device) of transmission (start of condition transmission) of the function information indicating that the reply side is an eHDMI-compatible device by changing the voltage of the first line, e.g., the reserve line of the HDMI cable 350. Here, the CPU of the request side makes up a function information requesting unit.

Next, the reply side monitors the voltage of the reserve line, and at the time of transmission (start of condition transmission) of the function information being requested from the request side, in the case that it itself is an eHDMI-compatible device, the reply side changes the voltage of the reserve line of the HDMI cable 350, thereby transmitting the function information (reply of being capable of condition transmission) to the request side. The request side monitors the voltage of the reserve line to obtain the function information transmitted from the reply side. In this case, the reply side makes up a voltage change detecting unit and a function information transmission unit. Also, the request side makes up a function information obtaining unit.

Next, the request side changes the voltage of the reserve line in a pulse shape, thereby transmitting the transmission format information that the request side supports to the reply side. The reply side monitors the voltage of the reserve line to obtain the transmission format information that the request side supports. In this case, the request side makes up a format information transmission unit, and the reply side makes up a format information obtaining unit.

Next, the reply side changes the voltage of the reserve line in a pulse shape, thereby transmitting the transmission format information that the reply side supports to the request side. The request side monitors the voltage of the reserve line to obtain the transmission format information that the reply side supports. In this case, the reply side makes up a format information transmission unit, and the request side makes up a format information obtaining unit.

Figure 30:
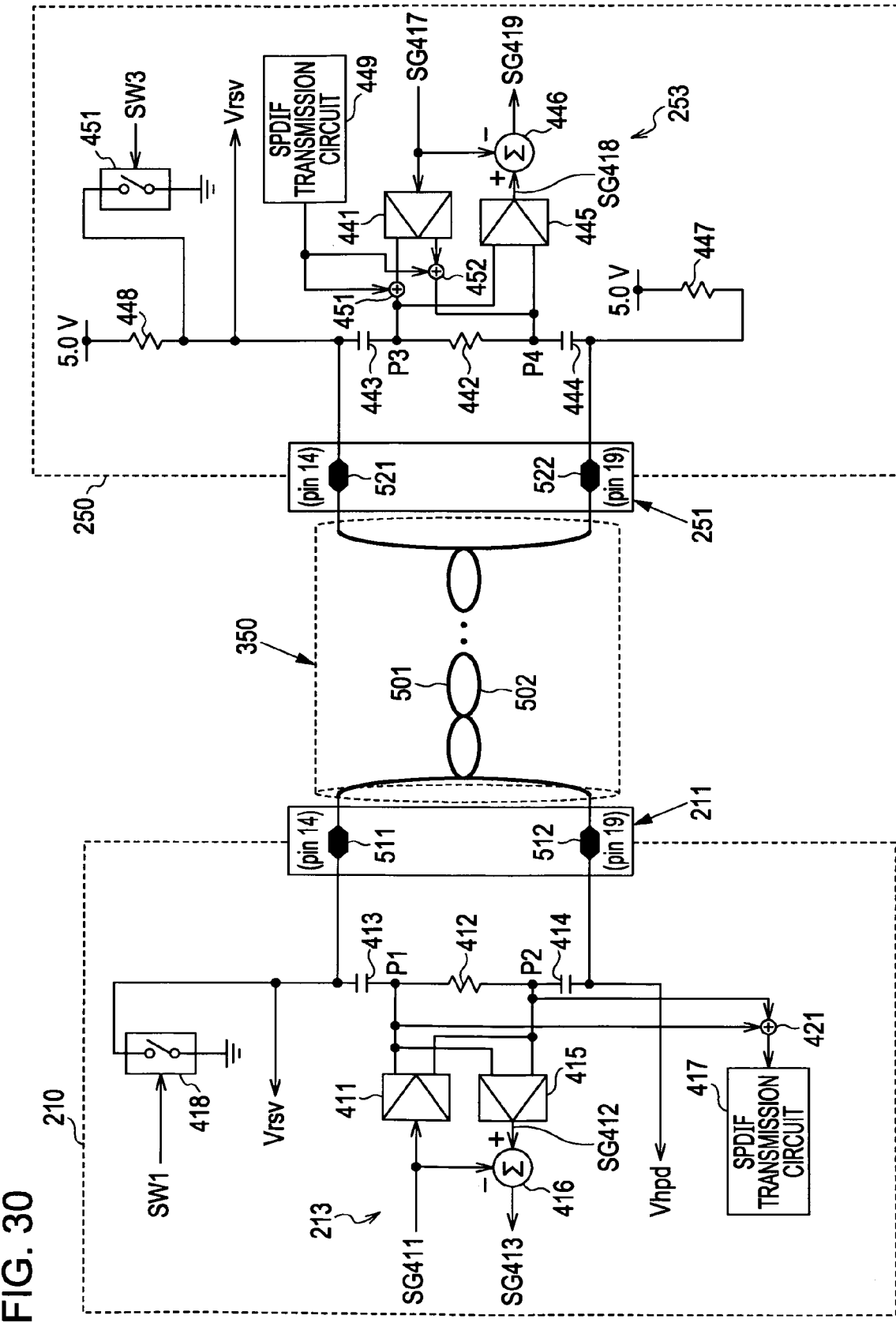
FIG. 30 is a block diagram illustrating a configuration example of the disk recorder and the television receiver, in the case that function information and compatible transmission format information is transmitted from the disk recorder to the television receiver, and also compatible transmission format information is transmitted from the television receiver to the disk recorder.

FIG. 30 illustrates a configuration example of the disk recorder 210 and the television receiver 250 in the case that the function information and the compatible transmission format information is transmitted from the disk recorder 210 to the television receiver 250, and also the compatible transmission format information is transmitted from the television receiver 250 to the disk recorder 210. In this FIG. 30, the portions corresponding to those in FIG. 22 are denoted with the same reference numerals, and detailed description thereof will be omitted.

With the television receiver 250, a transmission request for the function information is performed by changing the voltage of the first line, e.g., the reserve line of the HDMI cable 350, thereby eliminating the necessity of the connection switch 450 of the television receiver 250. The other configurations of the television receiver 250 in this FIG. 30 are the same as those of the television receiver 250 in FIG. 22. Note that the configuration of the disk recorder 210 in FIG. 30 is the same as the configuration of the disk recorder 210 in FIG. 22.

Figure 31:
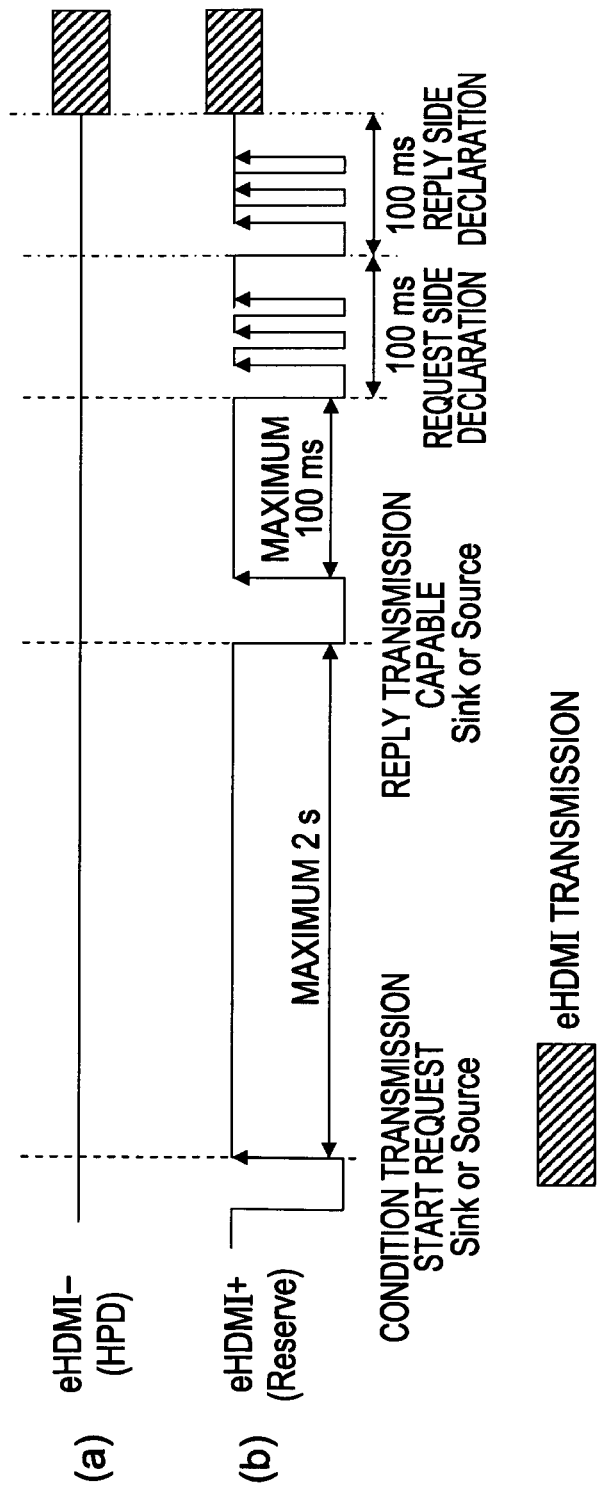
FIG. 31 is a diagram illustrating a voltage control example of the reserve line.

FIG. 31 illustrates a voltage control example of the reserve line. FIG. 31(a) illustrates the voltage of the HPD line, FIG. 31(b) illustrates the voltage of the reserve line. The voltage of the HPD line is still kept high.

In the case of this example, first, the connection switch on the request side (the connection switch 451 at the time of the television receiver 250 being the request side, and the connection switch 418 at the time of the disk recorder 210 being the request side) is set to an on state from an off state just for a predetermined period of time, and such as shown in FIG. 31(b), the voltage of the reserve (eHDMMI−) line is changed form low to high. Thus, transmission of the function information (start of condition transmission) indicating that the reply side is an eHDMI-compatible device is requested from the request side to the reply side.

Thereafter, after elapse of the maximum two seconds, the connection switch on the reply side (the connection switch 418 at the time of the disk recorder 210 being the reply side, and the connection switch 451 at the time of the television receiver 250 being the reply side) is set to an on state from an off state just for a predetermined period of time, and as shown in FIG. 31(b), the voltage of the reserve (eHDMMI+) line is changed form low to high. Thus, the function information (reply of being transmittable) indicating that the reply side is an eHDMI-compatible device is transmitted from the reply side to the request side.

Thereafter, for example, since 100 milliseconds elapsed, for example, during 100 milliseconds, the connection switch on the request side is subjected to switching control, and the voltage of the reserve line is changed from low to high repeatedly according to the transmission format that the request side can support. Thus, the information of a transmission format that the request side can support is transmitted from the request side to the reply side (declaration of a transmittable format on the request side).

Also, thereafter, for example, during 100 milliseconds, the connection switch on the reply side is subjected to switching control, and the voltage of the reserve line is changed from low to high repeatedly according to the transmission format that the reply side can support. Thus, the information of a transmission format that the reply side can support is transmitted from the reply side to the request side (declaration of a transmittable format on the reply side).

As described above, the function information indicating that the reply side is an eHDMI-compatible device, and the compatible transmission format information, transmitted from the reply side, is confirmed at the request side, and also the compatible transmission format information transmitted from the request side is confirmed at the reply side, following which eHDMI transmission is started between the request side and the reply side.

Now, description will be made regarding a case where a sink device includes multiple HDMI terminals (HDMI ports) (see the television receiver 250 in FIG. 24).

As described above, after transmission of the function information from the reply side (reply of being capable of condition transmission), the request side changes the voltage of the reserve line to transmit the compatible transmission format information to the reply side.

Therefore, a sink device of multi-input (television receiver 250) can control the transmission timing of the function information (reply of being transmittable) even in the event that transmission of the function information (start of condition transmission) is requested from a source device at arbitrary timing for each HDMI terminal, and transmission/reception of the compatible transmission format information at each HDMI terminal can be executed in accordance with the processing situation of itself.

Figure 32:
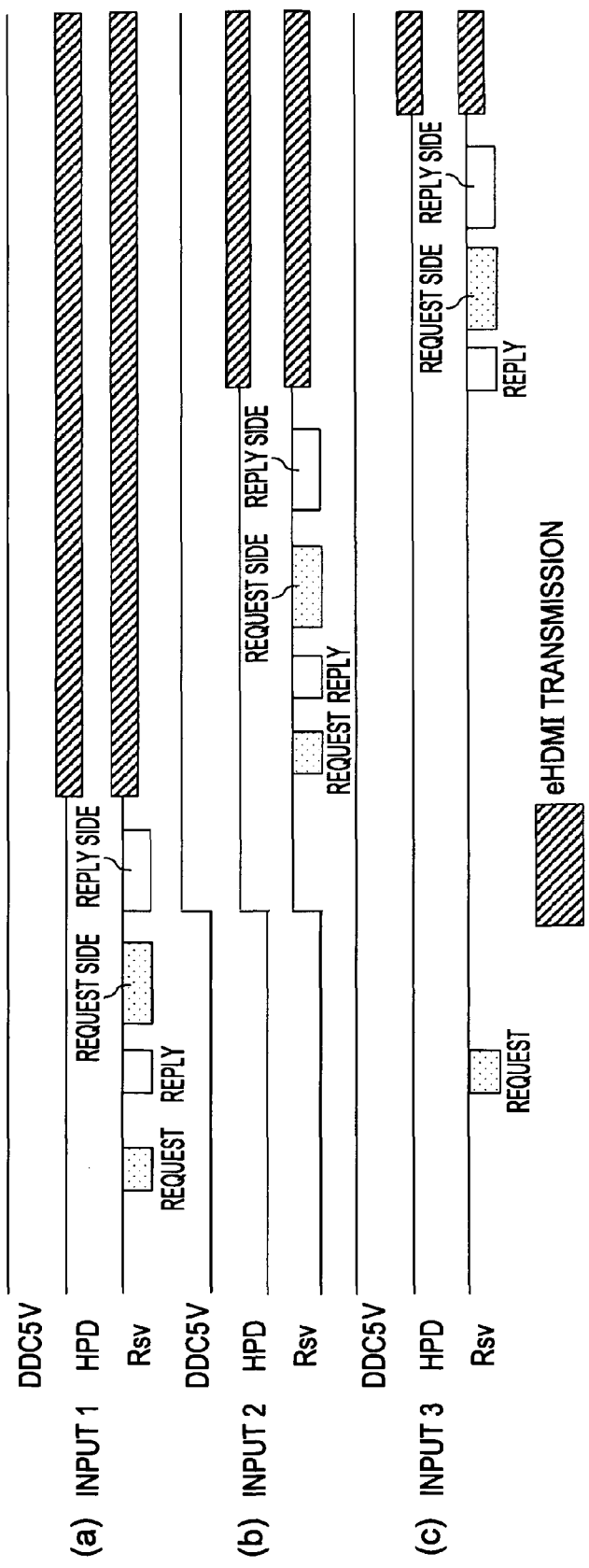
FIG. 32 is a diagram illustrating an operation example in the case that the sink device is multi-HDMI input.

Note that, in FIGS. 32(a) through (c), "DDC5V" denotes the voltage of the power supply line, "HPD" denotes the voltage of the HPD line, and "Rsv" denotes the voltage of the reserve line. Input 2 in FIG. 32(b) illustrates that the power supply source of a device has been turned on, or connection has been performed, halfway.

Figure 33:
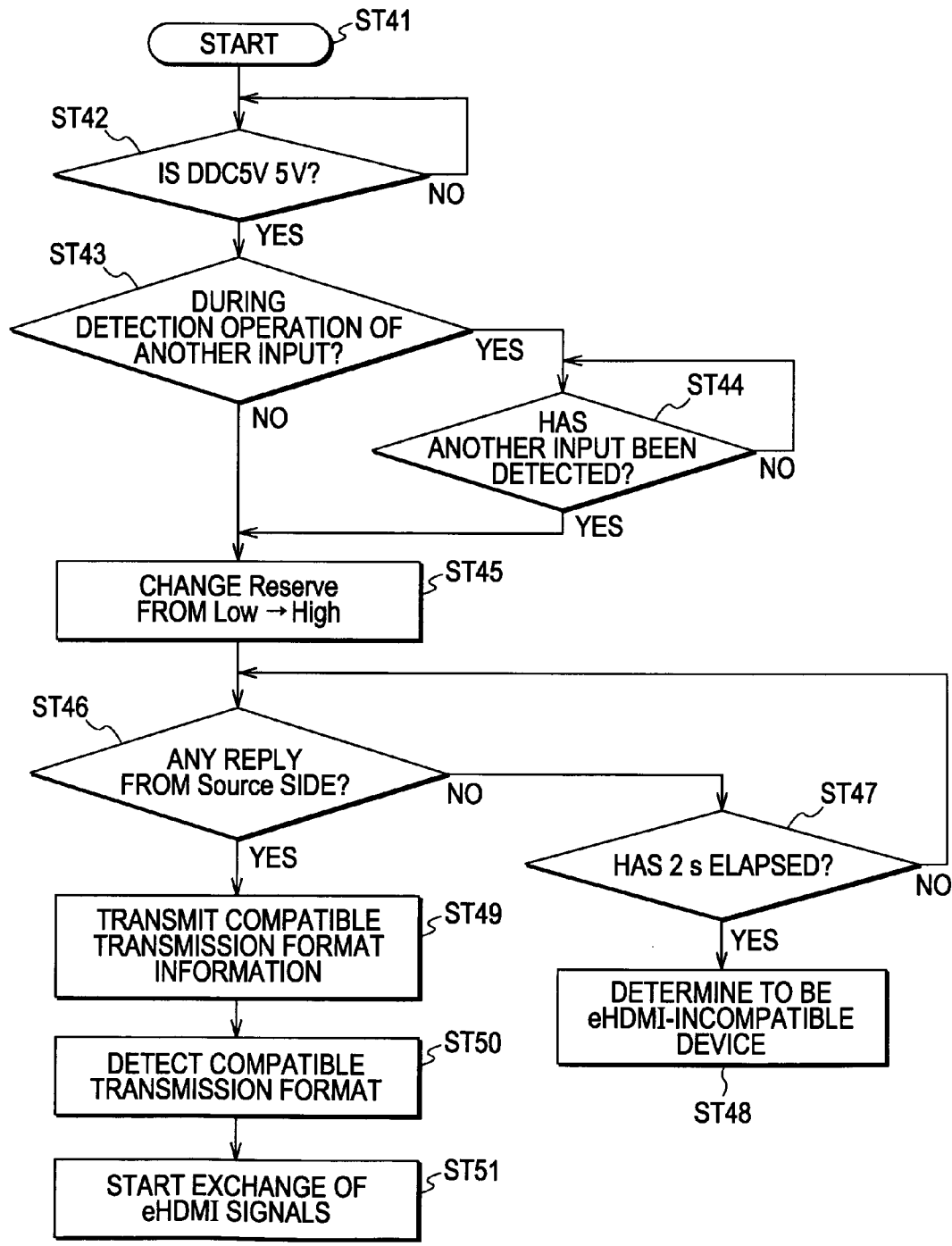
FIG. 33 is a flowchart illustrating, in the case of outputting a request from the sink device, an example of the processing procedure of this sink device.

The flowchart in FIG. 33 illustrates, in the case that a request is output from a sink device, an example of the processing procedure of the CPU (hereafter, referred to as "CPUsi") of this sink device.

In step ST41, the CPUsi starts the processing, and thereafter, proceeds to processing in step ST42. In this step ST42, the CPUsi determines whether or not the voltage (DDC5V) of the power supply line is 5V.

When the voltage (DDC5V) of the power supply line is 5V, in step ST43 the CPUsi determines whether or not another HDMI input is currently performing a detection operation of the function information, compatible transmission format information, and the like. At the time of currently performing a detection operation of another input, in step ST44 the CPUsi determines whether or not detection of another input has ended.

At the time of detection of another input having ended, the CPUsi proceeds to processing in step ST45. Note that when another input is not currently performing a detection operation, the CPUsi immediately proceeds to the processing in step ST45. In this step ST45, the CPUsi changes the voltage of the reserve line from low to high, and requests a source device of transmission of the function information (start of condition transmission).

Next, in step ST46, the CPUsi monitors the voltage of the reserve line to determine whether or not reply has been received from the source device, i.e., whether or not the function information (reply of being transmittable) has been transmitted. When no reply has been received, in step ST47 the CPUsi determines whether or not two seconds have elapsed since a transmission request was performed in step ST45. In the event of two seconds having not elapsed, the CPUsi returns to the processing in step ST46. On the other hand, at the time of two seconds having elapsed, in step ST48 the CPUsi determines that the source device on the partner side is an eHDMI-incompatible device.

Figure 34:
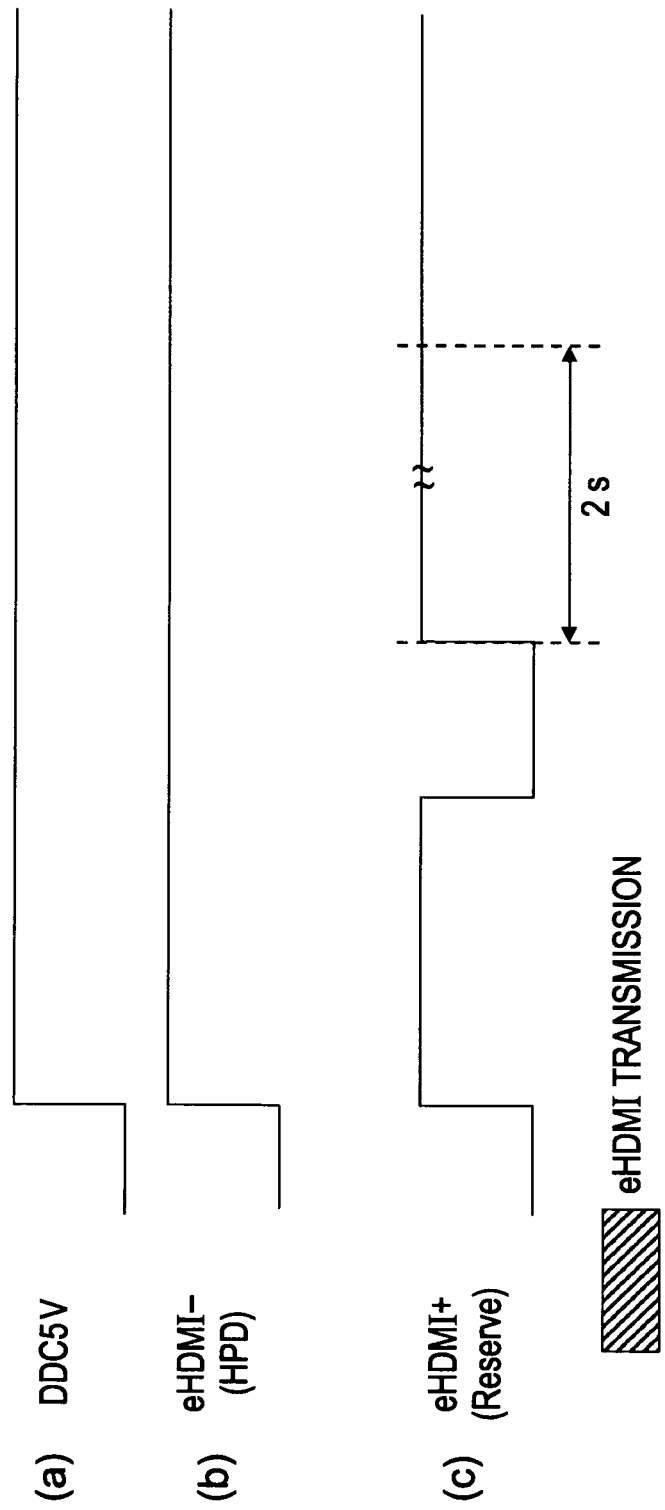
FIG. 34 is a diagram illustrating a voltage change example of the reserve line, in the case that the CPU of the sink device determines that the source device on the partner side is an eHDMI-incompatible device.

FIG. 34 illustrates a voltage change example of the reserve line in the case that determination is made that the source device on the partner side is an eHDMI-incompatible device. Note that FIG. 25(*a*) illustrates the voltage (DDC5V) of the power supply line, FIG. 34(*b*) illustrates the voltage of the HPD line, and FIG. 34(*c*) illustrates the voltage of the reserve line.

As shown in FIG. 34(*c*), with the sink device, the voltage of the reserve line has been changed from low to high, and a transmission (start of condition transmission) request for the function information has been transmitted to the source device on the partner side. However, as shown in FIG. 34(*c*), thereafter, even if two seconds have elapsed, the voltage of the reserve line is still high, and there have been no reply from the source device.

Returning to the flowchart in FIG. 33, at the time of reply having been received in step ST46, in step ST49 the CPUsi changes the voltage of the reserve line to transmit the information of a transmission format (application) that the sink device supports to the source device on the partner side.

Next, in step ST50, the CPUsi monitors the voltage of the reserve line. Subsequently, the CPUsi detects the compatible transmission format of the source device on the partner side from voltage change in the reserve line. Subsequently, in step ST51, the CPUsi starts transmission of an eHDMI signal with the source device on the partner side.

Figure 35:
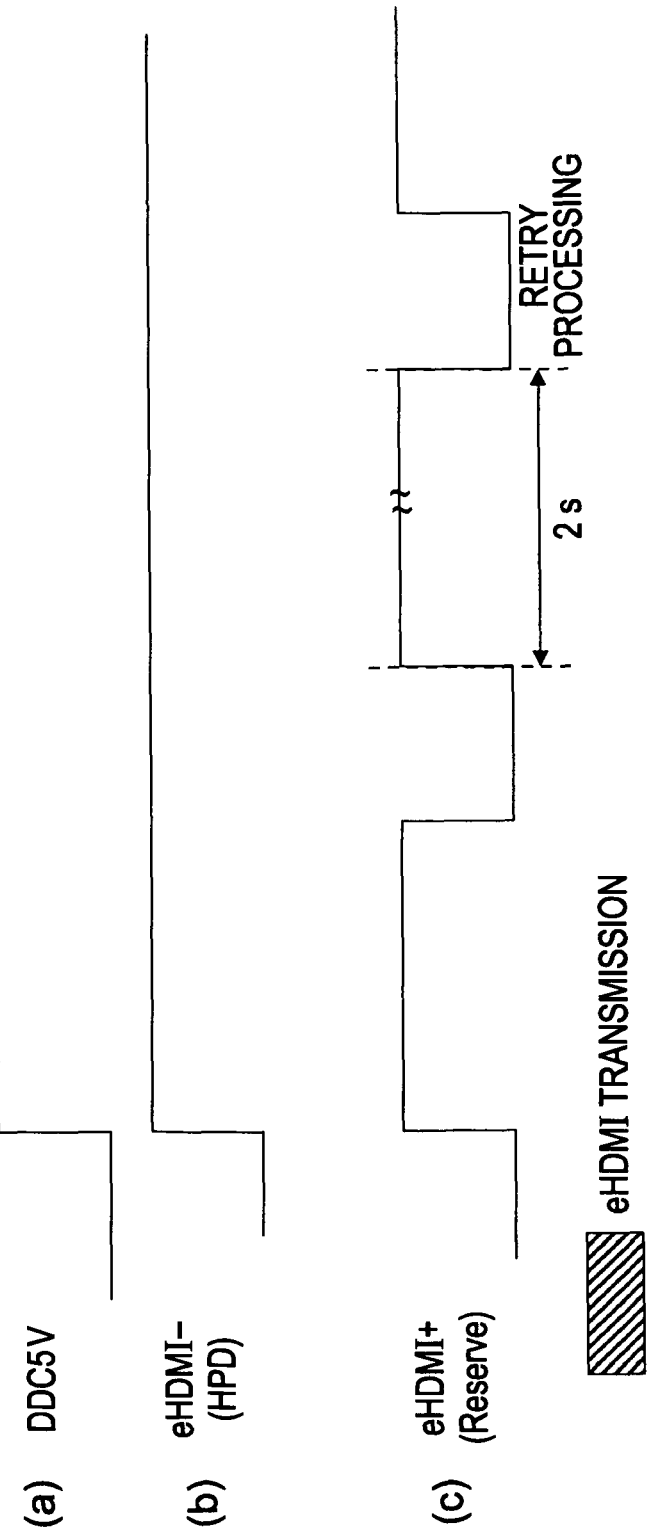
FIG. 35 is a diagram for describing retry processing wherein at the time of reply from the source device having not arrived even if two seconds elapse, transmission of the function information and the like is requested as to the source device on the partner side again.

With the processing of the flowchart in FIG. 33, at the time of reply from the source device having not been received even if two seconds have elapsed, the CPUsi immediately determines that the source device is an eHDMI-incompatible device. However, as shown in FIG. 35(*c*), at the time of reply from the source device having not been received even if two seconds have elapsed, the CPUsi may execute retry processing wherein the voltage of the reserve line is changed from low to high several times (only once is shown in FIG. 35(*c*)) to output a transmission request (condition transmission start request) of the function information to the source device on the partner side. Thus, in the case that the source device has had difficulty in reply due to a busy state, a mistake of immediately determining that the source device is an eHDMI-incompatible device can be avoided.

Note that FIG. 35(*a*) illustrates the voltage (DDC5V) of the power supply line, FIG. 35(*b*) illustrates the voltage of the HPD line, and FIG. 35(*c*) illustrates the voltage of the reserve line. FIGS. 35(*a*) and (*b*) are the same as FIGS. 34(*a*) and (*b*).

Figure 36:
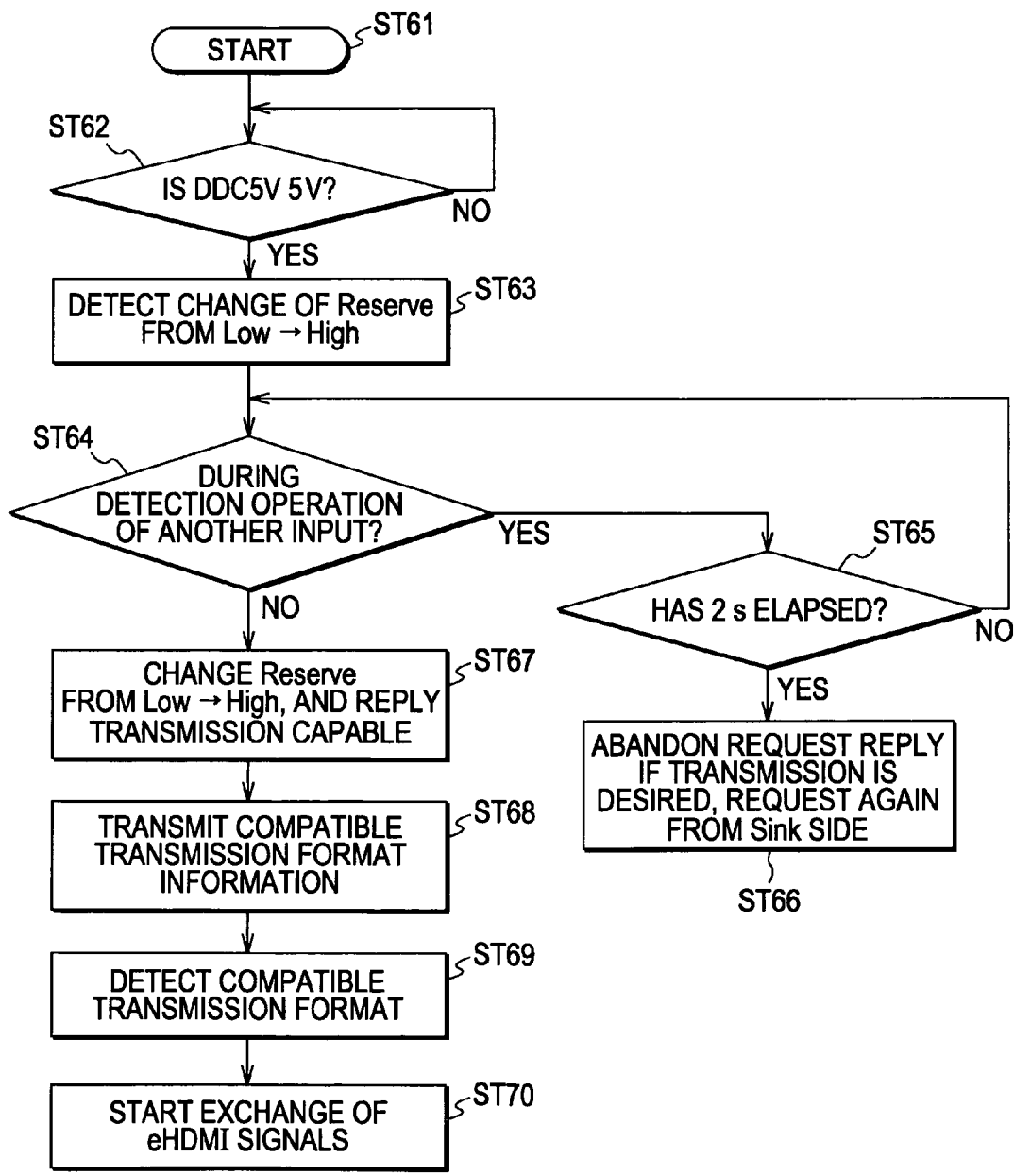
FIG. 36 is a flowchart illustrating an example of the processing procedure of the sink device in the case of outputting a request from the source device.

The flowchart in FIG. 36 illustrates an example of the processing procedure of the CPUsi of the sink device in the case that a request is output from the source device.

In step ST61, the CPUsi starts the processing, and then proceeds to processing in step ST62. In this step ST62, the CPUsi determines whether or not the voltage (DDC5V) of the power supply line is 5V.

When the voltage (DDC5V) of the power supply line is 5V, in step ST63 the CPUsi monitors the voltage of the reserve line to detect change of low to high. Subsequently, the CPUsi determines that a request of transmission (start of condition transmission) of the function information from the source side, and proceeds to processing in step ST64. In this step ST64, the CPUsi determines whether or not another HDMI input is currently performing a detection operation of the function information, the compatible transmission format information, and the like.

At the time of currently performing a detection operation of another input, in step ST65 the CPUsi determines whether or not two seconds has elapsed since change in voltage of low to high of the reserve line was detected in step ST63. At the time of two seconds having not elapsed, the CPUsi returns to the processing in step ST64. At the time of two seconds having elapsed, in step ST66 the CPUsi gives up transmission of the function information (reply of being transmittable). Note that in the case of intending to execute transmission of the function information (reply of being transmittable), a request for transmission (start of condition transmission) of the function information is output from the sink side again.

When another input is not currently performing a detection operation in step ST64, the CPUsi proceeds to processing in step ST67. In this step ST67, the CPUsi changes the voltage of the reserve line from low to high to transmit the function information (reply of being transmittable) to the source device. Subsequently, in step ST68, the CPUsi monitors the voltage of the reserve line to detect the compatible transmission format of the source device on the partner side from change in voltage of the reserve line.

Next, in step ST69, the CPUsi changes the voltage of the reserve line in a pulse shape to transmit the information of the transmission format (application) that the sink device supports to the source device on the partner side. Subsequently, in step ST70, the CPUsi starts transmission/reception of an eHDMI signal with the source device on the partner side.

Figure 37:
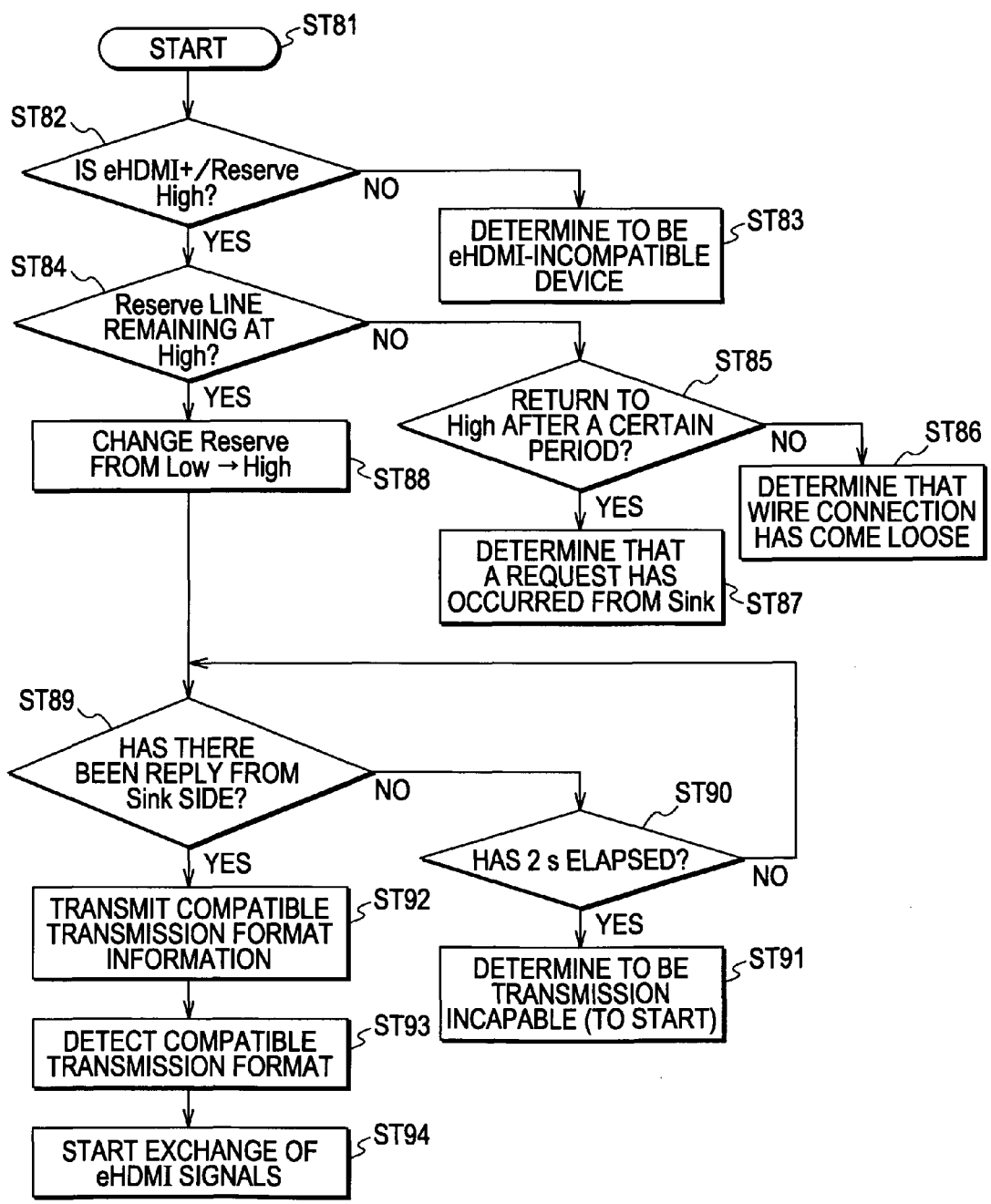
FIG. 37 is a flowchart illustrating an example of the processing procedure of the sink device in the case of outputting a request from the source device.

The flowchart in FIG. 37 illustrates an example of the processing procedure of the CPUso of the source device in the case of outputting a request from the source device.

In step ST81, the CPUso starts the processing, and then proceeds to processing in step ST82. In this step ST82, the CPUso determines whether or not the voltage of the reserve line is in a high state. When the voltage of the reserve line is not high, in step ST83 the CPUso determines that the sink device on the partner side is an eHDMI-incompatible device.

When the voltage of the reserve line is high, the CPUso proceeds to processing in step ST84. In this step ST84, the CPUso determines whether or not the voltage of the reserve line is still high. When the voltage of the reserve line is not still high, the CPUso proceeds to processing in step ST85. In this step ST85, the CPUso determines whether or not the voltage of the reserve line restores to high after a predetermined period of time. When not restoring to high, the CPUso determines that connection has been separated. On the other hand, when restoring to high, the CPUso determines that a request has occurred from the sink device, and proceeds to processing in step ST104 of the later-described flowchart in FIG. 38.

When the voltage of the reserve line is still high in step ST84, the CPUso proceeds to processing in step ST88. In this step ST88, the CPUso changes the voltage of the reserve line from low to high to request transmission (start of condition transmission) of the function information.

Next, in step ST89, the CPUso monitors the voltage of the reserve line to determine whether or not reply has arrived from the sink device, i.e., whether or not the function information (reply of being transmittable) has been transmitted. At the time of reply having not been transmitted, in step ST90 the CPUso determines whether or not two seconds have elapsed since transmission was requested in step ST88. At the time of two seconds having not elapsed, the CPUso returns to the processing in step ST89. On the other hand, at the time of two seconds having elapsed, in step ST91, the CPUso determines that transmission to the sink device on the partner side is impossible, and returns to the processing start in step ST81.

At the time of reply having arrived in step S89, in step ST92 the CPUso changes the voltage of the reserve line in a pulse shape to transmit the information of the transmission format (application) that the source device supports to the sink device on the partner side.

Next, in step ST93, the CPUso monitors the voltage of the reserve line. Subsequently, the CPUso detects the compatible transmission format of the sink device on the partner side from change in voltage of the reserve line. Subsequently, in step ST94, the CPUso starts transmission/reception of an eHDMI signal with the sink device on the partner side.

With the processing of the flowchart in FIG. 37, at the time of reply from the sink device having not arrived even after elapse of two seconds, the CPUso immediately determines that transmission is impossible. However, at the time of reply from the sink device having not arrived even after elapse of two seconds, the CPUso may execute retry processing wherein the voltage of the reserve line is changed from low to high several times to output a transmission request (condition transmission start request) of the function information to the sink device on the partner side. Thus, in the case that the sink device has had difficulty in reply due to a busy state, a mistake of immediately determining that transmission is impossible can be avoided.

Figure 38:
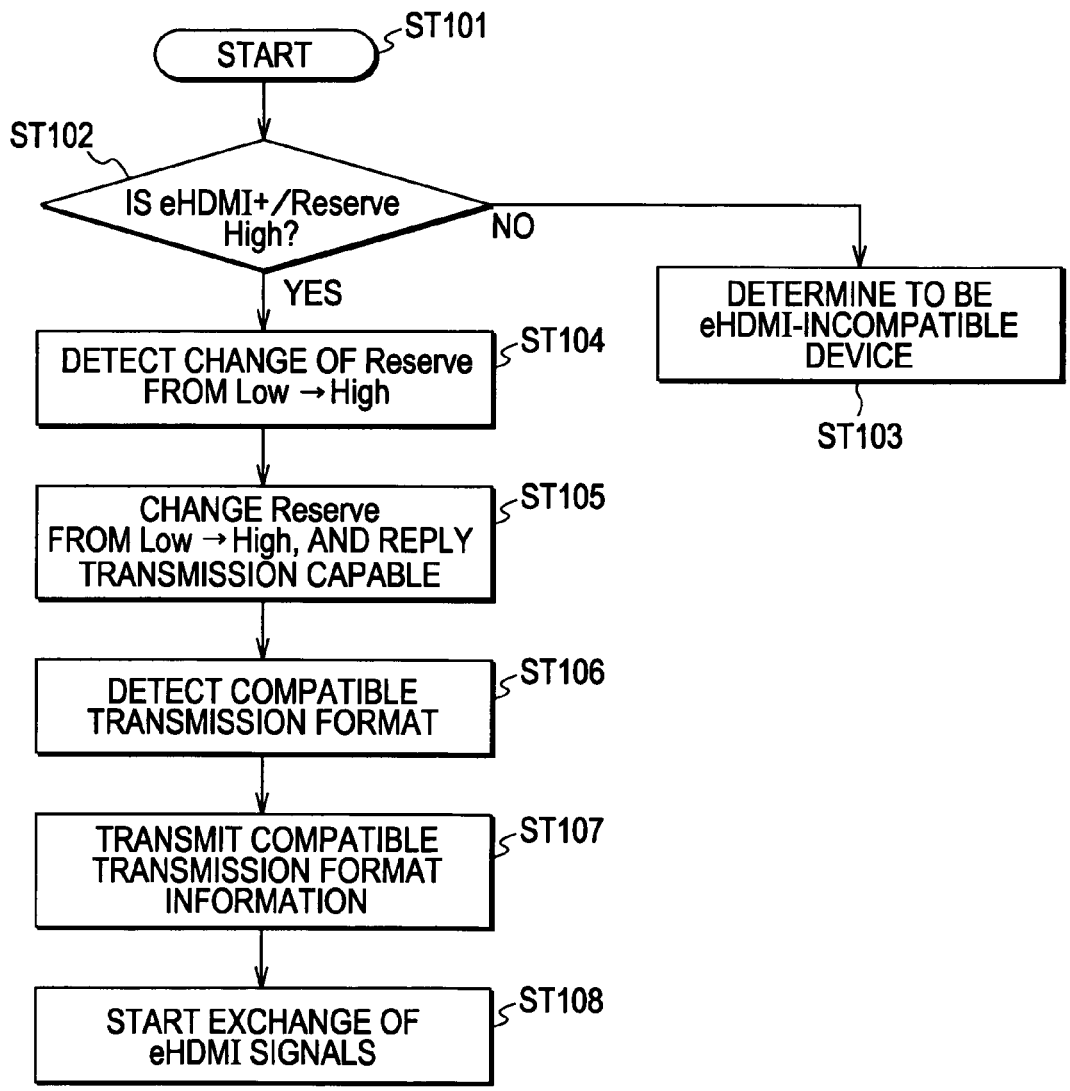
FIG. 38 is a flowchart illustrating an example of the processing procedure of the sink device in the case of outputting a request from the source device.

The flowchart in FIG. 38 illustrates an example of the processing procedure of the CPUso of the source device in the case that a request is output from the sink device.

In step ST101, the CPUso starts the processing, and then proceeds to processing in step ST102. In this step ST102, the CPUso determines whether or not the voltage of the reserve line is in a high state. When the voltage of the reserve line is not high, in step ST103 the CPUso determines that the sink device on the partner side is an eHDMI-incompatible device.

When the voltage of the reserve line is high, the CPUso proceeds to processing in step ST104. In this step ST104, the CPUso monitors the voltage of the reserve line to detect change of low to high. In this case, the CPUso detects a transmission request (condition transmission start request) of the function information from the sink device.

Next, in step ST105, the CPUso changes the voltage of the reserve line from low to high to transmit the function information (reply of being transmittable) to the sink device on the partner side. Subsequently, in step ST106, the CPUso monitors the voltage of the reserve line to detect the compatible transmission format of the sink device on the partner side from change in voltage of the reserve line.

Next, in step ST107, the CPUso changes the voltage of the reserve line in a pulse shape to transmit the information of the transmission format that the source device supports to the sink device on the partner side. Subsequently, in step ST108, the CPUso starts transmission/reception of an eHDMI signal with the sink device on the partner side.

As described above, with the AV system 200 shown in FIG. 1, the disk recorder 210 notifies the television receiver 250 of the information indicating that it itself is an eHDMI-compatible device, and the information of the transmission format (application) supported, when the television receiver 250 is connected thereto via the HDMI cable 350, or when a transmission request is received from the television receiver 250.

On the other hand, for example, as shown in FIG. 39, with an AV system 200A wherein an eHDMI-incompatible disk recorder 210A and the television receiver 250 are connected with the HDMI cable 350, the above function information and transmission format information are not notified from the disk recorder 210A to the television receiver 250.

Therefore, the television receiver 250 can recognize whether or not the disk recorder 210 includes communication units (high-speed data interface, SPDIF reception circuit), i.e., whether or not the disk recorder 210 is an eHDMI-compatible device, and accordingly, an unnecessary signal can be prevented from being transmitted to the disk recorder 210A which is an eHDMI-incompatible device via the communication path made up of the reserve line and the HPD line.

Also, the television receiver 250 can obtain from the disk recorder 210 which is an eHDMI-compatible device the information of the transmission format that this disk recorder 210 supports, and accordingly, compatibility with the SPDIF signal and the Ethernet signal of this disk recorder 210 can be readily known.

Note that, as described in the above embodiment, the function information is notified from the disk recorder 210 which is an eHDMI-compatible device to the television receiver 250, which indicates that the disk recorder 210 is an eHDMI-compatible device. After recognizing that the disk recorder 210 is an eHDMI-compatible device, the television receiver 250 can execute transmission of the Ethernet signal or SPDIF signal via the communication path made up of the reserve line and the HPD line of the HDMI cable 350.

However, there is a case where the disk recorder 210 intentionally determines to shut off communication with the communication units (high-speed data line interface 213, SPDIF reception circuit 417). For example, this case is a case where the network terminal 225 is connected to a network, and communication using this network is prioritized, or a case where the power of the CPU 221 is shifted to another process within the device, or the like. For example, the CPU 221 determines whether or not communication by the communication units is thus shut off. Here, the CPU 221 makes up a shutoff determining unit.

When determining to shut off communication by the above communication units, the disk recorder 210 transmits communication information indicating shutoff of communication to the television receiver 250. For example, the disk recorder 210 inserts the above communication information during the blanking period of a video signal to be transmitted to the television receiver 250 using the above TMDS channel in the same way as the above function information, thereby transmitting this communication information to the television receiver 250. Here, the disk recorder 210 inserts the above communication information during the blanking period of a video signal, for example, using the AVI InfoFrame packet of HDMI, a GCP packet, or the like.

In the case that the disk recorder 210 inserts the communication information during the blanking period of a video signal to be transmitted to the television receiver 250 using the TMD channel as described above, thereby transmitting this communication information to the television receiver 250, the television receiver 250 extracts the above communication information from the blanking period of the video signal received from the disk recorder 210, thereby receiving this communication information.

Also, for example, the disk recorder 210 transmits the above communication information to the television receiver 250 via the CEC line 84 which is the control data line of the HDMI cable 350. In this case, the television receiver 250 receives the communication information from the disk recorder 210 via the CEC line 84.

The television receiver 250 can recognize that the disk recorder 210 is in a communication shutoff state by receiving the communication information such as described above. Thus, the television receiver 250 can prevent transmission of an unnecessary signal to the disk recorder 250 wherein communication using the communication units is shut off, via the above communication path. Note that, as described above, in the case that the communication information is transmitted from the disk recorder 210 to the television receiver 250, the HDMI transmission unit 212 of the disk recorder 210 makes up an information transmission unit, and the HDMI reception unit 252 of the television receiver 250 makes up an information reception unit.

Note that, with the above description, the communication information is transmitted from the disk recorder 210 to the television receiver 250, thereby enabling shutoff of communication by the communication units of the disk recorder 210 to be recognized at the television receiver 250 side. However, the disk recorder 210 can notify the television receiver 250 that the disk recorder 210 is in a communication shutoff state, by changing the voltage of the first line, e.g., the reserve line of the HDMI cable 350. In this case, the disk recorder 210 sets the connection switch 418 (see FIG. 20) from an off state to an on state to decrease the voltage of the reserve line.

The television receiver 250 can obtain the communication information indicating shutoff of communication by the communication units of the disk recorder 210 by detecting change in voltage of the reserve line. In this case, the CPU 271 of the television receiver 250 makes up an information obtaining unit. The television receiver 250 can recognize, as described above, that the disk recorder 210 shuts off communication by the communication units, by detecting the voltage of the reserve line to obtain the communication information. Thus, the television receiver 250 can prevent an unnecessary signal from being transmitted to the disk recorder 210 in a communication shutoff state via the above communication path.

Note that, with the above embodiment, description has been made assuming that the interface conforming to the HDMI standard is used as a transmission path for connecting each device, but the present invention may be applied to other similar transmission standards. Also, as an example, the disk recorder has been used as a source device, and the television receiver has been used as a sink device, but the present invention may be applied similarly to a case where other transmission device and reception device are used. Also, the above embodiment has illustrated a case where electronic devices are connected with the HDMI cable, but the present invention may be applied similarly to a case where electronic devices are connected wirelessly.

INDUSTRIAL APPLICABILITY

The present invention allows a signal to be transmitted suitably from a reception device to a transmission device, and may be applied to an AV system or the like wherein a source device and a sink device are connected via an HDMI cable.

The invention claimed is:

1. A transmission device comprising:
    a HDMI transmission unit configured to transmit video signals from the transmission device to an external device in accordance with an HDMI standard via one or more channels interconnected to an HDMI terminal;
    a high-speed data line interface configured to communicate with said external device via a pair of differential transmission paths interconnected to said HDMI terminal;
    a processor configured to transmit first function information to said external device for notifying said external device that said transmission device includes said high-speed data line interface that supports transmission of at least one of an Ethernet signal and a digital audio signal, said first function information being transmitted via a control data line interconnected to said HDMI terminal;
    the processor being further configured to receive second function information via the control data line from said external device in response to the first function information, said second function information in turn indicating that said external device also includes a respective high-speed data line interface configured to communicate the at least one of an Ethernet signal and a digital audio signal with said high-speed data line interface of the transmission device via the pair of differential transmission paths interconnected with said HDMI terminal;
    the processor being further configured to cause communication information indicating a communication shutoff state with said external device to be transmitted to said external device via the control data line interconnected to said HDMI terminal, and
    wherein the pair of differential transmission paths include a reserve line and an HPD line interconnected to the HDMI terminal, and at least one of said pair of differential transmission paths further includes a function for providing a connection state of said external device using a DC bias potential.

2. The transmission device according to claim 1, wherein said first function information further includes information indicating a transmission format that the transmission device supports.

3. The transmission device according to claim 1, wherein:
    the processor is further configured to receive a transmission request for said first function information from said external device; and,
    the processor transmits said first function information to said external device upon receipt of said transmission request.

4. The transmission device according to claim 3, wherein said processor receives the transmission request for said first function information from said external device via the control data line interconnected to the HDMI terminal.

5. A transmission method for a transmission device comprising the steps of:
    transmitting video signals from the transmission device to an external device in accordance with an HDMI standard via one or more channels interconnected to an HDMI terminal;
    communicating with said external device via a pair of differential transmission paths interconnected to said HDMI terminal;
    transmitting first function information to said external device for notifying said external device that said transmission device includes said high-speed data line interface that supports transmission of at least one of an Ethernet signal and a digital audio signal, said first function information being transmitted via a control data line interconnected to said HDMI terminal;

receiving second function information via the control data line from said external device in response to the first function information, said second function information in turn indicating that said external device also includes a respective high-speed data line interface configured to communicate the at least one of an Ethernet signal and a digital audio signal with said high-speed data line interface of the transmission device via the pair of differential transmission paths interconnected with said HDMI terminal; and, causing communication information indicating a communication shutoff state with said external device to be transmitted to said external device via the control data line interconnected to said HDMI terminal, and wherein the pair of differential transmission paths include a reserve line and an HPD line interconnected to the HDMI terminal, and at least one of said pair of differential transmission paths further includes a function for providing a connection state of said external device using a DC bias potential.

6. A transmission device comprising:

a video signal transmission unit configured to transmit video signals to an external device via a transmission path with a plurality of channels using a differential signal;

a communication unit configured to communicate with said external device via a communication path made up of a pair of differential transmission paths included in said transmission path;

a function information transmission unit configured to transmit first function information indicating that said transmission device includes said communication unit to said external device via a control data line making up said transmission path; and a function information reception unit configured to receive second function information which is transmitted from said external device via the control data line, said second function information indicating that said external device includes a communication unit configured to execute communication via said communication path;

the function information transmission unit being further configured to cause communication information indicating a communication shutoff state with said external device to be transmitted to said external device via the control data line, and wherein the pair of differential transmission paths included in said communication path are a reserve line and an HPD line making up an HDMI cable, and at least one of said pair of differential transmission paths includes a function for notifying the connection state of said external device using a DC bias potential.

7. The transmission device according to claim 6, wherein the transmission device being arranged in operation to monitor a voltage of the reserve line;

and if the voltage of the reserve line is in a high state, the function information transmission unit transmits the first function information, the function information reception unit receives second function information.

* * * * *